(12) United States Patent
Sugimoto

(10) Patent No.: US 8,634,016 B2
(45) Date of Patent: Jan. 21, 2014

(54) IMAGING DEVICE AND MAIN PHOTOGRAPHIC SUBJECT RECOGNITION METHOD

(71) Applicant: FUJIFILM Corporation, Tokyo (JP)

(72) Inventor: Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/911,769

(22) Filed: Jun. 6, 2013

(65) Prior Publication Data

US 2013/0293766 A1  Nov. 7, 2013

Related U.S. Application Data

(63) Continuation of application No. PCT/JP2011/075390, filed on Nov. 4, 2011.

(30) Foreign Application Priority Data

Dec. 9, 2010  (JP) .................................. 2010-274854

(51) Int. Cl.
*G02B 13/16* (2006.01)
*H04N 5/225* (2006.01)

(52) U.S. Cl.
USPC ........... 348/335; 348/340; 348/345; 348/348; 348/350

(58) Field of Classification Search
USPC ......................... 348/335, 340, 348, 350, 352; 396/77–82, 89, 90, 93, 102, 103
See application file for complete search history.

(56) References Cited

U.S. PATENT DOCUMENTS

| 2008/0193116 A1 | 8/2008 | Uenishi |
| 2010/0060780 A1 | 3/2010 | Shibagami et al. |
| 2011/0043678 A1* | 2/2011 | Ueda et al. .................... 348/345 |

FOREIGN PATENT DOCUMENTS

| JP | 11-25263 A | 1/1999 |
| JP | 2003-244520 A | 8/2003 |
| JP | 2008-197286 A | 8/2008 |
| JP | 2010-66378 A | 3/2010 |
| JP | 2010-176061 A | 8/2010 |

* cited by examiner

*Primary Examiner* — Yogesh Aggarwal
(74) *Attorney, Agent, or Firm* — Birch, Stewart, Kolasch & Birch, LLP

(57) ABSTRACT

When a contrast-system multipoint ranging is performed to detect a main photographic subject in a screen based on a ranging result, a focus area is set at a screen center to perform continuous AF. When focusing is attained or almost attained in the continuous AF, the multipoint ranging is executed, and the main photographic subject in the screen is detected based on the ranging result. In this way, change in an angle of view can be prevented, and the main photographic subject can be accurately recognized.

34 Claims, 52 Drawing Sheets

FRAME INDICATING FOCUS AREA

FRAME INDICATING FOCUS AREA

MAIN PHOTOGRAPHIC SUBJECT ROUGH POSITION

DETAILED SEARCH RANGE

MAIN PHOTOGRAPHIC SUBJECT DETAILED POSITION

MAIN PHOTOGRAPHIC SUBJECT, CLOSE RANGE

MAIN PHOTOGRAPHIC SUBJECT, FAR RANGE

NO PEAK

PEAK, OUT OF ACCEPTABLE RANGE

IMAGING DEVICE AND MAIN PHOTOGRAPHIC SUBJECT RECOGNITION METHOD

CROSS-REFERENCE TO RELATED APPLICATIONS

This application is a PCT Bypass continuation application and claims the priority benefit under 35 U.S.C. §120 of PCT Application No. PCT/JP2011/075390 filed on Nov. 4, 2011 which application designates the U.S., and also claims the priority benefit under 35 U.S.C. §119 of Japanese Patent Application No. 2010-274854 filed on Dec. 9, 2010, which applications are all hereby incorporated in their entireties by reference.

BACKGROUND OF THE INVENTION

1. Field of the Invention

The present invention relates to an imaging device and a main photographic subject recognition method, and particularly, to an imaging device and a main photographic subject recognition method for recognizing a main photographic subject based on a result of multipoint ranging by a contrast-autofocus method.

2. Description of the Related Art

As one of methods of recognizing a main photographic subject in a screen, a method is known, in which multipoint ranging is performed in a screen and a main photographic subject is recognized using a result of the ranging (for example, Japanese Patent Application Laid-Open No. 2010-66378).

In the multipoint ranging, the screen is divided into a plurality of areas, and a distance to a photographic subject is measured in each of the divided areas. In this case, a method is known, in which a distance to a photographic subject is measured using contrast information of an image. In the method, a focus lens is moved from the nearest point to the infinity, and a position where the contrast of the image is the local maximum (peak) is detected to measure the distance to the photographic subject.

SUMMARY OF THE INVENTION

Many of the digital cameras have a live view function (through image display function) of displaying images currently captured by an imaging element (imaging sensor) on a monitor in real time in order to allow a photographer to check a focus state, a composition, and the like on the monitor before performing actual photographing.

As described, the focus lens needs to be moved from the nearest point to the infinity to detect the position where the contrast is the local maximum in the multipoint ranging by the contrast-autofocus method.

However, if the focus lens is moved from the nearest point to the infinity during live view, there is a disadvantage that an angle of view of the images (through images) displayed on the monitor changes, and the photographer feels uncomfortable.

Particularly, if the main photographic subject cannot be recognized, the multipoint ranging is repeated and the angle of view frequently changes. This causes a disadvantage that the screen is significantly hard to see.

The present invention has been made in view of the circumstances, and an object of the present invention is to provide an imaging device and a main photographic subject recognition method that can prevent the change in the angle of view and that can accurately recognize the main photographic subject.

To attain the object, an invention according to a first aspect of the present invention provides an imaging device including: an imaging optical system; imaging means for capturing an image through the imaging optical system; continuous AF means for performing a continuous AF by repeating focus adjustment of the imaging optical system to focus on a photographic subject in a specific focus area set in an imaging area of the imaging means; multipoint ranging means for dividing the imaging area into a plurality of ranging areas, changing a focal position of the imaging optical system within a predetermined search range, detecting a position where contrast is a local maximum in each of the ranging areas, and performing ranging of a photographic subject in each of the ranging areas; main photographic subject recognition means for recognizing a main photographic subject in the imaging area based on distance information of each of the ranging areas obtained by the multipoint ranging means; and control means for controlling the continuous AF means and the multipoint ranging means to cause the continuous AF means to terminate the continuous AF and to cause the multipoint ranging means to execute ranging when focusing on the photographic subject is attained or almost attained in the specific focus area by the continuous AF means.

According to the first aspect of the present invention, the multipoint ranging is executed only when focusing is attained or almost attained in the continuous AF (Auto Focus). This can prevent performing the multipoint ranging more than necessary. The fact that focusing is attained or almost attained in the continuous AF also serves as an indicator that the scene is stabilized. Therefore, the accuracy of the distance information becomes high when the multipoint ranging is performed. As a result, the main photographic subject can be accurately recognized. Even if the main photographic subject exists in an area other than the focus area (generally, center) of the continuous AF, the main photographic subject can be recognized.

To attain the object, according to a second aspect of the present invention, in the imaging device according to the first aspect, the multipoint ranging means limits the search range to a predetermined range in a vicinity of a position focused or almost focused by the continuous AF means, and executes the ranging.

According to the imaging device of the second aspect of the present invention, the search range in the multipoint ranging is limited to the predetermined range in a vicinity of the position focused or almost focused in the continuous AF. It is contemplated that the main photographic subject exists around the focus area (generally, a center) of the continuous AF. Therefore, the search range can be limited to the range to reduce time for searching (search time). As a result, the multipoint ranging can be speeded up, and the power consumption can be reduced by reducing the drive distance of the imaging optical system. The change in the angle of view in the multipoint ranging can also be inhibited, and the screen can be easily viewed.

To attain the object, according to a third aspect of the present invention, in the imaging device according to the second aspect, when all local maximum values of the contrast in the ranging areas obtained by the detection are smaller than a threshold or when the local maximum value cannot be detected, the multipoint ranging means expands the search range and executes the ranging again.

According to the imaging device of the third aspect of the present invention, when the position in which the contrast is the local maximum in each ranging area is not detected (when all local maximum values of the contrast in the ranging areas are smaller than the threshold or when the local maximum values cannot be detected) as a result of limiting the search range, the search range is expanded and then the multipoint ranging is executed again. As a result, the main photographic subject can be efficiently recognized.

To attain the object, according to a fourth aspect of the present invention, in the imaging device according to the first aspect, the continuous AF means executes the focus adjustment with the focus area set at a center of the imaging area, and the multipoint ranging means limits the search range to (toward) a nearest point side from the position focused or almost focused by the continuous AF means and executes the ranging.

According to the imaging device of the fourth aspect of the present invention, the search range in the multipoint ranging is limited to the nearest point side from the position focused or almost focused in the continuous AF. In the recognition of the main photographic subject, the distance and the position in the screen are generally weighted and added based on two hypotheses that "it is likely that a photographic subject closer to the center of the screen is the main photographic subject" and that "it is likely that a photographic subject at a closer range is the main photographic subject", and the position in which the main photographic subject likelihood is the maximum is recognized as the main photographic subject. If focusing is attained in the continuous AF by setting the screen center as the focus area first, the position recognized as the main photographic subject does not move from the center unless there is an object closer to the nearest point side than the photographic subject focused at the center. Therefore, to detect the main photographic subject in an area other than the center, it is only necessary to search an area closer to the nearest point side than the photographic subject focused at the center. Therefore, the search range of the multipoint ranging is limited to the nearest point side from (with reference to) the position focused or almost focused in the continuous AF in the present invention. As a result, the multipoint ranging can be speeded up, and the power consumption can be reduced by reducing the drive range of the imaging optical system. The change in the angle of view can be further prevented, and the screen can be more easily viewed.

To attain the object, according to a fifth aspect of the present invention, in the imaging device according to any one of the first to fourth aspects, the continuous AF means executes the focus adjustment with the focus area at set the center of the imaging area, and the multipoint ranging means performs searching from the position focused or almost focused by the continuous AF means to a nearest point side.

According to the imaging device of the fifth aspect of the present invention, the focus area is set at the center of the imaging area and the continuous AF is executed. When focusing is attained or almost attained, the multipoint ranging is performed from the position focused or almost focused toward the nearest point side. This can eliminate wasteful drive of the imaging optical system. The multipoint ranging can be speeded up, and the power consumption can be reduced. The change in the angle of view can be further prevented, and the screen can be more easily viewed.

To attain the object, according to a sixth aspect of the present invention, in the imaging device according to any one of the first to fifth aspects, the control means prevents the multipoint ranging means from executing the ranging when the position focused or almost focused by the continuous AF means closer to the nearest point side than a threshold.

According to the imaging device of the sixth aspect of the present invention, even when focusing on a photographic subject is attained or almost attained in the continuous AF, if the photographic subject is positioned at a close range, the multipoint ranging is not performed. If the photographic subject on which focusing is attained in the continuous AF is sufficiently close to the near side, the probability that the local maximum value is detected in each ranging area is low even if the multipoint ranging is performed subsequently. In addition, even if the local maximum value is detected, the probability that the subject is the main photographic subject is low. Therefore, the multipoint ranging is not executed if the position focused or almost focused in the continuous AF is closer to the nearest point side than the threshold. The multipoint ranging is executed only when focusing is attained on the infinity side with reference to the threshold. This can further reduce the execution of the multipoint ranging.

To attain the object, a seventh aspect of the present invention provides an imaging device including: an imaging optical system; imaging means for capturing an image through the imaging optical system; continuous AF means for performing a continuous AF by repeating focus adjustment of the imaging optical system to focus on a photographic subject in a specific focus area set in an imaging area of the imaging means; scene change detection means for detecting a change of a scene captured by the imaging means while the continuous AF is performed by the continuous AF means; multipoint ranging means for dividing the imaging area into a plurality of ranging areas, changing a focal position of the imaging optical system within a predetermined search range, detecting a position where contrast is a local maximum in each of the ranging areas, and performing ranging of a photographic subject in each of the ranging areas; main photographic subject recognition means for recognizing a main photographic subject in the imaging area based on distance information of each of the ranging areas obtained by the multipoint ranging means; and control means for controlling the continuous AF means and the multipoint ranging means to cause the continuous AF means to terminate the continuous AF and to cause the multipoint ranging means to execute the ranging when the scene change detection means detects a scene change.

According to the seventh aspect of the present invention, the multipoint ranging is executed only when the photographing scene (shooting scene) has changed. This can prevent performing the multipoint ranging more than necessary.

To attain the object, according to an eighth aspect of the present invention, the imaging device according to the seventh aspect further includes reference information registration means for registering, as reference information, an image captured by the imaging means or imaging information when the main photographic subject recognition means recognizes the main photographic subject, wherein the scene change detection means detects the change of the scene by comparing a current image captured by the imaging means or current imaging information with the reference information.

According to the imaging device of the eighth aspect of the present invention, the captured image or the imaging information when the main photographic subject is recognized is registered as the reference information and the change of the scene is detected by comparing the reference information with the current image or imaging information. As a result, the change in the photographing scene can be appropriately and efficiently detected. The imaging information includes, for example, a multi-zone metering value, a focal position, and an AF evaluation value. The change of the scene can also be detected by comparing the information.

To attain the object, according to a ninth aspect of the present invention, the imaging device according to the seventh aspect, further includes reference information registration means for registering, as reference information, an image or imaging information of a frame which is N frames before the current image captured by the imaging means, wherein the scene change detection means detects the change of the scene by comparing the current image captured by the imaging means or the current imaging information with the reference information.

According to the imaging device of the ninth aspect of the present invention, an image captured a certain time before (image of a frame which is N frames before) or imaging information (imaging information of a frame which is N frames before) is registered as the reference information, and the change of the scene is detected by comparing the reference information with the current image or imaging information. As a result, the change in the photographing scene can be appropriately and efficiently detected. The imaging information may include, for example, a multi-zone metering value, a focal position, and an AF evaluation value. The change of the scene can also be detected by comparing the information.

To attain the object, according to a tenth aspect of the present invention, in the imaging device according to any one of the seventh to ninth aspects, the control means controls the continuous AF means and the multipoint ranging means to cause the multipoint ranging means to execute the ranging when the focusing on the photographic subject is attained or almost attained in the specific focus area by the continuous AF means and when the scene change detection means detects the scene change.

According to the imaging device of the tenth aspect of the present invention, the multipoint ranging is executed when focusing is attained or almost attained in the continuous AF and the photographing scene has changed. More specifically, even if focusing is attained or almost attained in the continuous AF, the multipoint ranging is not executed if there is no change in the photographing scene. As a result, the multipoint ranging can be executed at more appropriate timing. The fact that focusing is attained or almost attained in the continuous AF also serves as an indicator that the scene is stabilized. Therefore, the accuracy of the distance information when the multipoint ranging is performed is high. As a result, the main photographic subject can be accurately recognized. The main photographic subject can be recognized even if the main photographic subject exists in an area other than the focus area (generally, a center) of the continuous AF.

To attain the object, according to an eleventh aspect of the present invention, in the imaging device according to the tenth aspect, the multipoint ranging means limits the search range to a predetermined range in a vicinity of a position focused or almost focused by the continuous AF means, and executes the ranging.

According to the imaging device of the eleventh aspect of the present invention, the search range in the multipoint ranging is limited to the predetermined range in a vicinity of the position focused or almost focused in the continuous AF. This can reduce the search time and speed up the multipoint ranging. The power consumption can be reduced by reducing the drive distance of the imaging optical system. The change in the angle of view in the multipoint ranging can also be inhibited, and the screen can be easily viewed.

To attain the object, according to a twelfth aspect of the present invention, in the imaging device according to the eleventh aspect, when all local maximum values of the contrast in the ranging areas obtained by the detection are smaller than a threshold or when the local maximum value cannot be detected, the multipoint ranging means expands the search range and executes the ranging again.

According to the imaging device of the twelfth aspect of the present invention, when the position in which the contrast is the local maximum in each ranging area is not detected (if all maximum values of the contrast of the ranging areas are smaller than the threshold or if the local maximum values cannot be detected) as a result of limiting the search range, the search range is expanded and the multipoint ranging is executed again As a result, the main photographic subject can be efficiently recognized.

To attain the object, according to a thirteenth aspect of the present invention, in the imaging device according to the tenth aspect, the continuous AF means executes the focus adjustment with the focus area set at a center of the imaging area, and the multipoint ranging means limits the search range to a nearest point side from the position focused or almost focused by the continuous AF means and executes the ranging.

According to the imaging device of the thirteenth aspect of the present invention, the search range in the multipoint ranging is limited to the nearest point side from the position focused or almost focused in the continuous AF. As a result, the multipoint ranging can be speeded up, and the power consumption can be reduced by reducing the drive range of the imaging optical system. The change in the angle of view can be further inhibited, and the screen can be more easily viewed.

To attain the object, according to a fourteenth aspect of the present invention, in the imaging device according to the tenth or thirteenth aspect, the continuous AF means executes the focus adjustment with the focus area at set the center of the imaging area, and the multipoint ranging means performs searching from the position focused or almost focused by the continuous AF means to a nearest point side.

According to the imaging device of the fourteenth aspect of the present invention, the focus area is set at the center of the imaging area and the continuous AF is executed, and when focusing is attained or almost attained, the multipoint ranging is performed from the position focused or almost focused toward the nearest point side. This can eliminate wasteful drive of the imaging optical system. The multipoint ranging can be speeded up, and the power consumption can be reduced. The change in the angle of view can be further inhibited, and the screen can be more easily viewed.

To attain the object, according to a fifteenth aspect of the present invention, in the imaging device according to any one of the eleventh to fourteenth aspects, the control means prevents the multipoint ranging means from executing the ranging when the position focused or almost focused by the continuous AF means closer to the nearest point side than a threshold.

According to the imaging device of the fifteenth aspect of the present invention, if the photographic subject focused in the continuous AF is positioned at a close range, the multipoint ranging is not performed even when focusing is attained or almost attained. This can further inhibit the execution of the multipoint ranging.

To attain the object, a sixteenth aspect of the present invention provides an imaging device including: an imaging optical system; imaging means for capturing an image through the imaging optical system; continuous AF means for performing a continuous AF by repeating focus adjustment of the imaging optical system to focus on a photographic subject in a specific focus area set in an imaging area of the imaging means; multipoint ranging means for dividing the imaging area into a plurality of ranging areas, changing a focal position of the imaging optical system in a predetermined search range, detecting a position where contrast is a local maximum in each of the ranging areas, and performing ranging of a photographic subject in each of the ranging areas; main photographic subject recognition means for recognizing a main photographic subject in the imaging area based on distance information of each of the ranging areas obtained by the multipoint ranging means; counting means for starting counting before the continuous AF means starts the continuous AF, and for resetting a count value to restart counting when the multipoint ranging means executes the ranging; and control means for controlling the continuous AF means and the multipoint ranging means to cause the continuous AF means to terminate the continuous AF and to cause the multipoint ranging means to execute the ranging when the count value by the counting means exceeds a threshold.

According to the imaging device of the sixteenth aspect of the present invention, monitoring operation is performed by the counting means, and the multipoint ranging is executed when the count value exceeds the threshold. When the multipoint ranging is executed, the count value is reset, and the count is restarted again. This can prevent frequent execution of the multipoint ranging. The counting means can be configured to perform counting frame by frame, for example.

To attain the object, according to a seventeenth aspect of the present invention, in the imaging device according to the sixteenth aspect, the control means controls the continuous AF means and the multipoint ranging means to cause the multipoint ranging means to execute the ranging when the focusing on the photographic subject is attained or almost attained in the specific focus area by the continuous AF means and the count value by the counting means exceeds the threshold.

According to the imaging device of the seventeenth aspect of the present invention, the multipoint ranging is executed when focusing is attained or almost attained in the continuous AF and the count value exceeds the threshold. More specifically, even when focusing is attained or almost attained in the continuous AF, the multipoint ranging is not executed if the count value does not exceed the threshold. As a result, the multipoint ranging can be executed at more appropriate timing.

To attain the object, according to an eighteenth aspect of the present invention, the imaging device according to the sixteenth aspect further includes scene change detection means for detecting a change of a scene captured by the imaging means while the continuous AF is performed by the continuous AF means, wherein the control means controls the continuous AF means and the multipoint ranging means to cause the multipoint ranging means to execute the ranging when the focusing on the photographic subject is attained or almost attained in the specific focus area by the continuous AF means, the scene change detection means detects the scene change and the count value by the counting means exceeds the threshold.

According to the imaging device of the eighteenth aspect of the present invention, the multipoint ranging is executed when focusing is attained or almost attained in the continuous AF, the scene change is detected, and the count value exceeds the threshold. More specifically, the multipoint ranging is not executed if there is no change in the photographing scene, even when focusing is attained or almost attained in the continuous AF. The multipoint ranging is not executed if the count value does not exceed the threshold, even if there is a change in the photographing scene. As a result, the multipoint ranging can be executed at more appropriate timing.

To attain the object, according to a nineteenth aspect of the present invention, the imaging device according to the eighteenth aspect further includes reference information registration means for registering, as reference information, an image captured by the imaging means or imaging information when the main photographic subject recognition means recognizes the main photographic subject, wherein the scene change detection means detects the change of the scene by comparing a current image captured by the imaging means or current imaging information with the reference information.

According to the imaging device of the nineteenth aspect of the present invention, the captured image or the imaging information when the main photographic subject is recognized is registered as the reference information, and the change of the scene is detected by comparing the reference information with the current image or imaging information. As a result, the change in the photographing scene can be appropriately and efficiently detected. The imaging information includes, for example, a multi-zone metering value, a focal position, and an AF evaluation value. The change of the scene can also be detected by comparing the information.

To attain the object, according to a twentieth aspect of the present invention, the imaging device according to the eighteenth aspect further including reference information registration means for registering, as reference information, an image or imaging information of a frame which is N frames before the current image captured by the imaging means, wherein the scene change detection means detects the change of the scene by comparing the current image captured by the imaging means or the current imaging information with the reference information.

According to the imaging device of the twentieth aspect of the present invention, an image captured a certain time before (image of a frame which is N frames before) or imaging information (imaging information of a frame which is N frames before) is registered as the reference information, and the change of the scene is detected by comparing the reference information with the current image or imaging information. As a result, the change in the photographing scene can be appropriately and efficiently detected.

To attain the object, according to a twenty-first aspect of the present invention, in the imaging device according to any one of the seventeenth to twentieth aspects, the multipoint ranging means limits the search range to a predetermined range in a vicinity of a position focused or almost focused by the continuous AF means, and executes the ranging.

According to the imaging device of the twenty-first aspect of the present invention, the search range in the multipoint ranging is limited to the predetermined range in a vicinity of the position focused or almost focused in the continuous AF. This can reduce the search time and speed up the multipoint ranging. The power consumption can be reduced by reducing the drive distance of the imaging optical system. The change in the angle of view in the multipoint ranging can also be inhibited, and the screen can be easily viewed.

To attain the object, according to a twenty-second aspect of the present invention, in the imaging device according to the twenty-first aspect, when all local maximum values of the contrast in the ranging areas obtained by the detection are smaller than a threshold or when the local maximum value cannot be detected, the multipoint ranging means expands the search range and executes the ranging again.

According to the imaging device of the twenty-second aspect of the present invention, the search range is expanded if the position in which the contrast is the local maximum in each ranging area is not detected (if all local maximum values of the contrast of the ranging areas are smaller than the threshold or if the local maximum values cannot be detected) as a result of limiting the search range, and the multipoint ranging is executed again. As a result, the main photographic subject can be efficiently recognized.

To attain the object, according to a twenty-third aspect of the present invention, in the imaging device according to any one of the eighteenth to twenty-second aspects, the continuous AF means executes the focus adjustment with the focus area set at a center of the imaging area, and the multipoint ranging means limits the search range to a nearest point side from the position focused or almost focused by the continuous AF means and executes the ranging.

According to the imaging device of the twenty-third aspect of the present invention, the search range in the multipoint ranging is limited to the nearest point side from the position focused or almost focused in the continuous AF. As a result, the multipoint ranging can be speeded up, and the power consumption can be reduced by reducing the drive range of the imaging optical system. The change in the angle of view can be further inhibited, and the screen can be more easily viewed.

To attain the object, according to a twenty-fourth aspect of the present invention, in the imaging device according to any one of the eighteenth to twenty-third aspects, the continuous AF means executes the focus adjustment with the focus area at set the center of the imaging area, and the multipoint ranging means performs searching from the position focused or almost focused by the continuous AF means to a nearest point side.

According to the imaging device of the twenty-fourth aspect of the present invention, the focus area is set at the center of the imaging area and the continuous AF is executed. And then, when focusing is attained or almost attained, the multipoint ranging is performed from the position focused or almost focused toward the nearest point side. This can eliminate wasteful drive of the imaging optical system. The multipoint ranging can be speeded up, and the power consumption can be reduced. The change in the angle of view can be further inhibited, and the screen can be more easily viewed.

To attain the object, according to a twenty-fifth aspect of the present invention, in the imaging device according to any one of the eighteenth to twenty-fourth aspects, the control means prevents the multipoint ranging means from executing the ranging when the position focused or almost focused by the continuous AF means closer to the nearest point side than a threshold.

According to the imaging device of the twenty-fifth aspect of the present invention, if the photographic subject on which the focus is attained in the continuous AF is positioned at a close range, the multipoint ranging is not performed even when focusing is attained or almost attained. This can further inhibit the execution of the multipoint ranging.

To attain the object, a twenty-sixth aspect of the present invention provides the imaging device according to any one of the first to twenty-fifth aspects, further including second continuous AF means for repeating focus adjustment of the imaging optical system to focus on the main photographic subject when the main photographic subject recognition means recognizes the main photographic subject.

According to the imaging device of the twenty-sixth aspect of the present invention, when the main photographic subject is recognized, the continuous AF is performed to focus on the recognized main photographic subject. As a result, the main photographic subject can be continuously focused.

To attain the object, a twenty-seventh aspect of the present invention provides the imaging device according to the twenty-sixth aspect, further including second scene change detection means for detecting a change of the scene captured by the imaging means after the focus adjustment by the second continuous AF means starts, wherein the control means switches to the focus adjustment by the continuous AF means when the second scene change detection means detects the change of the scene According to the imaging device of the twenty-seventh aspect of the present invention, after the main photographic subject is recognized, if a change of the scene is detected in the continuous AF performed with the focus area set to the recognized main photographic subject, a normal continuous AF is restored. More specifically, the focus area is set to the preset position again (generally, center) and the continuous AF is performed. As a result, the process for detecting the main photographic subject can be appropriately performed.

To attain the object, a twenty-eighth aspect of the present invention provides the imaging device according to any one of the first to twenty-seventh aspects, further including: imaging preparation instruction means for instructing imaging preparation; imaging preparation means for performing focus adjustment to focus on the main photographic subject recognized by the main photographic subject recognition means according to an instruction of the imaging preparation by the imaging preparation instruction means and for calculating an exposure value for proper exposure of the main photographic subject recognized by the main photographic subject recognition means; actual imaging instruction means for instructing actual imaging; imaging control means for controlling the imaging means to capture an image with the exposure value calculated by the imaging preparation means according to an instruction of the actual imaging by the actual imaging instruction means; and recording control means for recording the image captured by the imaging means in a medium according to the instruction of the actual imaging by the actual imaging instruction means.

According to the imaging device of the twenty-eighth aspect of the present invention, when the photographing preparation is instructed, the focus adjustment is performed to focus on the recognized main photographic subject, and the exposure value is calculated for proper exposure of the recognized main photographic subject. More specifically, AE (Auto Exposure) and AF processes are performed based on (with reference to) the recognized main photographic subject. The actual photographing is performed based on the results of the AE and AF. As a result, the main photographic subject can be appropriately imaged.

To attain the object, a twenty-ninth aspect of the present invention provides the imaging device according to any one of the first to twenty-eighth aspects, further including automatic tracking means for performing automatic tracking by setting the main photographic subject as a target of the automatic tracking when the main photographic subject recognition means recognizes the main photographic subject.

According to the imaging device of the twenty-ninth aspect of the present invention, when the main photographic subject is recognized, the recognized main photographic subject is set as a target of automatic tracking, and the automatic tracking is performed. As a result, efforts for manually setting the target of the automatic tracking can be saved in the imaging device with an automatic tracking mechanism, and the device can provide excellent usability.

To attain the object, a thirtieth aspect of the present invention provides a main photographic subject recognition method including: a step of performing continuous AF to focus on a photographic subject in a specific focus area set in an imaging area of imaging means; a step of terminating the continuous AF, changing a focal position of an imaging optical system within a predetermined search range and performing multipoint ranging when focusing on the photographic subject is attained or almost attained in the specific focus area in the continuous AF; and a step of recognizing a main photographic subject in the imaging area based on distance information of each ranging area obtained by the multipoint ranging.

According to the main photographic subject recognition method of the thirtieth aspect of the present invention, the multipoint ranging is executed only when focusing is attained or almost attained in the continuous AF. This can prevent performing the multipoint ranging more than necessary. The fact that focusing is attained or almost attained in the continuous AF also serves as an indicator that the scene is stabilized. Therefore, the accuracy of the distance information when the multipoint ranging is performed is high. As a result, the main photographic subject can be accurately recognized. Even if the main photographic subject is in an area other than the focus area (generally, center) of the continuous AF, the main photographic subject can be recognized.

To attain the object, a thirty-first aspect of the present invention provides a main photographic subject recognition method including: a step of performing continuous AF to focus on a photographic subject in a specific focus area set in an imaging area of imaging means; a step of terminating the continuous AF, changing a focal position of an imaging optical system within a predetermined search range and performing multipoint ranging when a change of a scene captured by the imaging means is detected while the continuous AF is performed; and a step of recognizing a main photographic subject in the imaging area based on distance information of each ranging area obtained by the multipoint ranging.

According to the main photographic subject recognition method of the thirty-first aspect of the present invention, the multipoint ranging is executed only when the photographing scene has changed. This can inhibit performing the multipoint ranging more than necessary.

To attain the object, a thirty-second aspect of the present invention provides a main photographic subject recognition method including: a step of starting counting; a step of performing continuous AF to focus on a photographic subject in a specific focus area set in an imaging area of imaging means; a step of terminating the continuous AF, changing a focal position of an imaging optical system in a predetermined search range and performing multipoint ranging when a count value exceeds a threshold; and a step of recognizing a main photographic subject in the imaging area based on distance information of each ranging area obtained by the multipoint ranging.

According to the main photographic subject recognition method of the thirty-second aspect of the present invention, monitoring operation is performed by the counting means, and the multipoint ranging is executed when the count value exceeds the threshold. When the multipoint ranging is executed, the count value is reset, and the count is restarted again. This can inhibit frequent execution of the multipoint ranging.

To attain the object, according to a thirty-third aspect of the present invention, in the main photographic subject recognition method according to the thirtieth aspect, in the step of performing the multipoint ranging, when focusing on the photographic subject is attained or almost attained in the specific focus area in the continuous AF and a change of a scene captured by the imaging means is detected, the multipoint ranging is performed with the focal position of the imaging optical system changed within the predetermined search range.

According to the main photographic subject recognition method of the thirty-third aspect of the present invention, the multipoint ranging is executed when focusing is attained or almost attained in the continuous AF and the photographing scene has changed. More specifically, even when focusing is attained or almost attained in the continuous AF, the multipoint ranging is not executed if there is no change in the photographing scene. As a result, the multipoint ranging can be executed at more appropriate timing. The fact that focusing is attained or almost attained in the continuous AF also serves as an indicator that the scene is stabilized. Therefore, the accuracy of the distance information when the multipoint ranging is performed is high. As a result, the main photographic subject can be accurately recognized. Even if the main photographic subject is in an area other than the focus area (generally, center) of the continuous AF, the main photographic subject can be recognized.

To attain the object, a thirty-fourth aspect of the present invention provides the main photographic subject recognition method according to the thirtieth aspect, further including: a step of starting counting before the continuous AF is performed, wherein in the step of performing the multipoint ranging, when focusing on the photographic subject is attained or almost attained in the specific focus area in the continuous AF and a change of a scene captured by the imaging means is detected and a count value exceeds a threshold, the multipoint ranging is performed with the focal position of the imaging optical system changed within the predetermined search range.

According to the main photographic subject recognition method of the thirty-fourth aspect of the present invention, the multipoint ranging is executed when focusing is attained or almost attained in the continuous AF, the scene change is detected and the count value exceeds the threshold. More specifically, the multipoint ranging is not executed if there is no change in the photographing scene, even if focusing is attained or almost attained in the continuous AF. As a result, the multipoint ranging can be executed at more appropriate timing.

According to the present invention, the change in the angle of view caused by the multipoint ranging can be prevented, and the main photographic subject can be accurately recognized.

DETAILED DESCRIPTION OF THE EMBODIMENTS

Preferred embodiments of the present invention will now be described in detail with reference to the drawings.

<<Overall Configuration>>

Figure 1:
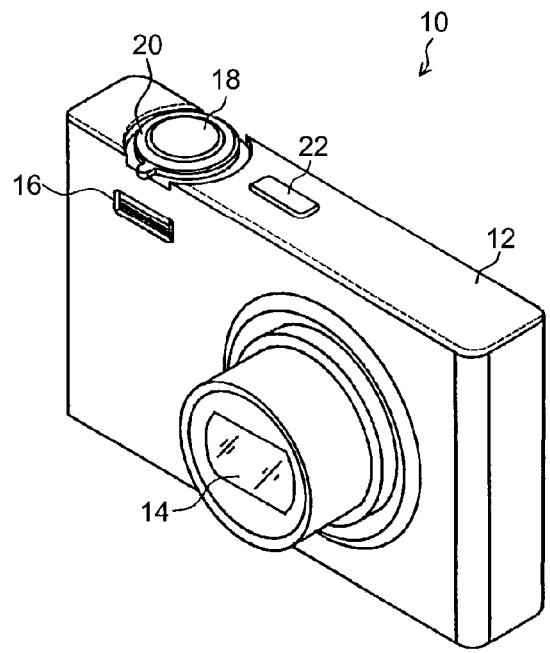
FIG. 1 is an external view showing an example of a digital camera of the present invention.
Figure 2:
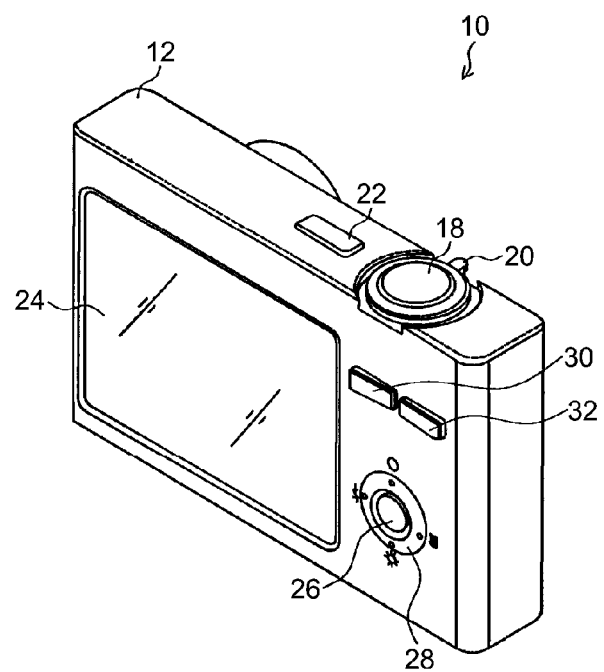
FIG. 2 is an external view showing an example of the digital camera of the present invention.

FIGS. 1 and 2 are external views showing an example of a digital camera to which the present invention is applied.

As shown in FIGS. 1 and 2, a digital camera 10 is a so-called compact-type digital camera.

An imaging lens 14, a flash 16, and the like are arranged on a front surface of a camera body 12 formed in a thin, rectangular box-shape in a front-back direction. On an upper surface, a release button 18, a zoom lever 20, a power button 22, and the like are arranged. On a back surface, a monitor 24, a menu/OK button 26, a cross button 28, a Back button 30, a replay button 32, and the like are arranged.

The imaging lens 14 is formed by a collapsible zoom lens, and when the power of the digital camera 10 is turned on, the imaging lens 14 is drawn out from the camera body 12.

The flash 16 is formed by, for example, a xenon tube and emits light as necessary.

The release button 18 is formed by a two-stage press button capable of so-called "half-press" and "full-press". When the release button 18 is half-pressed, an instruction of photographing preparation (S1) is input to the digital camera 10. When the release button 18 is full-pressed, an instruction of actual photographing (S2) is input to the digital camera 10.

The zoom lever 20 is arranged to be able to horizontally swing around the release button 18. When the zoom lever 20 is operated in one direction, a zoom instruction in a telephoto direction is input to the digital camera 10. When the zoom lever 20 is operated in the other direction, a zoom instruction in a wide direction is input to the digital camera 10.

The power button 22 is formed by a press button. If the power button 22 is pressed when the power of the digital camera 10 is off, the power of the digital camera 10 is turned on. If the power button 22 is pressed for a certain time when the power of the digital camera 10 is on, the power of the digital camera 10 is turned off.

The monitor 24 is formed by, for example, a liquid crystal display. Since the digital camera 10 of the present embodiments does not include an optical viewfinder, the monitor 24 is used as an electronic viewfinder (live view monitor). More specifically, during photographing, the monitor 24 displays images captured by the imaging element in real time. The photographer views the images (through images) displayed on the monitor 24 in real time to check a focus state, a composition, and the like. The monitor 24 is used to replay the photographed images (taken images) and is also used as a setting screen in various settings of the digital camera 10.

The menu/OK button 26 functions as an operation button of an instruction for calling out a menu screen and functions as a button of an instruction for confirmation.

The cross button 28 can be pressed and operated in vertical and horizontal four directions, and functions according to the state of the digital camera 10 of the moment are allocated. For example, during a photographing mode, a switch of a macro function is allocated to the right button, and a function for switching a stroboscopic mode is allocated to the left button. During a replay mode, a function for advancing one frame is allocated to the right button, and a function for rewinding one frame is allocated to the left button.

The Back button 30 functions as a button of an instruction for canceling input operation information or the like, and the replay button 32 functions as a button of an instruction for switching to the replay mode.

Figure 3:
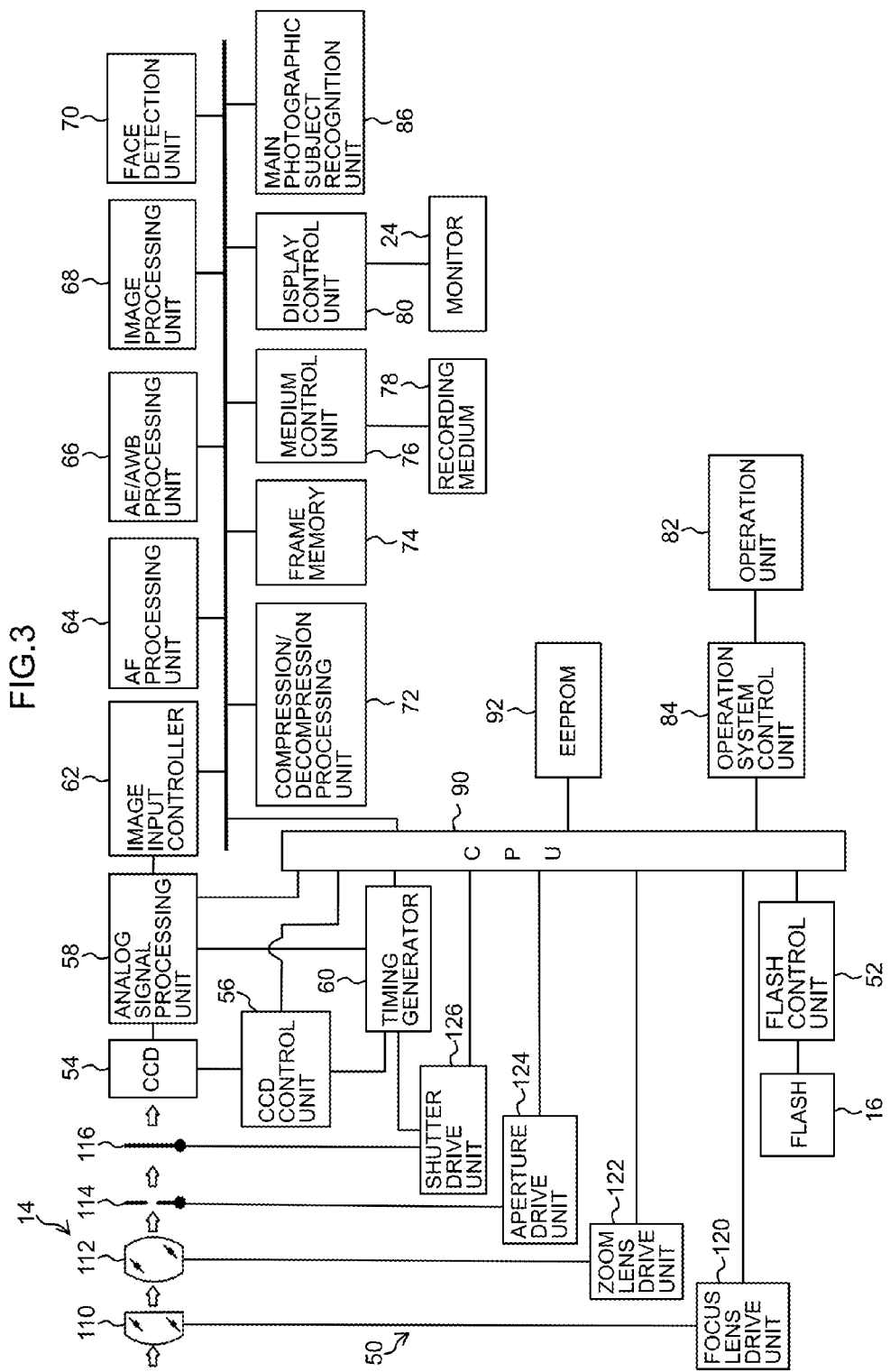
FIG. 3 is a block diagram showing a functional configuration of the digital camera.

FIG. 3 is a block diagram showing a functional configuration of the digital camera 10.

As shown in FIG. 3, the digital camera 10 includes the imaging lens 14, a lens drive unit 50, the flash 16, a flash control unit 52, an imaging element 54, a CCD (Charge Coupled Device) control unit 56, an analog signal processing unit 58, a timing generator 60, an image input controller 62, an AF (Auto Focus) processing unit 64, an AE/AWB (Auto Exposure/Auto White Balance) processing unit 66, an image processing unit 68, a face detection unit 70, a compression/decompression processing unit 72, a frame memory 74, a medium control unit 76, a recording medium 78, a display control unit 80, the monitor 24, an operation unit (the release button 18, the zoom lever 20, the power button 22, the menu/OK button 26, the cross button 28, the Back button 30, the replay button 32, and the like) 82, an operation system control unit 84, a main photographic subject recognition unit 86, a CPU (Central Processing Unit) 90, an EEPROM (Electronically Erasable and Programmable Read Only Memory) 92, and the like. The CCD is an illustration of the imaging element. Other than the CCD, examples of the imaging element include a MOS (Metal-Oxide Semiconductor) sensor and a CMOS (Complementary Metal-Oxide Semiconductor) sensor.

The imaging lens 14 includes a focus lens 110, a zoom lens 112, an aperture 114, and a shutter 116. The focus lens 110 and the zoom lens 112 are arranged to be able to move back and forth along an optical axis. The focus lens 110 is moved to perform focus adjustment (focusing), and the zoom lens 112 is moved to perform scale adjustment (zooming).

The aperture 114 is formed by, for example, an iris aperture and adjusts an amount of light incident on the imaging element 54.

The shutter 116 is formed by a mechanical shutter and blocks incidence of light on the imaging element 54.

The lens drive unit 50 includes a focus lens drive unit 120 that drives the focus lens 110, a zoom lens drive unit 122 that drives the zoom lens 112, an aperture drive unit 124 that drives the aperture 114, and a shutter drive unit 126 that drives the shutter 116.

The focus lens drive unit 120 includes a motor and a motor driver and drives the focus lens 110 in steps according to a command from the CPU 90 to move the focus lens 110 back and forth along the optical axis.

The zoom lens drive unit 122 includes a motor and a motor driver, and drives the zoom lens 112 in steps according to a command from the CPU 90 to move the zoom lens 112 back and forth along the optical axis.

The aperture drive unit 124 includes a motor and a motor driver and drives the aperture 114 in steps according to a command from the CPU 90 to expand and reduce the aperture diameter.

The shutter drive unit 126 includes a motor and a motor driver and opens and closes the shutter 116 according to a command from the CPU 90.

The flash control unit 52 controls light emission operation of the flash 16 according to a command from the CPU 90.

The imaging element 54 is arranged behind the imaging lens 14 and takes an image captured by the imaging lens 14. The imaging element 54 is formed by, for example, a color CCD with a predetermined color filter array (hereinafter, called "CCD"). In synchronization with a vertical transfer clock signal and a horizontal transfer clock signal supplied from the CCD control unit 56, the CCD 54 outputs, as serial analog image data, electric charge stored in each pixel, line by line.

The CCD control unit 56 controls drive of the CCD 54 according to a command from the CPU 90.

The analog signal processing unit 58 imports the analog image data output from the CCD 54 and applies required analog signal processing (such as correlated double sampling process and gain adjustment) to the data. The analog signal processing unit 58 then converts the data to digital image data (CCD-RAW data with RGB density values of pixels) and outputs the data.

The timing generator 60 generates a predetermined timing signal according to a command from the CPU 90 and outputs the timing signal to the shutter drive unit 126, the CCD control unit 56, and the analog signal processing unit 58. The timing signal output from the timing generator 60 synchronizes processing by the units.

The image input controller 62 imports the digital image data (CCD-RAW data) output from the analog signal processing unit 58 and writes the data in the frame memory 74.

The frame memory 74 is used as a storage area of the image data (CCD-RAW data) imported from the CCD 54 and is also used as an operation area in the execution of various processes.

The AF processing unit 64 detects a focal position based on the image data (CCD-RAW data) captured by the CCD 54. The AF processing unit 64 will be described in detail later.

Based on the image data (CCD-RAW data) captured by the CCD 54, the AE/AWB processing unit 66 measures photographic subject luminance and determines exposure values (such as aperture value, shutter speed, and ISO sensitivity (ISO: International Organization for Standardization)). The AE/AWB processing unit 66 also detects a light source type based on the image captured by the CCD 54 and determines a white balance correction value.

The image processing unit 68 applies required digital signal processing to the image (CCD-RAW data) captured by the CCD 54 and generates image data of YCrCb including luminance data and color difference data. The generated image data of YCrCb is stored in the frame memory 74.

The face detection unit 70 analyzes the image data of YCrCb generated by the image processing unit 68 and detects a face area of a person.

The compression/decompression processing unit 72 applies a predetermined compression process (for example, a compression process based on a JPEG (Joint Photographic Experts Group) system) to the image data of YCrCb generated by the image processing unit 68 to generate compressed image data. The compression/decompression processing unit 72 also applies a predetermined expansion process to the compressed image data to generate uncompressed image data (image data of YCrCb).

The medium control unit 76 reads and writes data to and from the recording medium 78 according to a command from the CPU 90.

The recording medium 78 is formed by, for example, a memory card and is removably loaded on a card slot arranged on the camera body 12. The recording medium 78 can also be embedded to the camera body 12.

The display control unit 80 controls display on the monitor 24 according to a command from the CPU 90. As described, the digital camera 10 of the present embodiments displays through images on the monitor 24 during photographing. The display control unit 80 imports the image data of YCrCb imported from the CCD 54 and generated by applying required signal processing. The display control unit 80 converts the image data to a signal format for display and outputs the image data to the monitor 24. In this way, the through images are displayed on the monitor 24. During replay, the display control unit 80 imports image data read from the recording medium 78 and subjected to a predetermined expansion process. The display control unit 80 converts the image data to a signal format for display and outputs the image data to the monitor 24. In this way, taken images are displayed on the monitor 24.

The operation system control unit 84 outputs an operation signal to the CPU 90 according to the operation of the operation unit (the release button 18, the zoom lever 20, the power button 22, the menu/OK button 26, the cross button 28, the Back button 30, the replay button 32, and the like) 82.

The main photographic subject recognition unit 86 executes a recognition process of a main photographic subject based on a result of multipoint ranging by the AF processing unit 64. This will be described in detail later.

The CPU 90 is control means for comprehensively controlling operation of the digital camera 10 and controls the components of the digital camera 10 according to a predetermined control program. The CPU 90 also executes predetermined arithmetic processing according to a predetermined arithmetic processing program.

The EEPROM 92 stores various programs executed by the CPU 90, data necessary for the control, and the like.

<<Basic Operation>>

Basic imaging and replay operation of the digital camera 10 will be described.

If the power button 22 is pressed when the power is off, the digital camera 10 is activated in a photographing mode. If the replay button 32 is pressed for a certain time when the power is off, the digital camera 10 is activated in a replay mode.

The digital camera 10 activated in the photographing mode switches to the replay mode when the replay button 32 is pressed during the photographing mode. When the release button 18 is half-pressed during the replay mode, the digital camera 10 switches to the photographing mode.

When the photographing mode is set, a display process of through images is started. The through images are displayed by consecutively capturing images at a certain frame rate. The consecutively captured images are consecutively processed and output to the monitor 24 to thereby display images captured by the CCD 54 on the monitor 24 in real time. The photographer views the trough images displayed on the monitor 24 in real time to check the focus state, the composition, and the like.

The actual photographing (photographing for recording images in the recording medium 78) is executed by half-pressing the release button 18 and then full-pressing the release button 18.

When the release button 18 is half-pressed, photographing preparation is performed, and processes of AE, AF, and AWB are performed. More specifically, photographic subject luminance is measured, and exposure values (aperture value, shutter speed, ISO sensitivity, and the like) are determined. A light source type is detected, and a white balance correction value is determined. Focus adjustment is also performed to focus on the main photographic subject.

After the photographing preparation, the actual photographing is executed when the release button 18 is full-pressed. More specifically, photographing for recording is performed with the exposure values determined in the AE process. Required signal processing is applied to the obtained image data, and the image data is recorded in the recording medium 78.

The image data recorded in the recording medium 78 can be replayed and displayed on the monitor 24 by setting the mode of the digital camera 10 to the replay mode.

When the replay mode is set, the image data recorded lastly in the recording medium 78 is read out, and required signal processing is applied. The image data is replayed and displayed on the monitor 24. Subsequently, when operation of frame advancing/frame rewinding is performed in the operation unit 82, the photographed images are sequentially replayed and displayed according to the operation.

<<Configuration of AF Processing Unit>>

The AF processing unit 64 applies required signal processing to the image data (CCD-RAW data) imported from the image input controller 62 and calculates a focus evaluation value.

Figure 4:
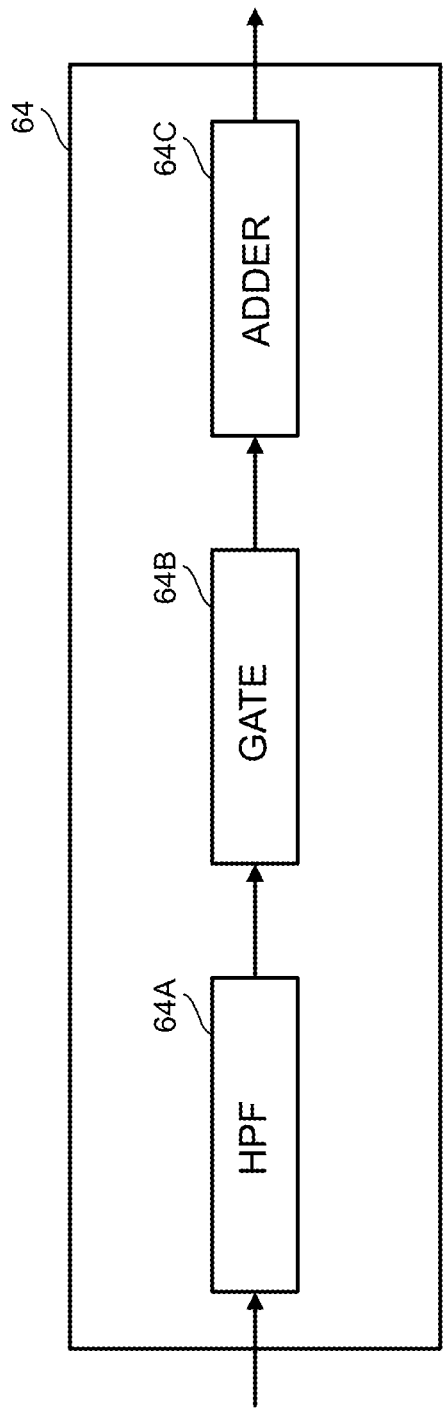
FIG. 4 is a block diagram showing a functional configuration of an AF processing unit.

FIG. 4 is a block diagram showing a functional configuration of an AF processing unit. As shown in FIG. 4, the AF processing unit 64 includes a high-pass filter (HPF) 64A, a gate 64B, and an adder 64C.

The high-pass filter 64A extracts high frequency components included in image data. More high frequency components of an image are included in a luminance signal with an increase in the sharpness (contrast) of the image. Therefore, the high frequency components can be integrated to numerically express the level of the sharpness of an average image in the range. The numerical expression of the sharpness of the image will be called a focus evaluation value.

Figure 5:
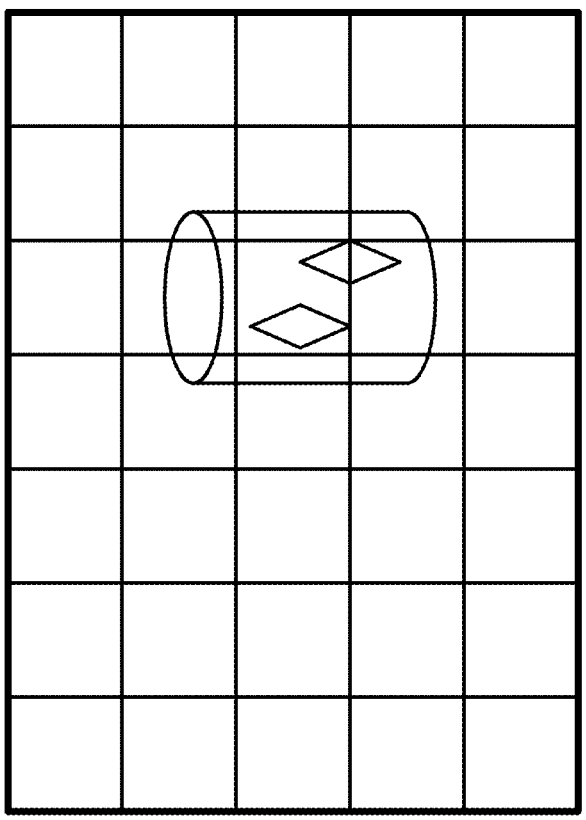
FIG. 5 is a diagram showing a division example of ranging areas.

The image data after the extraction of the high frequency components by the high-pass filter 64A is input to the gate 64B. The gate 64B vertically and horizontally divides the image data n×m and outputs the data to the adder 64C. In the present example, the gate 64B vertically and horizontally divides the image data 5×7 as shown in FIG. 5 and outputs the data to the adder 64C. This illustration is not intended to limit the number of divisions.

The adder 64C integrates the high frequency components of the image data in each divided area to calculate the focus evaluation value of each area.

Information of the calculated focus evaluation value of each area is output to the CPU 90. Based on the information of the focus evaluation value of each area, the CPU 90 executes focus adjustment and a recognition process of a main photographic subject.

<<Focus Adjustment>>

Focus adjustment operation will be described first.

The system of the focus adjustment includes one-shot AF and continuous AF. In the one-shot AF, focusing is performed by performing search operation just once to detect the focal position in order to focus on the photographic subject in a specific focus area. On the other hand, in the continuous AF, focus adjustment is repeated in order to continuously focus on the photographic subject in a specific focus area.

<One-Shot AF>

The one-shot AF will be described first.

As described, in the one-shot AF, the search operation is performed just once to detect the focal position in order to focus on the photographic subject in the specific focus area.

When a focusing command (for example, half-press of the release button) is input, the CPU 90 moves the focus lens 110 from a nearest end to an infinity end. In the process of the movement of the focus lens 110 from the nearest end to the infinity end, the images are sequentially imported, and the AF processing unit 64 sequentially calculates the focus evaluation values.

The CPU 90 acquires information of the focus evaluation values sequentially calculated by the AF processing unit 64.

The information of the focus evaluation values acquired from the AF processing unit 64 is information of the focus evaluation value of each area. Therefore, the CPU 90 extracts information of the focus evaluation value of the area equivalent to a preset focus area from the obtained information of the focus evaluation value of each area. The CPU 90 detects a position where the extracted focus evaluation value of the focus area is the local local maximum (peak).

As described, the focus evaluation value is numerical expression of the sharpness (contrast) of the image. Therefore, the position with the local maximum value is a position where the photographic subject image is taken most sharply, and the position can be assumed as the focal position. Therefore, the CPU 90 detects the position where the focus evaluation value is the local maximum in the range (focus evaluation value search range) from the nearest end to the infinity end and sets the position as the focal position.

The CPU 90 moves the focus lens 110 to the position detected as the focal position and ends the focus adjustment process.

In this way, in the one-shot AF, the position where the focus evaluation value is the local maximum is detected by one search, and the focus lens 110 is moved to the detected position to perform focusing.

<Continuous AF>

In the continuous AF, the focus adjustment is repeated to continuously focus on the photographic subject in the specific focus area.

Figure 6:
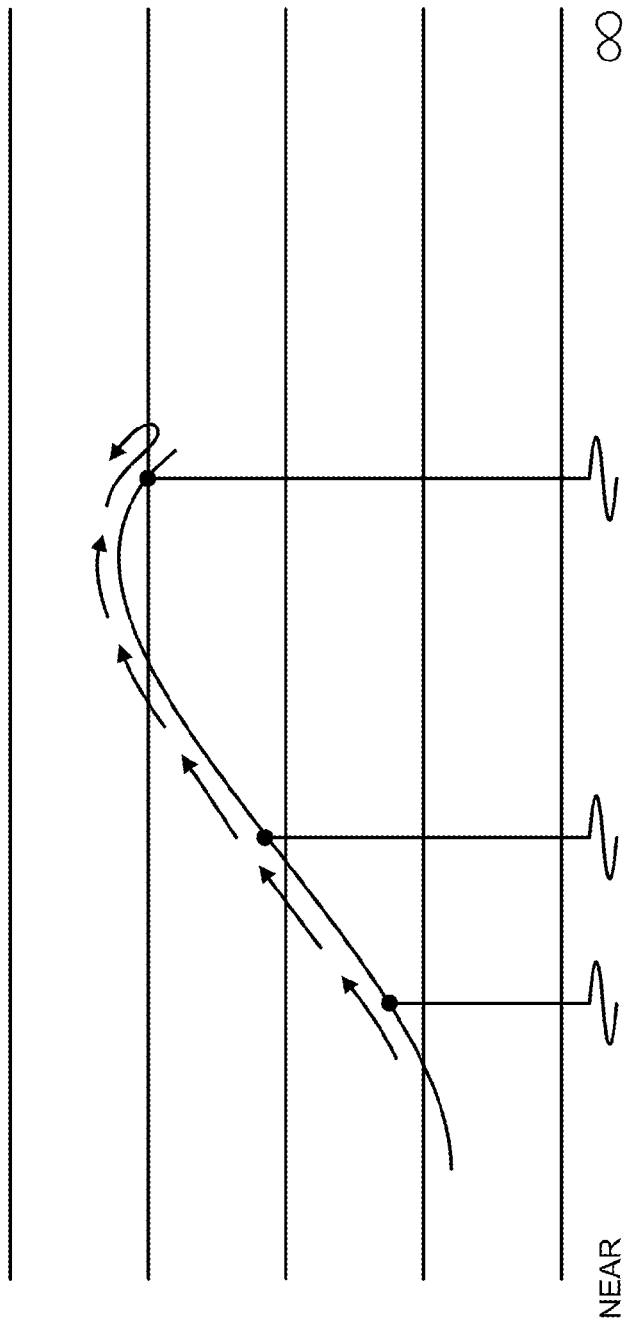
FIG. 6 is a conceptual diagram of continuous AF.

When a focusing command is input, the CPU 90 sets the focus lens 110 to the focal position by hill-climbing control. More specifically, as shown in FIG. 6, the CPU 90 slightly moves (wobbles) the focus lens 110 back and forth to check an increase and decrease direction of the focus evaluation value of the specific focus area and gradually moves the focus lens 110 to a position where the focus evaluation value is the local maximum. The CPU 90 continuously wobbles the focus lens 110 after the detection of the position where the focus evaluation value is the local maximum and checks the increase and decrease of the focus evaluation value. The CPU 90 detects a position where the focus evaluation value is the local maximum and moves the focus lens 110 to the position.

In this way, in the continuous AF, the increase and decrease of the focus evaluation value is always checked after the detection of the focal position, and the focus state is maintained.

<<Recognition of Main Photographic Subject>>

As described, the AF processing unit 64 calculates the information of the focus evaluation value of each area when the screen is divided into a plurality of areas (calculates information of focus evaluation values of 35 areas divided 5×7 in the present example).

Therefore, when the focus lens 110 is moved from the nearest end to the infinity end, the information of the focus evaluation value can be acquired in each area (area by area).

Therefore, when the focus lens 110 is moved from the nearest end to the infinity end, the position where the focus evaluation value is the local maximum can be detected in each area, and the focal position can be detected in each area.

In addition, since the focal position is a position for focusing the photographic subject belonging to the area, the distance from the detected focal position to the photographic subject can be calculated.

More specifically, the focus lens 110 is moved from the nearest end to the infinity end to acquire the information of the focus evaluation value of each area, and the position where the value is the local maximum is detected. In this way, a photographic subject distance in each area can be measured (multipoint ranging).

The ranging information of each area (ranging area) subjected to the multipoint ranging can be used to recognize the position of the main photographic subject existing in the screen.

In general, it is likely that a photographic subject closer to the center of the screen is the main photographic subject, and it is likely that a photographic subject at a closer range (nearer to the camera) is the main photographic subject. Therefore, the ranging information of each area (ranging area) metered by the multipoint ranging and the information of the position can be used to recognize the main photographic subject.

Specifically, based on two hypotheses that "it is likely that a photographic subject closer to the center of the screen is the main photographic subject" and that "it is likely that a photographic subject at a closer range is the main photographic subject", the distance and the position in the screen are weighted and added to numerically express main photographic subject likelihood. The area where the numeric value is the maximum is recognized as the position of the main photographic subject.

The main photographic subject recognition unit 86 acquires the distance information of each ranging area metered by the multipoint ranging. The main photographic subject recognition unit 86 performs predetermined weighted addition to specify the position of the main photographic subject and outputs the position to the CPU 90.

In this way, the multipoint ranging can be executed to recognize the position of the main photographic subject in the screen.

As described, the focus lens 110 needs to be moved from the nearest end to the infinity end to perform the multipoint ranging.

Meanwhile, when the focus lens 110 is moved from the nearest end to the infinity end, an angle of view is changed during the movement.

Therefore, if the recognition operation of the main photographic subject is frequently performed during the display of the through images, the screen of the monitor 24 is significantly hard to see due to the change in the angle of view.

Therefore, the frequency of the change in the angle view is reduced as follows in the digital camera 10 of the present embodiments.

First Embodiment

Figure 7:
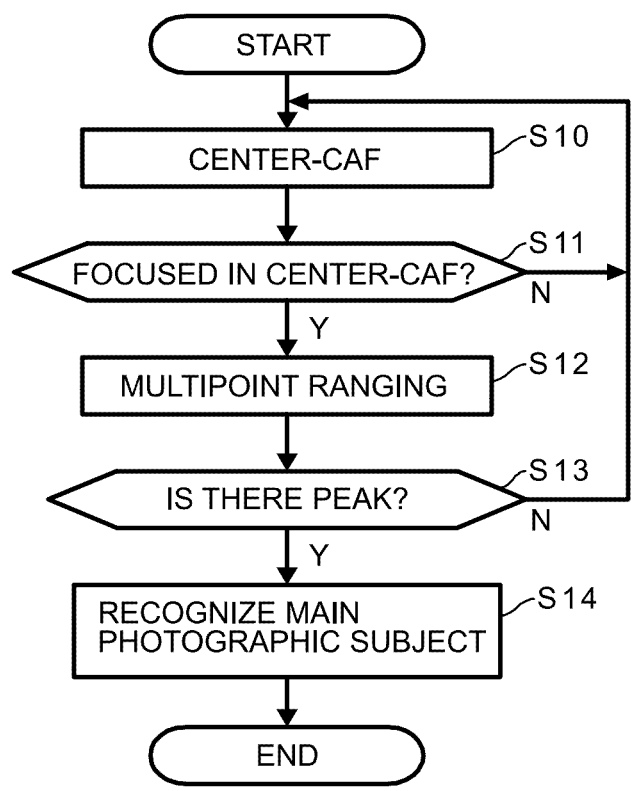
FIG. 7 is a flow chart showing a first embodiment of a procedure of a recognition process of a main photographic subject.

FIG. 7 is a flow chart showing a first embodiment of the procedure of the recognition process of the main photographic subject.

A focus area is set to the screen center, and continuous AF (center continuous (center-CAF)) is performed (step S10).

Whether focusing is attained in the executed center continuous AF is determined (step S11).

If focusing is not attained, the center continuous AF is continuously executed (step S10).

On the other hand, if focusing is attained, the center continuous AF is terminated, and multipoint ranging is carried out (step S12).

The main photographic subject recognition unit 86 acquires the information of the focus evaluation value of each ranging area obtained by the multipoint ranging and detects the position where the focus evaluation value is the local maximum (peak) in each ranging area. Based on the detection result, whether there is a ranging area in which the peak is detected is determined (step S13). More specifically, whether the peak is detected is determined in each ranging area. In this case, it is assumed that the peak is not detected when the peak is not (cannot be) detected as well as when the detected peak (local maximum value) is smaller than a preset threshold.

As a result of the determination, if it is determined that there is no ranging area in which the peak is detected, the process returns to step S10, and the center continuous AF is performed again. More specifically, since the main photographic subject cannot be recognized in this case, the center continuous AF is performed again to perform the process again from the beginning.

On the other hand, if it is determined that there is a ranging area in which the peak is detected, the recognition process of the main photographic subject is executed (step S14).

In this way, the center continuous AF is carried out in the present embodiment, and the multipoint ranging is carried out only when focusing is attained in the center continuous AF. The recognition process of the main photographic subject is then performed. As a result, the number of executions of the multipoint ranging can be reduced, and the situation that the screen is hard to see can be prevented even if the recognition process of the main photographic subject is performed during the display of the through images.

In addition, the fact that focusing is attained in the continuous AF also serves as an indicator that the scene is stabilized. Therefore, the accuracy of the measurement result of subsequent multipoint ranging is also high. As a result, the main photographic subject can be recognized more accurately.

Since focusing is always performed in the continuous AF, it is hard to attain focusing when the photographic subject is moving, for example. Meanwhile, the closeness to the focus state can be determined from the detection state of the peak and so on. Therefore, the same effect can be attained by executing the multipoint ranging not only when focusing is completely attained, but also when focusing is almost attained.

In the present embodiment, the focus area is set to the screen center to perform the continuous AF (center continuous AF) when the continuous AF is performed before the multipoint ranging. However, the continuous AF performed before the multipoint ranging does not always have to be performed by setting the focus area at the screen center. For example, the continuous AF can be performed in a focus area arbitrarily set by the photographer.

Second Embodiment

Figure 8:
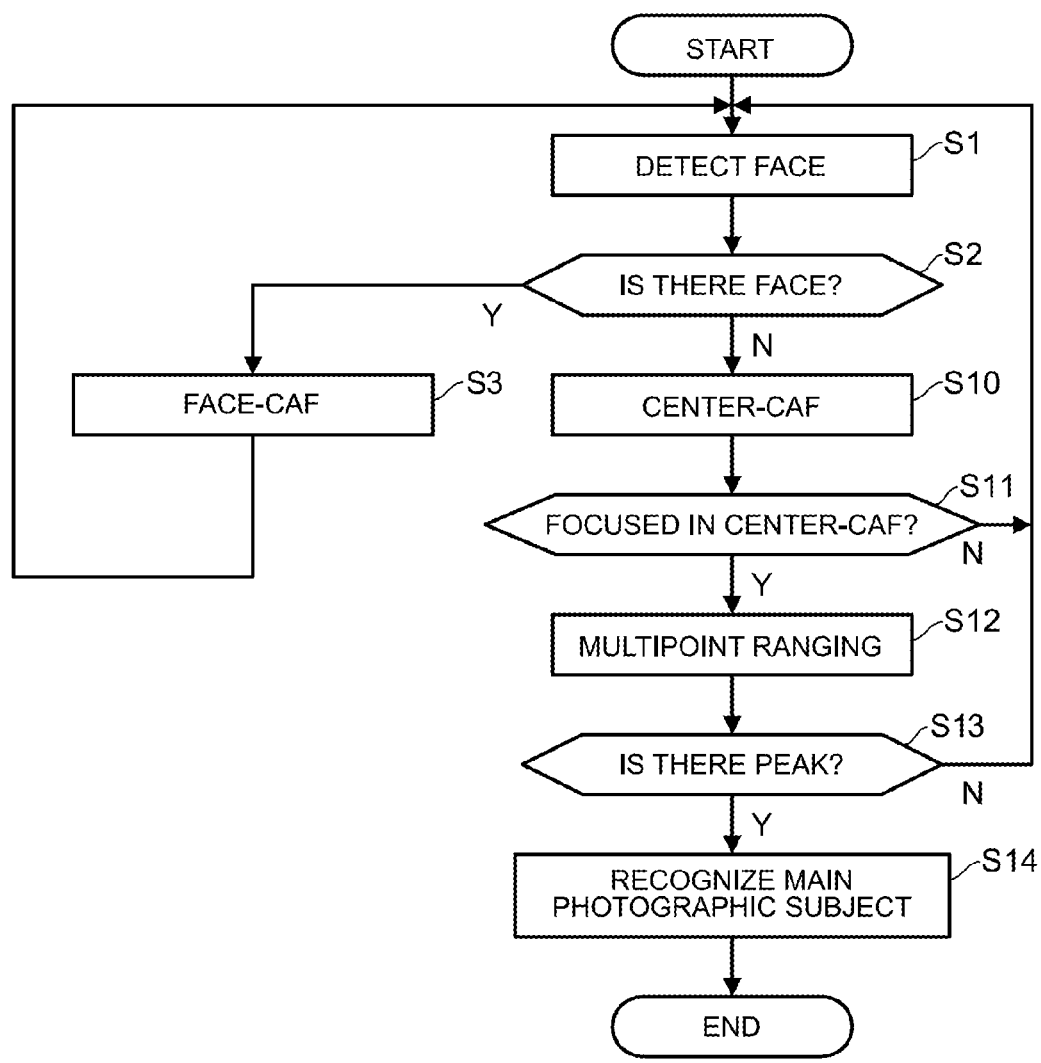
FIG. 8 is a flow chart showing a second embodiment of the procedure of the recognition process of the main photographic subject.

FIG. 8 is a flow chart showing a second embodiment of the procedure of the recognition process of the main photographic subject.

As shown in FIG. 8, face detection is performed in the present embodiment, and the recognition process of the main photographic subject of the first embodiment is executed only when a face is not detected. More specifically, if a face is detected, the face is recognized as the main photographic subject.

A process of face detection is performed (step S1), and whether a face is detected is determined (step S2).

If a face is detected, the focus area is set to the position of the detected face, and face continuous AF is performed (step S3). The face continuous AF is performed until the face is not detected.

On the other hand, if a face is not detected, the recognition process of the main photographic subject described in the first embodiment (steps S10 to S14) is executed.

Since the face detection can be performed by image analysis without performing the multipoint ranging, the main photographic subject can be recognized without changing the angle of view.

Third Embodiment

Figure 9A:
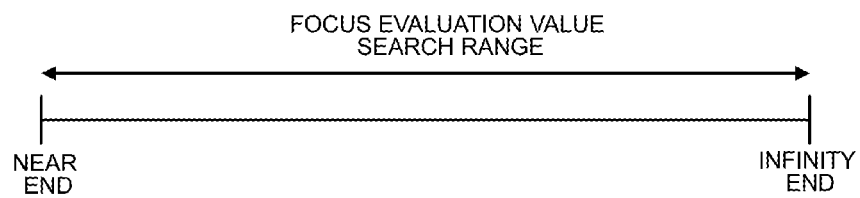
FIG. 9A is an explanatory diagram of a third embodiment of the recognition process of the main photographic subject (part 1).

In the embodiments described above, the focus lens 110 is moved from the nearest end to the infinity end in the multipoint ranging to acquire the focus evaluation value (see FIG. 9A). More specifically, the focus evaluation value search range is set to the same range as in the normal one-shot AF to perform the multipoint ranging.

Meanwhile, the main photographic subject often exists at the screen center as described above. Therefore, when focusing is attained (or when focusing is almost attained) in the center continuous AF, it is contemplated that the probability that the main photographic subject is near the focus is high.

Figure 9B:
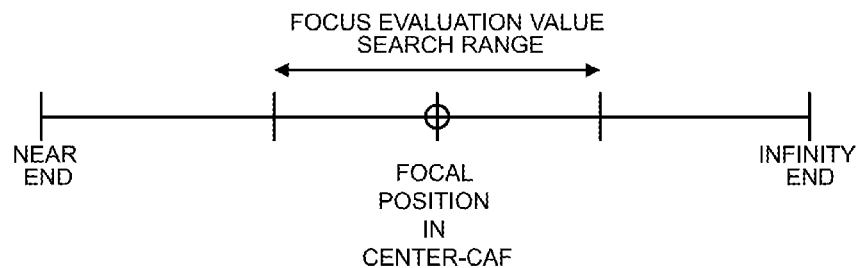
FIG. 9B is an explanatory diagram of the third embodiment of the recognition process of the main photographic subject (part 2).

Therefore, in the present embodiment, when focusing is attained (or when focusing is almost attained) in the center continuous AF as shown in FIG. 9B, the multipoint ranging is performed for the focus evaluation value search range which is limited to a predetermined range around (in the vicinity of) the focus.

In this way, the focus evaluation value search range can be limited to reduce the search time. This can speed up the multipoint ranging. The power consumption can also be reduced by reducing the drive distance of the focus lens 110. The change in the angle of view in the multipoint ranging can also be prevented, and the screen can be more easily viewed.

Fourth Embodiment

As in the third embodiment, the focus evaluation value search range can be limited to reduce the search time, for example.

Meanwhile, when a photographic subject exists outside of the limited focus evaluation value search range, the photographic subject cannot be captured even if the multipoint ranging is executed.

Therefore, while the focus evaluation value search range is limited in the present embodiment, when the photographic subject is not detected in the limited focus evaluation value search range, the focus evaluation value search range is expanded and the multipoint ranging is executed again.

Figure 10:
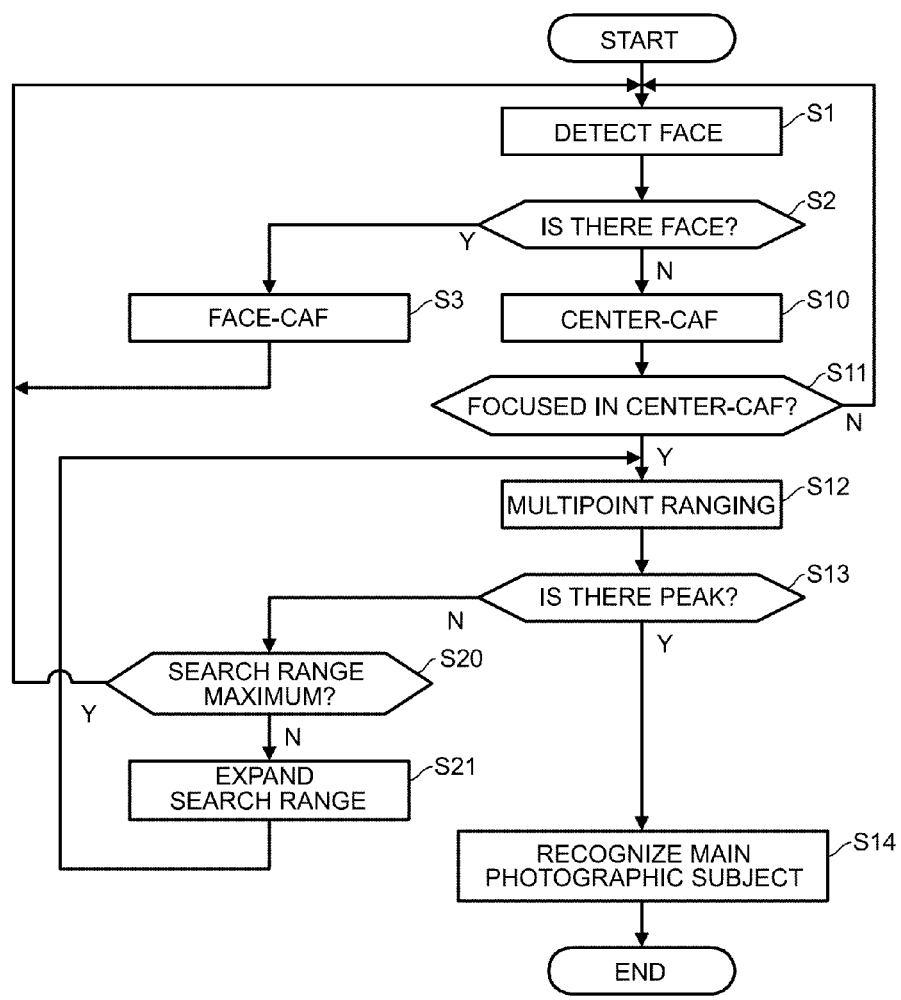
FIG. 10 is a flow chart showing a fourth embodiment of the procedure of the recognition process of the main photographic subject.

FIG. 10 is a flow chart showing a procedure of a recognition process of the primary photographic object according to the present embodiment (fourth embodiment).

The procedure is the same as the procedure of the recognition process of the main photographic subject of the second embodiment, except that the focus evaluation value search range is expanded and the multipoint ranging is performed step-by step. Therefore, only the step-by-step execution of the multipoint ranging will be described here.

When focusing is attained in the center continuous AF (or when focusing is almost attained), the focus evaluation value search range is limited to a predetermined range around the position where focusing is attained in the center continuous AF (or around the position where focusing is almost attained), and the multipoint ranging is executed (step S12).

The main photographic subject recognition unit 86 acquires the information of the focus evaluation value of each ranging area obtained by the multipoint ranging and detects the position where the focus evaluation value is the local maximum (peak) in each ranging area. Based on the detection result, whether there is a ranging area in which the peak is detected is determined (step S13).

As a result of the determination, if it is determined that there is a ranging area in which the peak is detected, the recognition process of the main photographic subject is executed (step S14).

On the other hand, if it is determined that there is no ranging area in which the peak is detected, whether the focus evaluation value search range is set to the maximum is determined (step S20). More specifically, whether the focus evaluation value search range is set from the nearest end to the infinity end is determined.

If it is determined that the focus evaluation value search range is set to the maximum, the process returns to step S10, and the center continuous AF is performed again.

On the other hand, if it is determined that the focus evaluation·BR>L search range is not set to the maximum, the focus evaluation value search range is set by expanding the range backward and forward by a predetermined amount (step S21). The process returns to step S12, and the multipoint ranging is executed again under the expanded focus evaluation value search range.

In this way, if there is no ranging area in which the peak is detected as a result of the multipoint ranging, the multipoint ranging is executed by gradually expanding the focus evaluation value search range. As a result, the main photographic subject can be efficiently recognized.

The range of expansion and the number of expansions are not particularly limited. For example, if there is no area in which the peak is detected in the first multipoint ranging, the focus evaluation value search range may be set to the maximum and then the multipoint ranging is executed again.

Fifth Embodiment

In the present embodiment, the multipoint ranging is executed only when there is a scene change.

Figure 11:
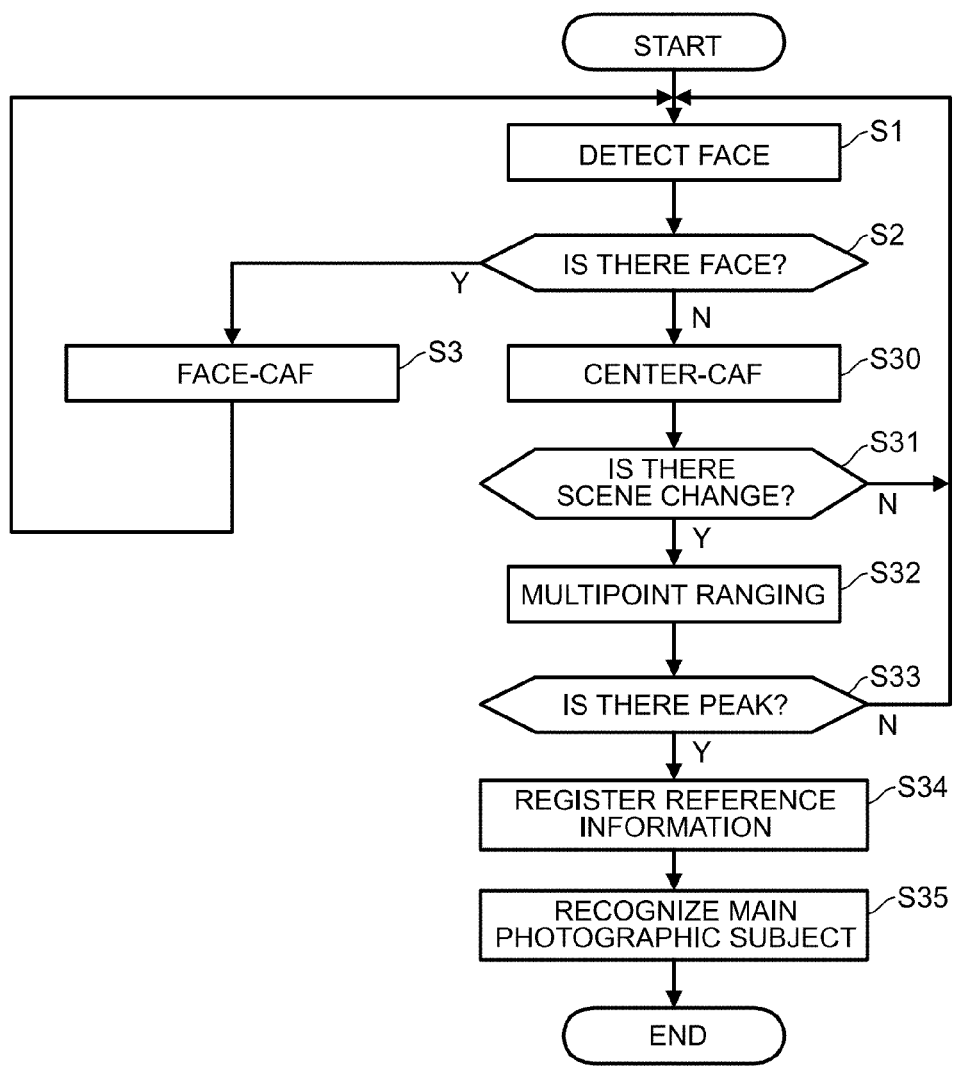
FIG. 11 is a flow chart showing a fifth embodiment of the procedure of the recognition process of the main photographic subject.

FIG. 11 is a flow chart showing a procedure of the recognition process of the main photographic subject of the present embodiment (fifth embodiment).

The process of face detection is performed (step S1), and whether a face is detected is determined (step S2). If a face is detected, the focus area is set to the position of the detected face, and the face continuous AF is performed (step S3). The face continuous AF is performed until the face is not detected.

On the other hand, if a face is not detected, the focus area is set to the screen center, and the continuous AF (center continuous (center-CAF)) is performed (step S30).

Whether the photographing scene has changed is determined (step S31).

Regarding the scene change, an image registered in advance and a currently taken image are compared to determine whether there is a change of the scene. The image to be compared is an image when the main photographic subject is recognized. Therefore, the multipoint ranging is executed without determining the presence/absence of the scene change in the first time.

If there is no scene change, the process returns to step S1, and the face detection is performed again.

On the other hand, if the scene has changed, the center continuous AF is terminated, and the multipoint ranging is carried out (step S32).

The main photographic subject recognition unit 86 acquires the information of the focus evaluation value of each ranging area obtained by the multipoint ranging and detects the position where the focus evaluation value is the local maximum (peak) in each ranging area. Based on the detection result, whether there is a ranging area in which the peak is detected is determined (step S33).

As a result of the determination, if it is determined that there is no ranging area in which the peak is detected, the process returns to step S1, and the face detection is performed again.

On the other hand, if it is determined that there is a ranging area in which the peak is detected, the image is imported and registered as a reference image for comparison (step S34). The process is performed by, for example, recording the reference image for comparison in the frame memory 74.

After the registration of the reference image for comparison, the recognition process of the main photographic subject is executed based on the result of the multipoint ranging (step S35).

In this way, the multipoint ranging is executed only when there is a change in the photographing scene in the present embodiment. As a result, the number of executions of the multipoint ranging can be reduced, and the situation that the screen is hard to see can be prevented even if the recognition process of the main photographic subject is performed during the display of through images.

The information for comparison does not always have to be the image data. Feature points for comparison may be extracted, and information of the feature points may be registered as reference information. In this case, the scene change detection is performed by extracting feature points from the current image and the comparing extracted feature points.

The scene change does not always have to be detected by comparing the image data. Information obtained in the image capture (imaging information), such as a multi-zone metering value, a focal position and a focus evaluation value, can be used (the information is used independently or in combination) for the scene change detection. The scene change can also be detected by using such imaging information.

In the present example, the face detection is performed, and the recognition process of the main photographic subject based on the multipoint ranging is executed only when a face is not detected. However, the face detection does not always have to be executed. Even if a face is detected, the recognition process of the main photographic subject based on the multipoint ranging may be executed.

Sixth Embodiment

In the fifth embodiment, the change in the photographing scene is detected by comparison with the image when the main photographic subject is recognized.

In the present embodiment, the change in the photographing scene is detected at a certain period. More specifically, an image of a certain time before (image of N frames before) and a current image are compared to detect the change in the photographing scene.

Figure 12:
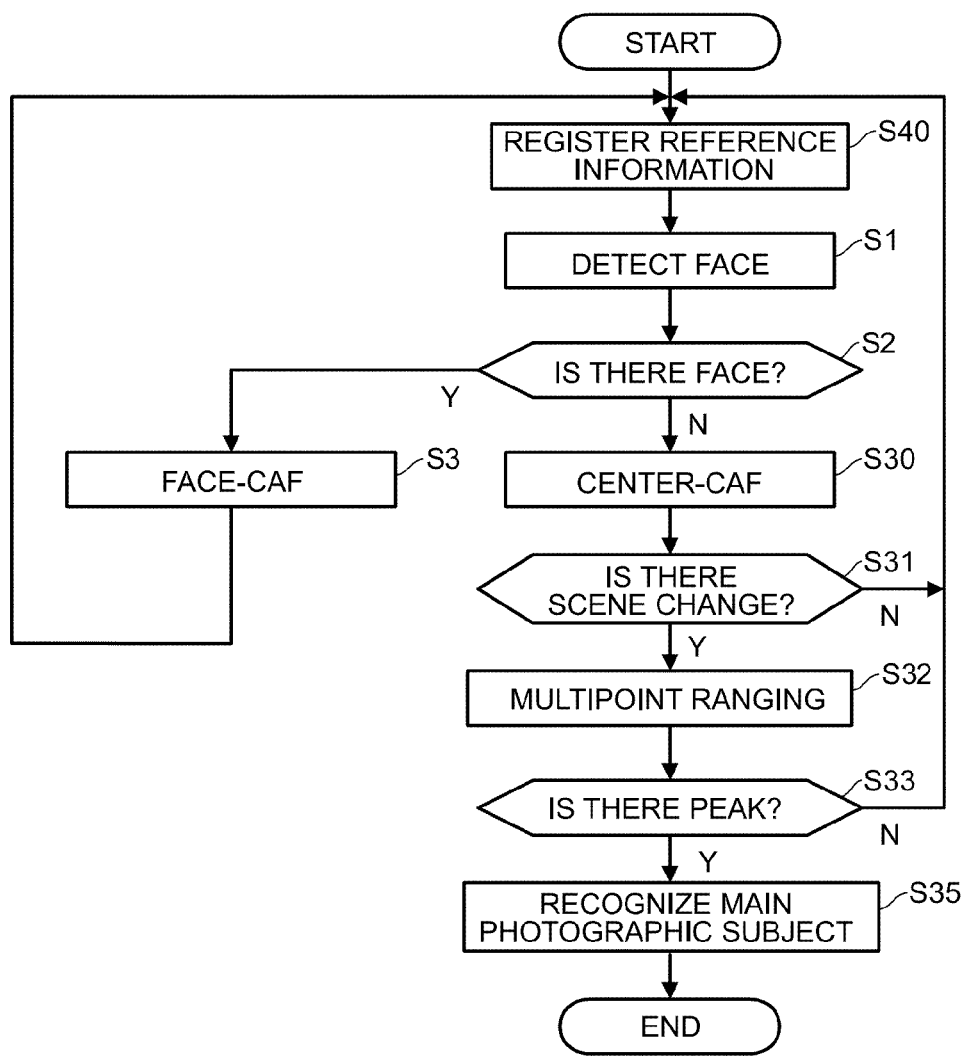
FIG. 12 is a flow chart showing a sixth embodiment of the procedure of the recognition process of the main photographic subject.

FIG. 12 is a flow chart showing a procedure of the recognition process of the main photographic subject of the present embodiment (sixth embodiment).

First, reference information is registered (step S40). More specifically, a reference image for comparison used to detect the scene change is registered. The process is performed by, for example, recording the reference image for comparison in the frame memory 74.

Subsequently, the process of face detection is performed (step S1), and whether a face is detected is determined (step S2). If a face is detected, the focus area is set to the position of the detected face, and the face continuous AF is performed (step S3). The face continuous AF is performed until the face is not detected.

On the other hand, if a face is not detected, the focus area is set to the screen center, and the continuous AF (center continuous (center-CAF)) is performed (step S30).

An image of a frame which is N frames after the registration of the reference image is imported, and whether the photographing scene has changed is determined (step S31).

If there is no scene change, the process returns to S40. The reference image is registered again, and the face detection is performed (step S1).

On the other hand, if the scene has changed, the center continuous AF is terminated, and the multipoint ranging is carried out (step S32).

The main photographic subject recognition unit 86 acquires the information of the focus evaluation value of each ranging area obtained by the multipoint ranging and detects the position where the focus evaluation value is the local maximum (peak) in each ranging area. Based on the detection result, whether there is a ranging area in which the peak is detected is determined (step S33).

As a result of the determination, if it is determined that there is no ranging area in which the peak is detected, the process returns to step S1, and the face detection is performed again.

On the other hand, if it is determined that there is a ranging area in which the peak is detected, the recognition process of the main photographic subject is executed based on the result of the multipoint ranging (step S35).

In this way, the scene change is detected at a certain time interval in the present embodiment, and the multipoint ranging is executed only when there is a scene change. As a result, the number of executions of the multipoint ranging can be reduced, and the situation that the screen is hard to see can be prevented even if the recognition process of the main photographic subject is performed during the display of the through images.

In the present example, the information for comparison does not always have to be the image data. Feature points for comparison may be extracted, and the information of the feature points may be registered as the reference information.

Although the CPU detects the scene change (process by software) in the present example, a dedicated processing circuit may be arranged for the process (process by hardware).

Seventh Embodiment

In the present embodiment, the multipoint ranging is executed only when focusing is attained in the center continuous AF and when there is a scene change.

Figure 13:
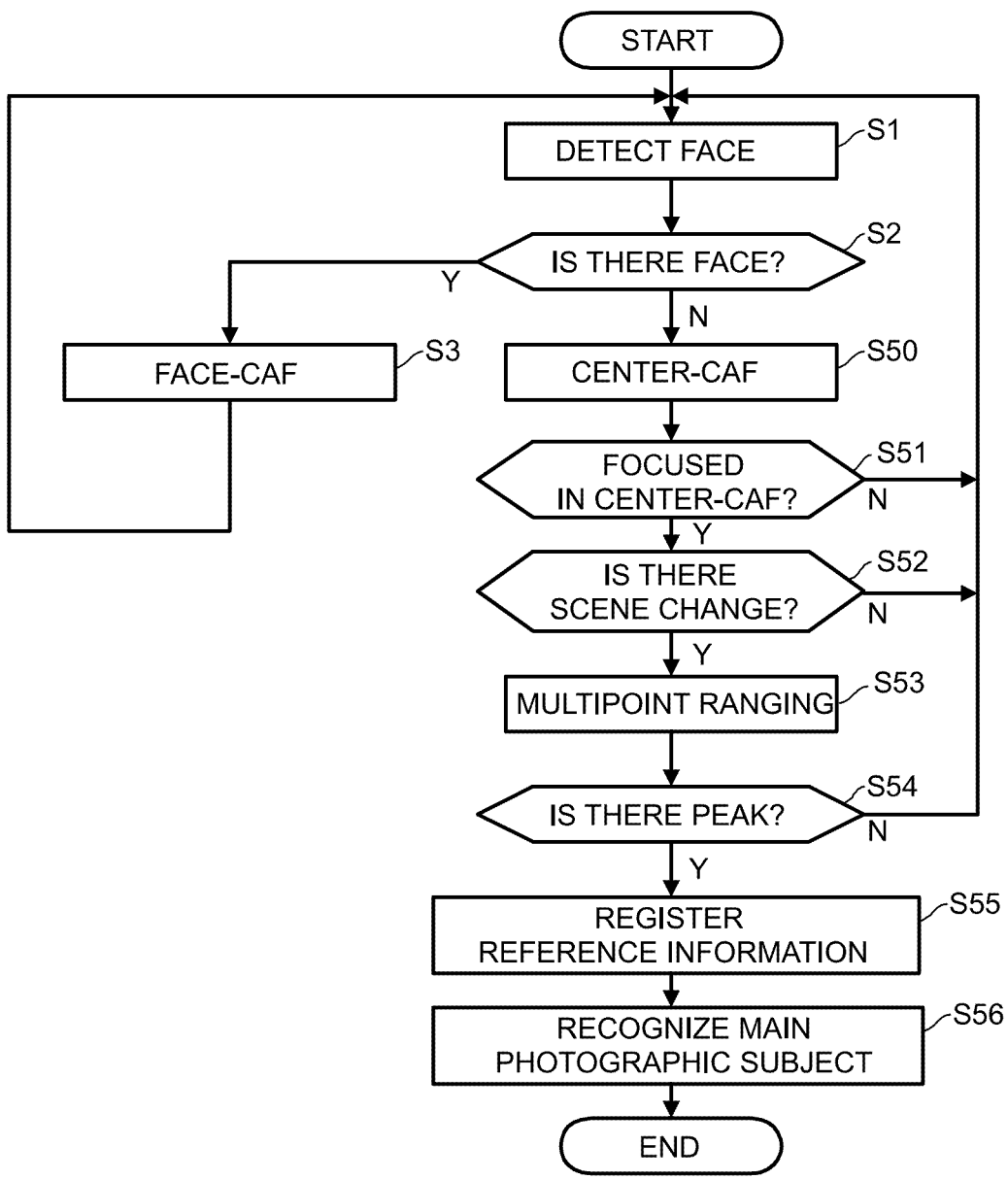
FIG. 13 is a flow chart showing a seventh embodiment of the procedure of the recognition process of the main photographic subject.

FIG. 13 is a flow chart showing a procedure of the recognition process of the main photographic subject of the present embodiment (seventh embodiment).

The process of face detection is performed (step S1), and whether a face is detected is determined (step S2). If a face is detected, the focus area is set to the position of the detected face, and the face continuous AF is performed (step S3). The face continuous AF is performed until the face is not detected.

On the other hand, if a face is not detected, the focus area is set to the screen center, and the continuous AF (center continuous (center-CAF)) is performed (step S50). Whether focusing is attained in the continuous AF (or whether focusing is almost attained) is determined (step S51).

If focusing is not attained in the continuous AF, the process returns to step S1, and the face detection is performed again.

On the other hand, if focusing is attained in the continuous AF (or when focusing is almost attained), whether the photographing scene has changed is determined (step S52).

In the detection of the scene change here, an image registered in advance and a currently taken image are compared, and whether there is a change of the scene is determined. The image to be compared is an image when the main photographic subject is recognized. Therefore, the multipoint ranging is executed without determining the presence/absence of the scene change in the first time.

If there is no scene change, the process returns to step S1, and the face detection is performed again.

On the other hand, if the scene has changed, the center continuous AF is terminated, and the multipoint ranging is carried out (step S53).

The main photographic subject recognition unit 86 acquires the information of the focus evaluation value of each ranging area obtained by the multipoint ranging and detects the position where the focus evaluation value is the local maximum (peak) in each ranging area. Based on the detection result, whether there is a ranging area in which the peak is detected is determined (step S54). In this case, it is assumed that the peak is not detected when the peak is not (cannot be) detected as well as when the detected peak (local maximum value) is smaller than a preset threshold.

As a result of the determination, if it is determined that there is no ranging area in which the peak is detected, the process returns to step S1, and the face detection is performed again.

On the other hand, if it is determined that there is a ranging area in which the peak is detected, the image is imported and registered as a reference image for comparison (step S55). The process is performed by, for example, recording the reference image for comparison in the frame memory 74.

After the registration of the reference image for comparison, the recognition process of the main photographic subject is executed based on the result of the multipoint ranging (step S56).

In this way, the multipoint ranging is executed only when focusing is attained in the center continuous AF and when there is a change in the photographing scene in the present embodiment. As a result, the number of executions of the multipoint ranging can be reduced, and the situation that the screen is hard to see can be prevented even if the recognition process of the main photographic subject is performed during the display of the through images.

The fact that focusing is attained in the continuous AF also serves as an indicator that the scene is stabilized. Therefore, the accuracy of the measurement result of subsequent multipoint ranging is also high. As a result, the main photographic subject can be recognized more accurately.

In the determination of whether the photographing scene has changed in the present example, the image when the main photographic subject is recognized is registered as the reference image, and whether the photographing scene has changed is determined by comparison with the reference image. However, the change in the photographing scene may be detected at a certain interval (certain frame interval) as in the sixth embodiment.

The information for comparison does not always have to be the image data. Feature points for comparison may be extracted, and the information of the feature points may be registered as the reference information. In this case, the scene change determination is also performed by extracting feature points from the current image and comparing the extracted feature points.

In the present example, the face detection is performed, and the recognition process of the main photographic subject based on the multipoint ranging is executed only when a face is not detected. However, the face detection does not always have to be executed. Even if a face is detected, the recognition process of the main photographic subject based on the multipoint ranging may be executed.

In the present embodiment, the multipoint ranging can be performed by limiting the focus evaluation value search range as in the third embodiment. The multipoint ranging can be performed by gradually expanding the focus evaluation value search range as in the fourth embodiment.

Eighth Embodiment

In the present embodiment, to prevent the execution interval of the multipoint ranging from becoming short, a counter performs monitoring operation to execute the multipoint ranging. Therefore, the digital camera 10 of the present embodiment includes a counter (not shown). The counter is configured to operate according to a command from the CPU 90, and for example, the count increases frame by frame.

Figure 14:
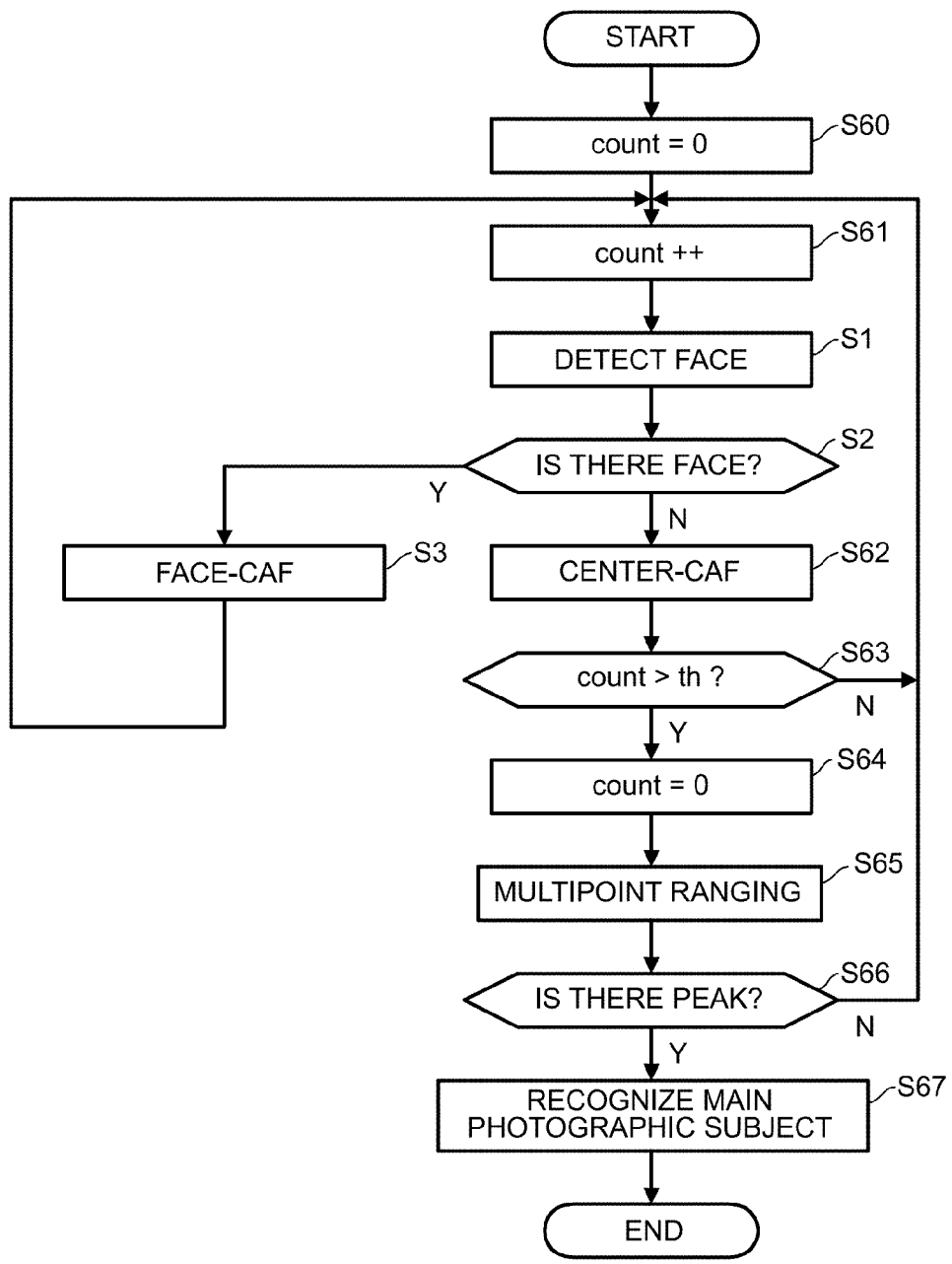
FIG. 14 is a flow chart showing an eighth embodiment of the procedure of the recognition process of the main photographic subject.

FIG. 14 is a flow chart showing a procedure of the recognition process of the main photographic subject of the present embodiment (eighth embodiment).

First, the counter is reset (step S60), and then the count is started (step S61).

After the start of the count, the process of face detection is performed (step S1), and whether a face is detected is determined (step S2). If a face is detected, the focus area is set to the position of the detected face, and the face continuous AF is performed (step S3). The face continuous AF is performed until the face is not detected.

On the other hand, if a face is not detected, the focus area is set to the screen center, and the continuous AF (center continuous (center-CAF)) is performed (step S62).

Subsequently, whether a count value of the counter has exceeded a preset threshold is determined (step S63).

If the count value has not exceeded the threshold, the process returns to step S61, and after counting up, the face detection is performed.

On the other hand, if the count value of the counter has exceeded the threshold, the count value is reset (step S64). The center continuous AF is terminated, and the multipoint ranging is carried out (step S65).

The main photographic subject recognition unit 86 acquires the information of the focus evaluation value of each ranging area obtained by the multipoint ranging and detects the position where the focus evaluation value is the local maximum (peak) in each ranging area. Based on the detection result, whether there is a ranging area in which the peak is detected is determined (step S66). In this case, it is assumed that the peak is not detected when the peak is not (cannot be) detected as well as when the detected peak (local maximum value) is smaller than a preset threshold.

As a result of the determination, if it is determined that there is no ranging area in which the peak is detected, the process returns to step S61. The count is restarted, and the face detection is performed.

On the other hand, if it is determined that there is a ranging area in which the peak is detected, the recognition process of the main photographic subject is executed based on the result of the multipoint ranging (step S67).

In this way, the counter performs the monitoring operation in the present embodiment to prevent frequent execution of the multipoint ranging. As a result, the situation that the screen is hard to see due to frequent execution of the multipoint ranging can be prevented.

Ninth Embodiment

In the present embodiment, the multipoint ranging is executed only when focusing is attained in the center continuous AF (or focusing is almost attained), the scene has changed, and a certain time has passed since the last multipoint ranging.

Figure 15:
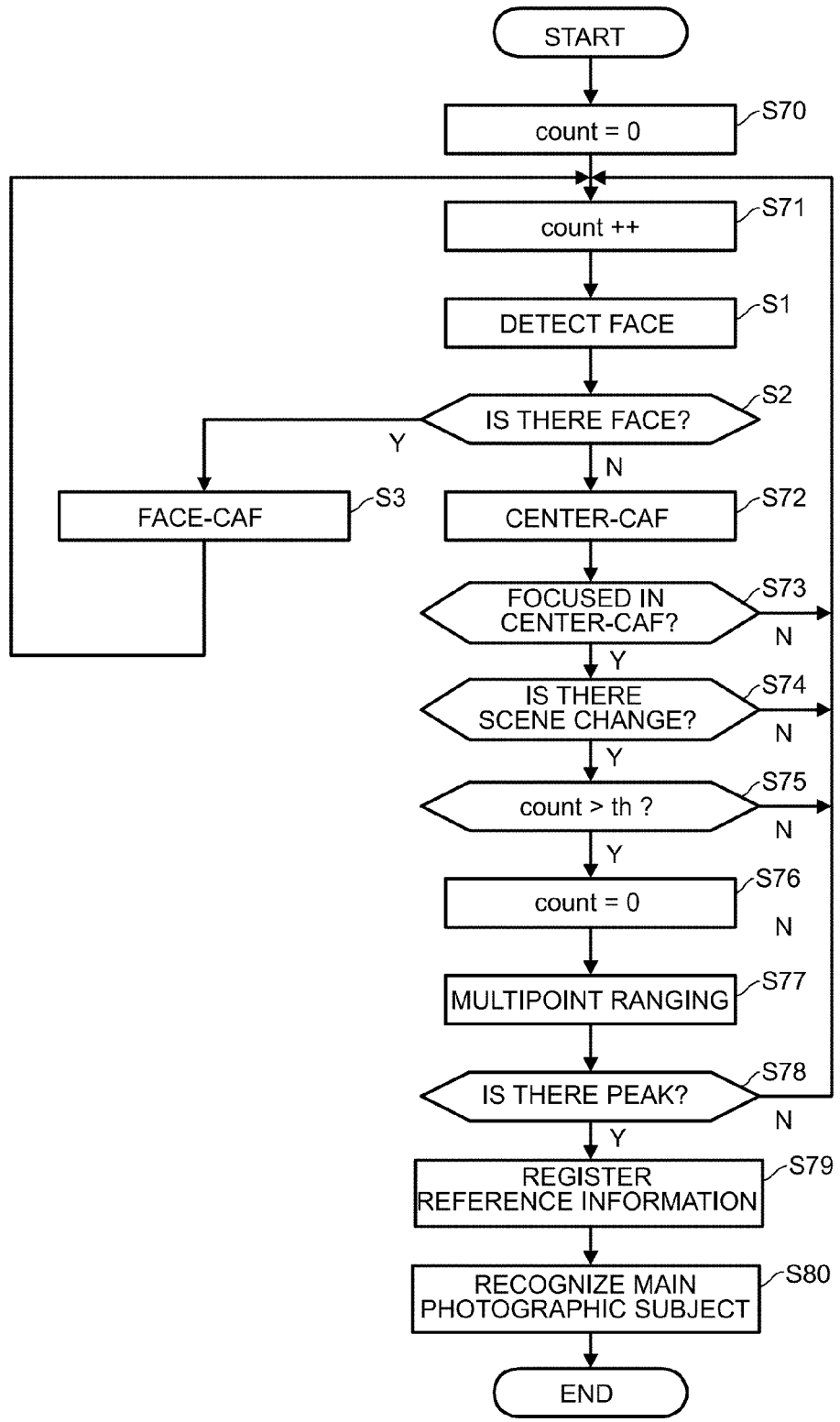
FIG. 15 is a flow chart showing a ninth embodiment of the procedure of the recognition process of the main photographic subject.

FIG. 15 is a flow chart showing a procedure of a recognition process of a main photographic subject of the present embodiment (ninth embodiment).

First, the counter is reset (step S70), and then the count is started (step S71).

After the start of the count, the process of face detection is performed (step S1), and whether a face is detected is determined (step S2). If a face is detected, the focus area is set to the position of the detected face, and the face continuous AF is performed (step S3). The face continuous AF is performed until the face is not detected.

On the other hand, if a face is not detected, the focus area is set to the screen center, and the continuous AF (center continuous (center-CAF)) is performed (step S72). Whether focusing is attained in the continuous AF (or whether focusing is almost attained) is determined (step S73).

If focusing is not attained in the continuous AF, the process returns to step S71, and after counting up, the face detection is performed again.

On the other hand, if focusing is attained in the continuous AF (or if focusing is almost attained), whether the photographing scene has changed is determined (step S74).

In the detection of the scene change here, an image registered in advance and a currently taken image are compared, and whether there is a change of the scene is determined. The image to be compared is an image when the main photographic subject is recognized. Therefore, the multipoint ranging is executed without determining the presence/absence of the scene change in the first time.

If there is no scene change, the process returns to step S71, and after counting up, the face detection is performed again.

On the other hand, if the scene has changed, whether the count value of the counter exceeds the preset threshold is determined (step S75).

If the count value does not exceed the threshold, the process returns to step S71, and after counting up, the face detection is performed.

On the other hand, if the count value of the counter exceeds the threshold, the count value is reset (step S76). The center continuous AF is terminated, and the multipoint ranging is carried out (step S77).

The main photographic subject recognition unit 86 acquires the information of the focus evaluation value of each ranging area obtained by the multipoint ranging and detects the position where the focus evaluation value is the local maximum (peak) in each ranging area. Based on the detection result, whether there is a ranging area in which the peak is detected is determined (step S78). In this case, it is assumed that the peak is not detected when the peak is not (cannot be) detected as well as when the detected peak (local maximum value) is smaller than a preset threshold.

As a result of the determination, if it is determined that there is no ranging area in which the peak is detected, the process returns to step S71. The count is restarted, and the face detection is performed.

On the other hand, if it is determined that there is a ranging area in which the peak is detected, the image is imported and registered as the reference image for comparison (step S79). The process is performed by, for example, recording the reference image for comparison in the frame memory 74.

After the registration of the reference image for comparison, the recognition process of the main photographic subject is executed based on the result of the multipoint ranging (step S80).

In this way, the multipoint ranging is performed in the present embodiment only when focusing is attained in the center continuous AF, the photographing scene has changed, and a certain time has passed since the last multipoint ranging. As a result, the execution of the multipoint ranging can be more appropriately reduced, and the situation that the screen is hard to see can be prevented when the recognition process of the main photographic subject is performed.

The fact that focusing is attained in the continuous AF also serves as an indicator that the scene is stabilized. Therefore, the accuracy of the measurement result of subsequent multipoint ranging is also high. As a result, the main photographic subject can be recognized more accurately.

In the determination of whether the photographing scene has changed in the present example, the image when the main photographic subject is recognized is registered as the reference image, and whether the photographing scene has changed is determined by comparison with the reference image. However, the change in the photographing scene may be detected at a certain interval (certain frame interval) as in the sixth embodiment.

The information for comparison does not always have to be the image data. Feature points for comparison may be extracted, and the information of the feature points may be registered as the reference information. In this case, the scene change determination is performed by extracting feature points from the current image and comparing the extracted feature points.

In the present example, the face detection is performed, and the recognition process of the main photographic subject by the multipoint ranging is executed only when a face is not detected. However, the face detection does not always have to be executed. Even if a face is detected, the recognition process of the main photographic subject by the multipoint ranging may be executed.

In the present example, the multipoint ranging is executed only when focusing is attained in the center continuous AF, there is a change in the photographing scene, and a certain time has passed since the last multipoint ranging. However, the multipoint ranging may be executed only when focusing is attained in the center continuous AF and a certain time has passed since the last multipoint ranging. Alternatively, the multipoint ranging may be executed only when there is a change in the photographing scene and a certain time has passed since the last multipoint ranging.

In the present embodiment, the multipoint ranging can be performed by limiting the focus evaluation value search range as in the third embodiment. The multipoint ranging can be performed by gradually expanding the focus evaluation value search range as in the fourth embodiment.

Tenth Embodiment

Figure 16:
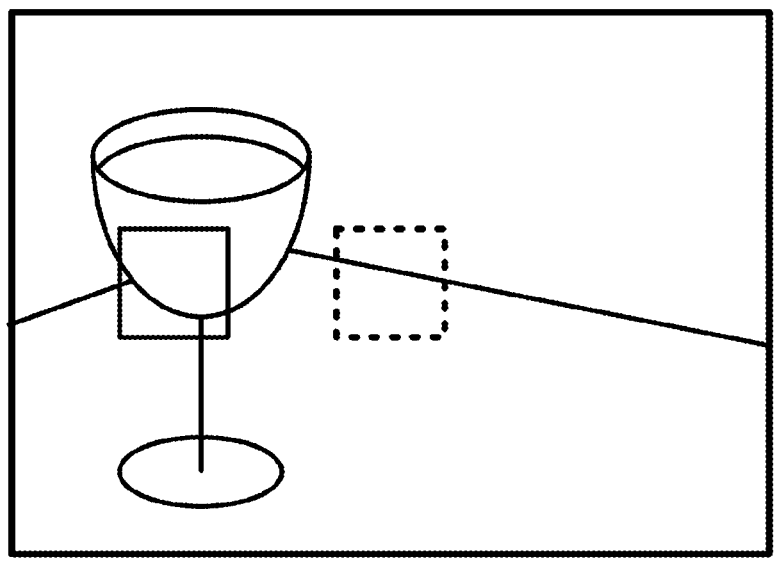
FIG. 16 is an explanatory diagram of a tenth embodiment of the recognition process of the main photographic subject.

As described, in the recognition of the main photographic subject based on the multipoint ranging, the distance and the position in the screen are weighted and added based on two hypotheses that "it is likely that a subject closer to the center of the screen is the main photographic subject" and that "it is likely that a subject at a closer range is the main photographic subject", and the position where the main photographic subject likelihood is the maximum is recognized as the main photographic subject. The present embodiment focuses an attention on the fact that, when focusing is first attained by setting the screen center as the focus area, the position recognized as the main photographic subject does not move from the center as long as there is no object on a closer range side than the photographic subject focused at the center. More specifically, when the main photographic subject is not at the center as shown in FIG. 16, after focusing is attained in the continuous AF (or after focusing is almost attained) it is only necessary to search an area from the focused position toward the nearest point side in order to detect the photographic subject.

Therefore, in the present embodiment, the center continuous AF is performed, and if focusing is attained in the center continuous AF (or focusing is almost attained), the multipoint ranging is executed by limiting the focus evaluation value search range to the nearest point side with reference to the focal position (or position almost focused).

Figure 17:
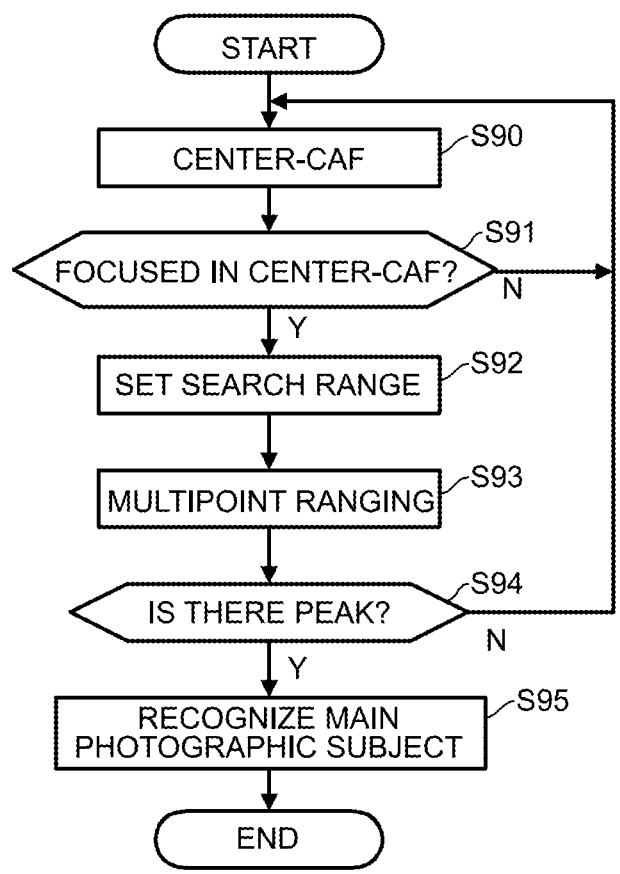
FIG. 17 is a flow chart showing the tenth embodiment of the procedure of the recognition process of the main photographic subject.

FIG. 17 is a flow chart showing a procedure of the recognition process of the main photographic subject of the present embodiment (tenth embodiment).

The focus area is set to the screen center, and the center continuous AF is performed (step S90).

Whether focusing is attained in the executed center continuous AF (or focusing is almost attained) is determined (step S91).

If focusing is not attained, the center continuous AF is continuously executed (step S90).

Figure 18:
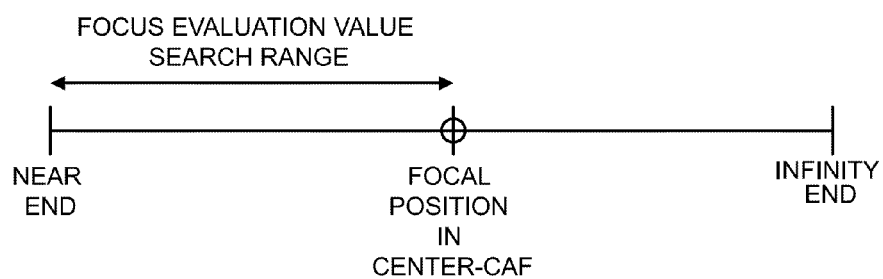
FIG. 18 is an explanatory diagram of the tenth embodiment of the recognition process of the main photographic subject.

On the other hand, if focusing is attained (or if focusing is almost attained), the center continuous AF is terminated, and as shown in FIG. 18, the focus evaluation value search range is set to the nearest end side with reference to the focal position (or position almost focused) (step S92). The multipoint ranging is executed under the set focus evaluation value search range (step S93).

The main photographic subject recognition unit 86 acquires the information of the focus evaluation value of each ranging area obtained by the multipoint ranging and detects the position where the focus evaluation value is the local maximum (peak) in each ranging area. Based on the detection result, whether there is a ranging area in which the peak is detected is determined (step S94). In this case, it is assumed that the peak is not detected when the peak is not (cannot be) detected as well as when the detected peak (local maximum value) is smaller than a preset threshold.

As a result of the determination, if it is determined that there is no ranging area in which the peak is detected, the process returns to step S90, and the center continuous AF is performed again. More specifically, since the main photographic subject cannot be recognized in this case, the center continuous AF is performed again, and the process is performed again from the beginning.

On the other hand, if it is determined that there is a ranging area in which the peak is detected, the recognition process of the main photographic subject is executed (step S95).

In this way, the center continuous AF is carried out in the present embodiment, and if focusing is attained in the center continuous AF (or if focusing is almost attained), the multipoint ranging is performed with the focus evaluation value search range limited to the nearest end side with reference to the focal position (or position almost focused). As a result, the search time can be reduced, and the multipoint ranging can be speeded up. The power consumption can also be reduced by reducing the drive distance of the focus lens 110. The change in the angle of view in the multipoint ranging can also be prevented, and the screen can be more easily viewed.

In the present example, although the direction of the search in the multipoint ranging, that is, the moving direction of the focus lens 110 is not particularly defined, it is preferable that the search is performed toward the nearest point side (move the focus lens 110 toward the nearest point side) of the position focused (or position almost focused) in the center continuous AF. As a result, wasteful drive of the focus lens 110 can be eliminated (the focus lens 110 does not have to be temporarily moved to the nearest end for the search), and the multipoint ranging can be speeded up. Without the wasteful drive, the power consumption can also be reduced.

In the present example, although the multipoint ranging is executed if focusing is attained in the center continuous AF, the multipoint ranging may be executed only when focusing is attained in the center continuous AF and the scene has changed. The multipoint ranging may be executed only when focusing is attained in the center continuous AF, the scene has changed, and a certain time has passed since the last multipoint ranging.

The face detection is not performed in the present example. However, it may be configured to perform the face detection, and to execute the recognition process of the main photographic subject only when a face is not detected as a result of the face detection. More specifically, if a face is detected, the face may be recognized as the main photographic subject.

Figure 19:
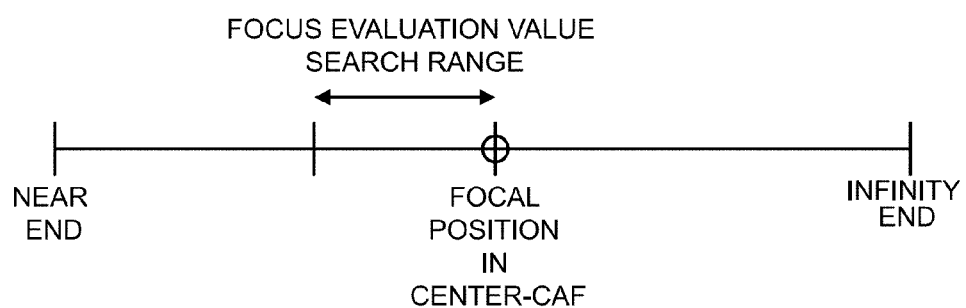
FIG. 19 is an explanatory diagram of the tenth embodiment of the recognition process of the main photographic subject.

In the present example, although the focus evaluation value search range is set in the entire range on the nearest end side with reference to the position where focusing is attained (or position almost focused) in the center continuous AF, the focus evaluation value search range can be set in a predetermined range on the nearest end side with reference to the position where focusing is attained (or position almost focused) in the center continuous AF as described in the third embodiment (see FIG. 19). As described in the fourth embodiment, the focus evaluation value search range can be set by gradually expanding the range to the nearest end side.

Eleventh Embodiment

If the focal position is at a sufficiently close range when focusing is attained (or when focusing is almost attained) in the center continuous AF, the probability that the main photographic subject can be recognized (=probability of the existence of a ranging area in which the peak is detected by the multipoint ranging) is low even if the multipoint ranging is performed subsequently to perform the recognition process of the main photographic subject.

Figure 20:
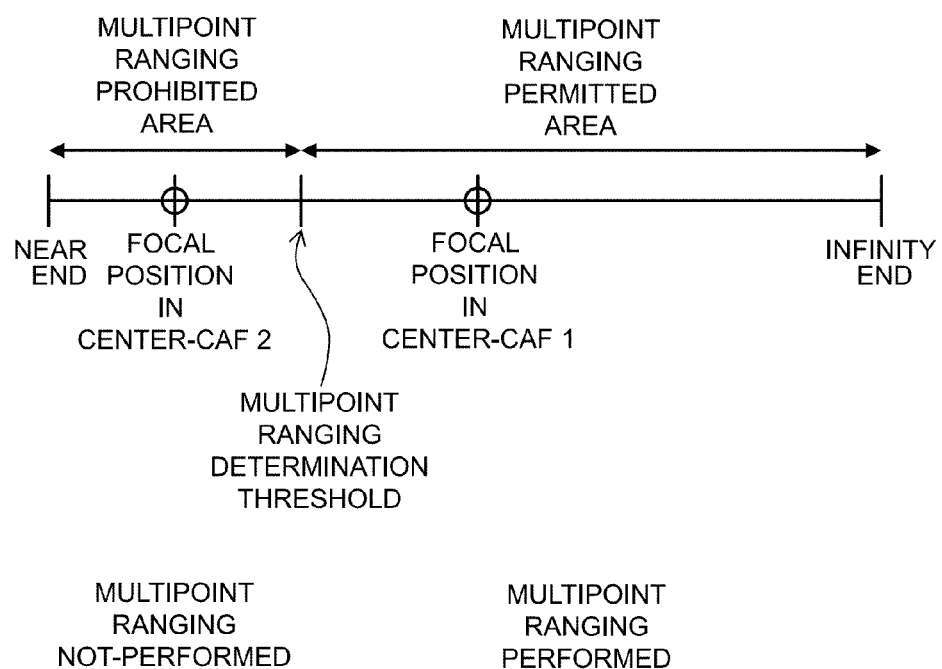
FIG. 20 is an explanatory diagram of an eleventh embodiment of the recognition process of the main photographic subject.

Therefore, the multipoint ranging is not performed if the focal position (or position almost focused) is sufficiently close when focusing is attained (or when focusing is almost attained) in the center continuous AF, and the multipoint ranging is executed only when the focal position (or position almost focused) is sufficiently far in the present embodiment as shown in FIG. 20.

Figure 21:
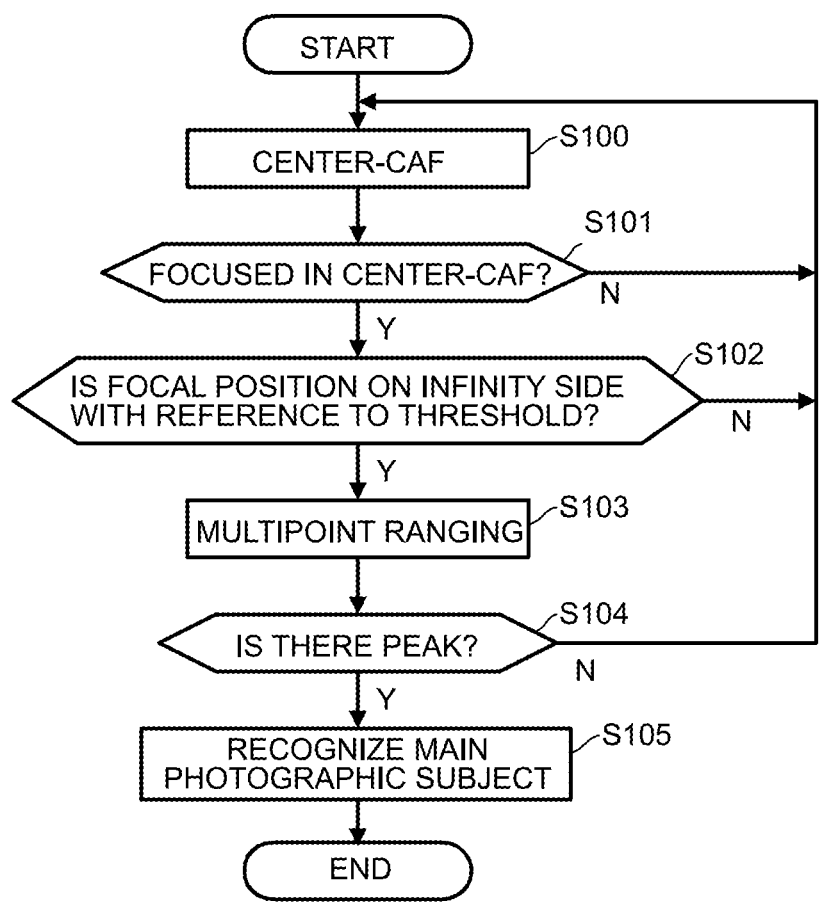
FIG. 21 is a flow chart showing the eleventh embodiment of the procedure of the recognition process of the main photographic subject.

FIG. 21 is a flow chart showing a procedure of a recognition process of a main photographic subject of the present embodiment (eleventh embodiment).

The focus area is set to the screen center, and the center continuous AF is performed (step S100).

Whether focusing is attained in the executed center continuous AF (or whether focusing is almost attained) is determined (step S101).

If focusing is not attained, the center continuous AF is continuously executed (step S100).

On the other hand, if focusing is attained (or if focusing is almost attained), the center continuous AF is terminated, and whether the focal position (or position almost focused) is on the infinity side with reference to a preset threshold is determined (step S102).

The threshold is set, for example, at a position where if focusing is attained at the position, the main photographic subject is empirically not detected even when an area on the nearest end side with respect to the position (area nearer the nearest end than the position).

As a result of the determination, if the position focused (or position almost focused) in the center continuous AF is on the nearest end side with reference to the threshold, the process returns to step S100, and the center continuous AF is restarted.

On the other hand, if the position focused (or position almost focused) in the center continuous AF is on the infinity side with reference to the threshold, the multipoint ranging is executed (step S103).

The main photographic subject recognition unit 86 acquires the information of the focus evaluation value of each ranging area obtained by the multipoint ranging and detects the position where the focus evaluation value is the local maximum (peak) in each ranging area. Based on the detection result, whether there is a ranging area in which the peak is detected is determined (step S104). In this case, it is assumed that the peak is not detected when the peak is not (cannot be) detected as well as when the detected peak (local maximum value) is smaller than a preset threshold.

As a result of the determination, if it is determined that there is no ranging area in which the peak is detected, the process returns to step S100, and the center continuous AF is performed again. More specifically, since the main photographic subject cannot be recognized in this case, the center continuous AF is performed again, and the process is performed again from the beginning.

On the other hand, if it is determined that there is a ranging area in which the peak is detected, the recognition process of the main photographic subject is executed (step S105).

In this way, the center continuous AF is carried out in the present embodiment, and the multipoint ranging is performed only when the focal position (or position almost focused) is on the infinity side with reference to the threshold when focusing is attained (or when focusing is almost attained) in the center continuous AF. In this way, wasteful multipoint ranging can be prevented, and the main photographic subject can be efficiently recognized.

In the present example, although the multipoint ranging is executed if focusing is attained in the center continuous AF, the multipoint ranging may be executed only when focusing is attained in the center continuous AF and the scene has changed. The multipoint ranging may also be executed only when focusing is attained in the center continuous AF, the scene has changed, and a certain time has passed since the last multipoint ranging.

The face detection is not performed in the present example. However, it may be configured to perform the face detection, and to execute the recognition process of the main photographic subject only when a face is not detected as a result of the face detection. More specifically, if a face is detected, the face may be recognized as the main photographic subject.

When the multipoint ranging is performed, the focus evaluation value search range may be limited to the nearest end side as in the tenth embodiment. In this case, the focus evaluation value search range may be set in a predetermined range on the nearest end side with reference to the position where focusing is attained (or position almost focused) in the center continuous AF as described in the third embodiment (see FIG. 19). As described in the fourth embodiment, the focus evaluation value search range may be set by gradually expanding the range to the nearest end side.

<<Pre-Photographing Process Using Recognition Process of Main Photographic Subject>>

A process before the actual photographing using the recognition technique of the main photographic subject will be described.

The recognition technique of the main photographic subject of the embodiments can be used to recognize a main photographic subject at a position other than the screen center. The change in the angle of view can also be prevented, and there is no situation that the screen is hard to see even if the technique is used during the live view (during through image display).

Thus, through images during the live view are used to recognize the main photographic subject, and the recognition result is used to perform various processes.

First Embodiment

In the present embodiment, the recognition process of the main photographic subject is performed during the live view, and the focus area is set to the recognized main photographic subject to execute the continuous AF.

Figure 22:
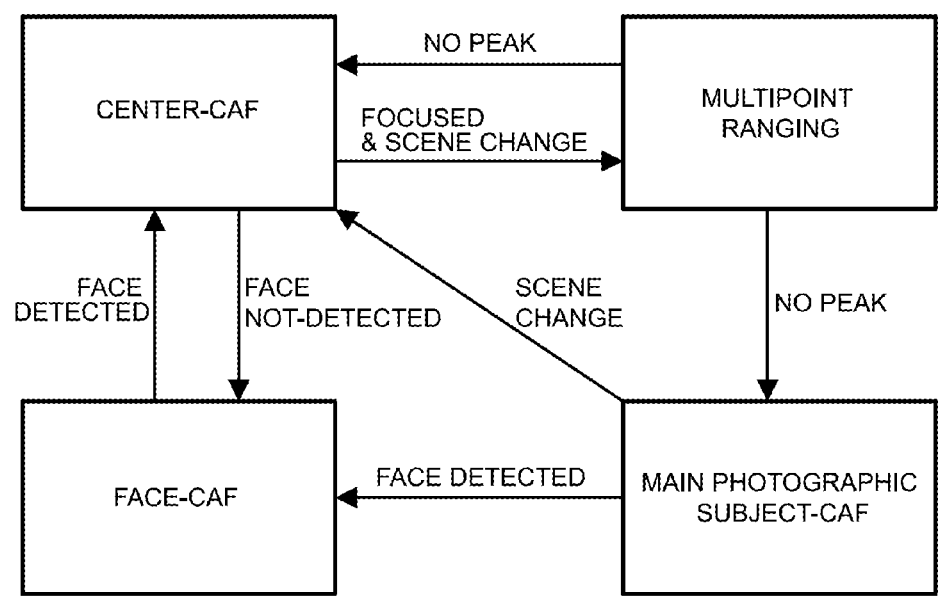
FIG. 22 is a state transition diagram of the continuous AF performed before actual photographing.

FIG. 22 is a state transition diagram of the continuous AF performed before the actual photographing.

As shown in FIG. 22, if a face is detected in a through image, the process proceeds to the face continuous AF. The focus area is set to the detected face, and the face continuous AF is performed.

On the other hand, if a face is not detected, the process proceeds to the center continuous AF. If focusing is attained in the center continuous AF (or focusing is almost attained) and the photographing scene has changed, the process proceeds to the multipoint ranging.

As a result of the multipoint ranging, if there is no ranging area in which the peak is detected, the process proceeds to the center continuous AF. In this case, if a face is detected, the process proceeds to the face continuous AF.

On the other hand, if there is a ranging area in which the peak is detected as a result of the multipoint ranging, the recognition process of the main photographic subject is performed based on the result of the multipoint ranging. The focus area is set to the recognized main photographic subject, and the continuous AF (main photographic subject continuous) is performed. Subsequently, if a face is detected, the focus area is set to the detected face, and the face continuous AF is performed. If the scene has changed, the process proceeds to the center continuous AF.

Figure 23:
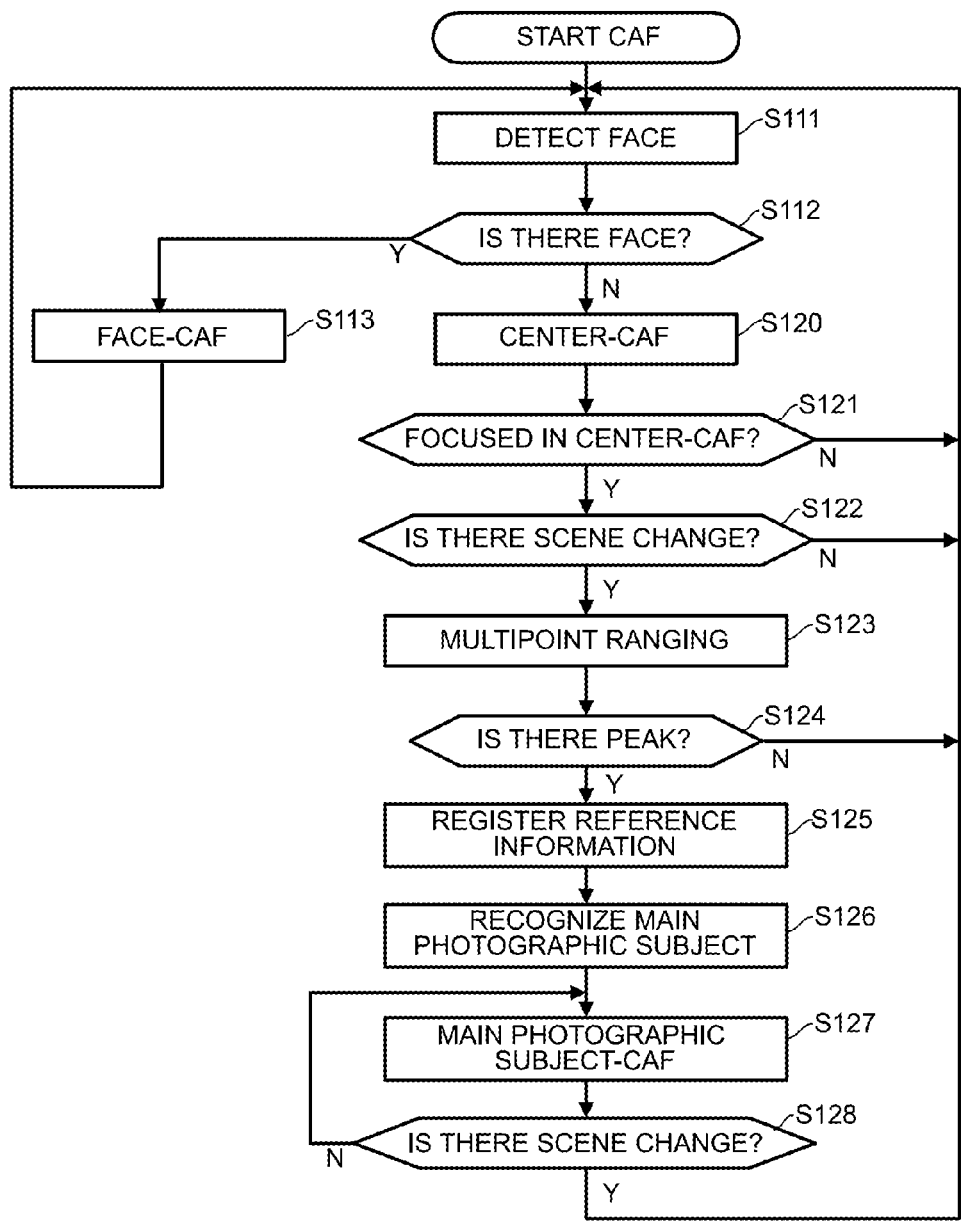
FIG. 23 is a flow chart showing a procedure of a process of the continuous AF performed before the actual photographing.

FIG. 23 is a flow chart showing a procedure of a process of the continuous AF performed before the actual photographing.

The process of face detection is performed (step S111), and whether a face is detected is determined (step S112). If a face is detected, the focus area is set to the position of the detected face, and the face continuous AF is performed (step S113). The face continuous AF is performed until the face is not detected.

On the other hand, if a face is not detected, the focus area is set to the screen center, and the center continuous AF is performed (step S120). Whether focusing is attained in the center continuous AF (or whether focusing is almost attained) is determined (step S121).

If focusing is not attained in the continuous AF, the process returns to step S111, and the face detection is performed again.

On the other hand, if focusing is attained in the continuous AF (or if focusing is almost attained), whether the photographing scene has changed is determined (step S122).

In the detection of the scene change here, the image registered in advance and the currently taken image are compared to determine whether there is a change of the scene. The image to be compared is an image when the main photographic subject is recognized. Therefore, the multipoint ranging is executed without determining the presence/absence of the scene change in the first time.

If there is no scene change, the process returns to step S111, and the face detection is performed again.

On the other hand, if the scene has changed, the center continuous AF is terminated, and the multipoint ranging is carried out (step S123).

The main photographic subject recognition unit 86 acquires the information of the focus evaluation value of each ranging area obtained by the multipoint ranging and detects the position where the focus evaluation value is the local maximum (peak) in each ranging area. Based on the detection result, whether there is a ranging area in which the peak is detected is determined (step S124). In this case, it is assumed that the peak is not detected when the peak is not (cannot be) detected as well as when the detected peak (local maximum value) is smaller than a preset threshold.

As result of the determination, if it is determined that there is a ranging area in which the peak is detected, the process returns to step S111, and the face detection is performed again.

On the other hand, if it is determined that there is a ranging area in which the peak is detected, the image is imported and registered as the reference image for comparison (step S125). The process is performed by, for example, recording the reference image for comparison in the frame memory 74.

After the registration of the reference image for comparison, the recognition process of the main photographic subject is executed based on the result of the multipoint ranging (step S126). The focus area is set to the recognized main photographic subject, and the main photographic subject continuous AF is performed (step S127).

Subsequently, whether the photographing scene has changed is determined (step S128). If there is no change in the photographing scene, the main photographic subject continuous AF is continuously executed. On the other hand, if there is a change in the photographing scene, the process returns to step S111, and the face detection is performed again.

In this way, if a face is detected in the through image, the focus area is set to the face, and the face continuous AF is performed in the present embodiment. If a face is not detected, the recognition process of the main photographic subject is performed, and the main photographic subject continuous AF is performed. As a result, a through image focused on the main photographic subject can be displayed, even if there is no face in the screen and the main photographic subject exists in an area other than the center of the screen.

In the recognition process of the main photographic subject, the center continuous AF is performed, and the multipoint ranging is performed only when focusing is attained in the center continuous AF and the photographing scene has changed. As a result, the number of executions of the multipoint ranging can be reduced, and the change in the angle of view of the through image displayed on the monitor 24 can be prevented. As a result, the screen can be easily viewed during the through image display.

Figure 24A:
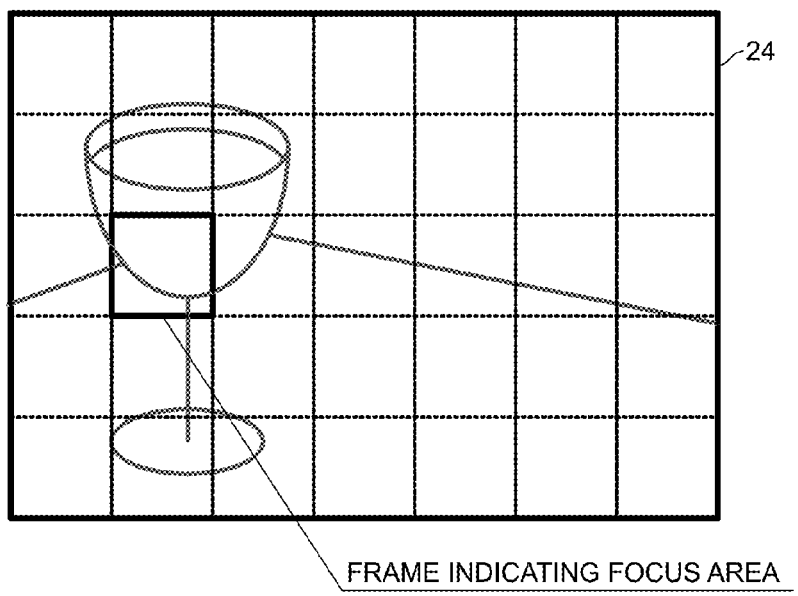
FIG. 24A is a diagram showing a display example of a frame showing a focus area (part 1).
Figure 24B:
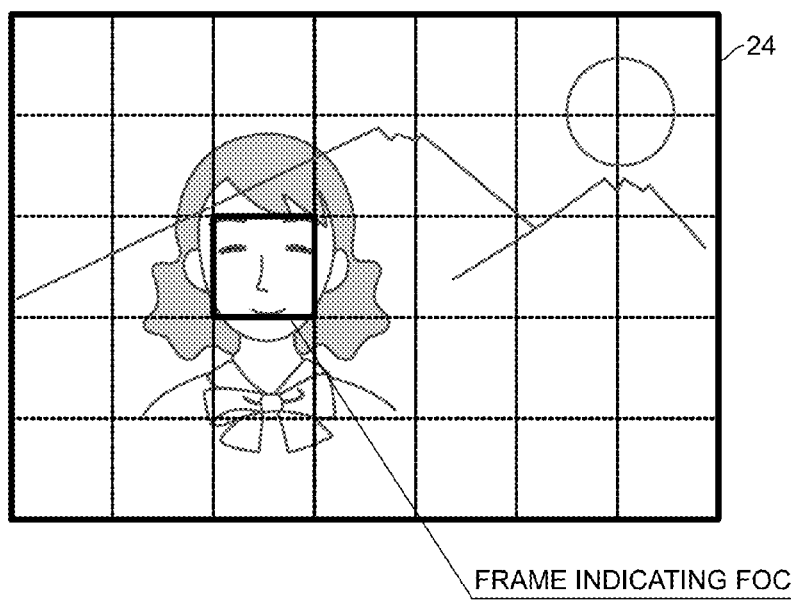
FIG. 24B is a diagram showing a display example of the frame showing the focus area (part 2).

When the main photographic subject is recognized, a frame indicating the position of the focus area set to the main photographic subject is displayed on the screen of the monitor 24 as shown in FIG. 24A. A frame indicating the position of the focus area set to the face is similarly displayed on the screen of the monitor 24 as shown in FIG. 24B when the face is detected.

In the recognition process of the main photographic subject of the present example, the multipoint ranging is executed only when focusing is attained in the center continuous AF and the photographing scene has changed. However, the multipoint ranging may be executed only when focusing is attained in the center continuous AF. The multipoint ranging may be executed only when the photographing scene has changed. The multipoint ranging may be executed only when a certain time has passed since the last multipoint ranging. Alternatively, these may be appropriately combined, and the multipoint ranging may be executed only when all conditions are satisfied.

In the determination of whether the photographing scene has changed in the present example, the image when the main photographic subject is recognized is registered as the reference image to determine whether the photographing scene has changed in comparison with the reference image. However, the change in the photographing scene can be detected at a certain interval (certain frame interval) as in the sixth embodiment.

The information for comparison does not always have to be the image data. Feature points for comparison may be extracted, and the information of the feature points may be registered as the reference information. In this case, the scene change determination is performed by extracting feature points from the current image and comparing the extracted feature points.

In the present example, the face detection is performed, and the recognition process of the main photographic subject based on the multipoint ranging is executed only when a face is not detected. However, the face detection does not always have to be executed. Even if a face is detected, the recognition process of the main photographic subject based on the multipoint ranging may be executed.

Second Embodiment

In the present embodiment, the recognition process of the main photographic subject is performed during the live view, and the recognized main photographic subject is set as the focus area during half-press of the release button 18 (during focusing instruction (S1)).

Figure 25:
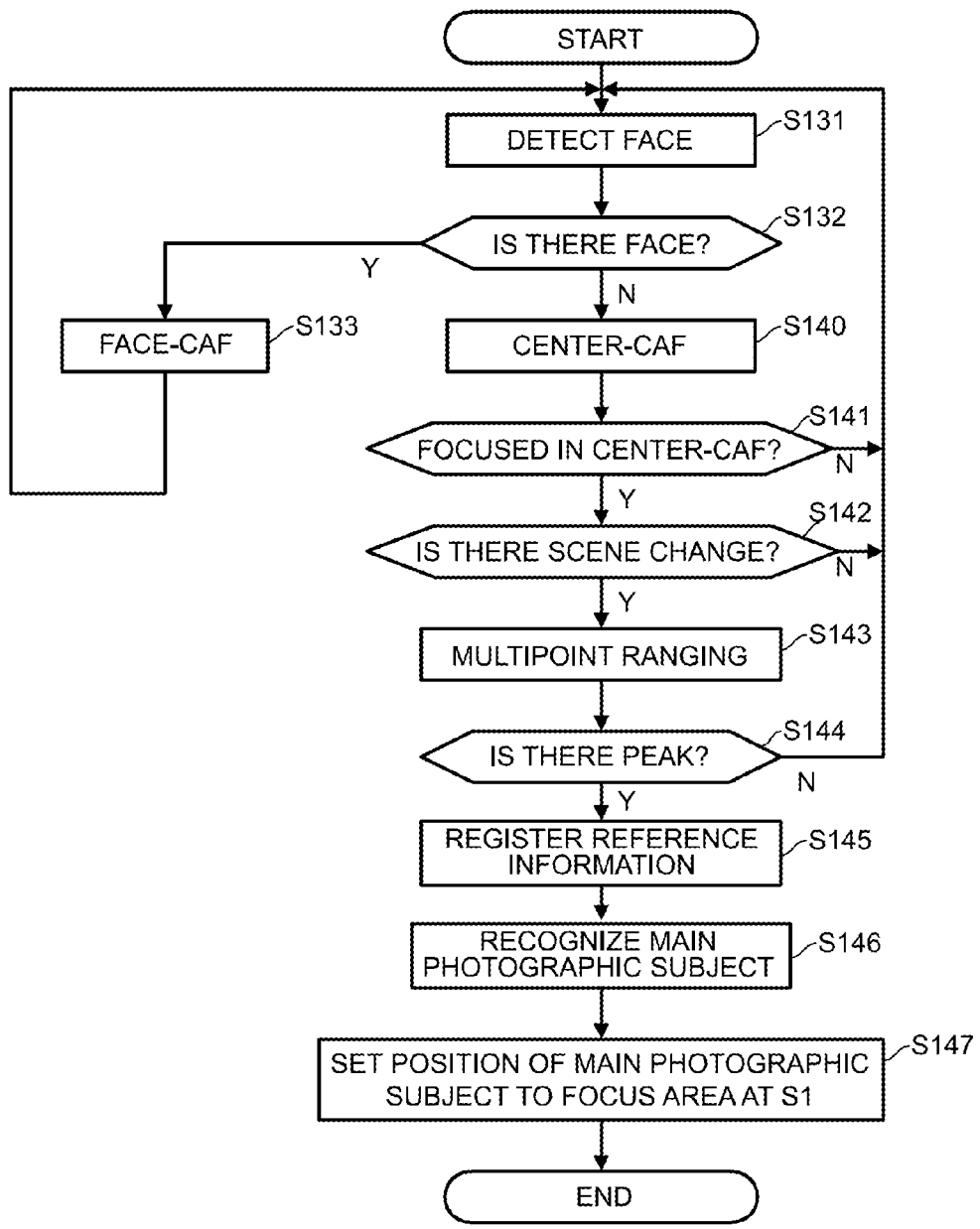
FIG. 25 is a flow chart showing a procedure of a process for setting the focus area to the main photographic subject recognized in the live view.

FIG. 25 is a flow chart showing a procedure of the process for setting the focus area to the photographic subject recognized during the live view.

The process of face detection is performed (step S131), and whether a face is detected is determined (step S132). If a face is detected, the focus area is set to the position of the detected face, and the face continuous AF is performed (step S133). The face continuous AF is performed until the face is not detected.

On the other hand, if a face is not detected, the focus area is set to the screen center, and the center continuous AF is performed (step S140). Whether focusing is attained in the center continuous AF (or whether focusing is almost attained) is determined (step S141).

If focusing is not attained in the continuous AF, the process returns to step S131, and the face detection is performed again.

On the other hand, if focusing is attained in the continuous AF (or if focusing is almost attained), whether the photographing scene has changed is determined (step S142).

In the detection of the scene change here, the image registered in advance and the currently taken image are compared, and whether the scene has changed is determined. The image to be compared is the image when the main photographic subject is recognized. Therefore, the multipoint ranging is executed without determining the presence/absence of the scene change in the first time.

If there is no scene change, the process returns to step S131, and the face detection is performed again.

On the other hand, if the scene has changed, the center continuous AF is terminated, and the multipoint ranging is carried out (step S143).

The main photographic subject recognition unit 86 acquires the information of the focus evaluation value of each ranging area obtained by the multipoint ranging and detects the position where the focus evaluation value is the local maximum (peak) in each ranging area. Based on the detection result, whether there is a ranging area in which the peak is detected is determined (step S144). In this case, it is assumed that the peak is not detected when the peak is not (cannot be) detected as well as when the detected peak (local maximum value) is smaller than a preset threshold.

As a result of the determination, if it is determined that there is no ranging area in which the peak is detected, the process returns to step S131, and the face detection is performed again.

On the other hand, if it is determined that there is a ranging area in which the peak is detected, the image is imported and registered as the reference image for comparison (step S145). The process is performed by, for example, recording the reference image for comparison in the frame memory 74.

After the registration of the reference image for comparison, the recognition process of the main photographic subject is executed based on the result of the multipoint ranging (step S146). The focus area in S1 is set to the position of the recognized main photographic subject (step S147).

In this way, the recognition process of the main photographic subject is performed during the display of through images in the present embodiment, and the focus area in S1 is set to the recognized main photographic subject.

Figure 26:
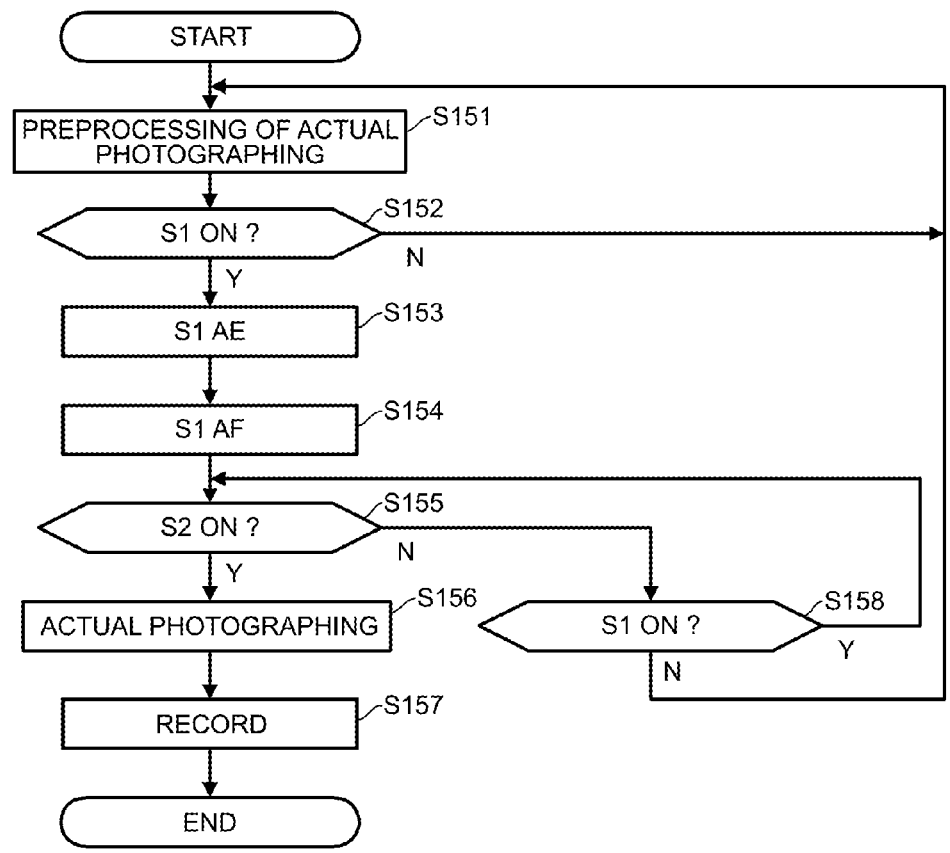
FIG. 26 is a flow chart showing a procedure of a process until the actual photographing.

FIG. 26 is a flow chart showing a procedure of the process before the actual photographing.

When the photographing mode is set, the process before the actual photographing is executed (step S151). More specifically, through images are displayed on the monitor 24, and the recognition process of the main photographic subject is performed.

The CPU 90 determines whether the release button 18 is half-pressed based on an input from the operation system control unit 84 (step S152). When the release button 18 is half-pressed, an S1 ON signal is input to the CPU 90 as a photographing preparation instruction signal (S1 OFF if the half-press is cancelled). The CPU 90 determines whether the release button 18 is half-pressed based on the presence/absence of input of the S1 ON signal.

When the release button 18 is half-pressed, the CPU 90 executes a photographing preparation process.

The AE process for actual photographing is executed, and exposure conditions in the actual photographing are determined (step S153). More specifically, an image for AE is imported to detect the brightness of the photographic object, and exposure conditions (such as shutter speed, aperture value, and ISO sensitivity) for proper exposure are determined.

The AF process is executed (step S154). More specifically, the focus lens 110 is moved from the nearest end to the infinity end to detect the position where the focus evaluation value of the preset focus area is the maximum. The focus lens is moved to the detected position.

In this case, if the main photographic subject is recognized, the focus area is set to the recognized main photographic subject, and focusing is performed.

Subsequently, the CPU 90 determines whether the release button 18 is full-pressed based on input from the operation system control unit 84 (step S155). When the release button 18 is full-pressed, an S2 ON signal is input to the CPU 90 as an actual photographing instruction signal (S2 OFF if the full-press is cancelled). The CPU 90 determines whether the release button 18 is full-pressed based on presence/absence of the input of the S2 ON signal.

If the CPU 90 determines that the release button 18 is not full-pressed, the CPU 90 determines whether the half-press of the release button 18 is cancelled based on input from the operation system control unit 84 (step S158). If the CPU 90 determines that the half-press of the release button 18 is cancelled, the process returns to step S151, and the pre-photographing process is executed again.

On the other hand, if the CPU 90 determines that the release button 18 is full-pressed, the CPU 90 executes the process of the actual photographing (step S156). More specifically, the CCD 54 is exposed based on the exposure conditions obtained in the AE process, and the image for recording is imported. The obtained image is recorded in the recording medium 78 (step S157).

In this way, the recognition process of the main photographic subject is performed before the actual photographing, and the recognized main photographic subject is focused to taken an image in the actual photographing. As a result, even if the main photographic subject exists in an area other than the center, an image focused on the main photographic subject can be photographed.

In the example, the recognition process of the main photographic subject is performed before the actual photographing, and the focus area in S1 is set to the recognized main photographic subject. However, if a face is detected, the focus area in S1 may be set to the detected face.

In the example, the focus lens is moved from the nearest end to the infinity end in the AF process after S1, and the position where the focus evaluation value is the local maximum is detected. However, it may be configured such that, if the main photographic subject is recognized, the AF process is performed with the focus evaluation value search range limited to a predetermined range around (vicinity of) the position of the focus lens when the main photographic subject is recognized. As a result, focusing can be performed more quickly.

Third Embodiment

Figure 27A:
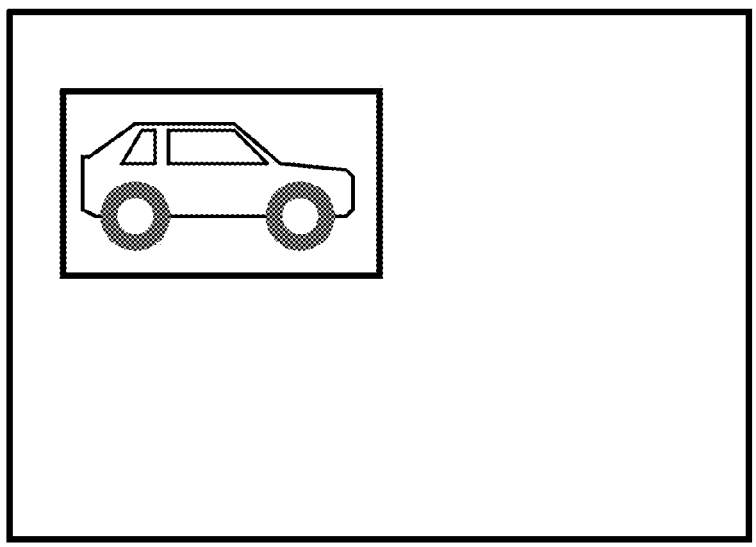
FIG. 27A is an explanatory diagram of an automatic tracking function (part 1).
Figure 27B:
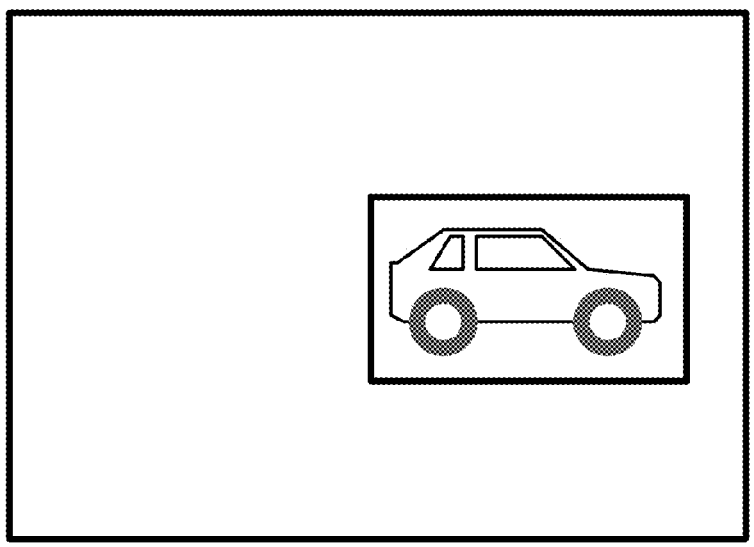
FIG. 27B is an explanatory diagram of the automatic tracking function (part 2).

An automatic tracking function is known as a mode of the continuous AF. FIGS. 27A and 27B are diagrams for describing the automatic tracking function with an example in which the subject is a car moving from left to right in the drawings. When a photographic subject to be focused is designated, the automatic tracking function automatically moves the focus area according to the movement of the photographic subject and continuously focuses on the designated photographic subject as shown in FIGS. 27A and 27B.

In the present embodiment, the recognition process of the main photographic subject is performed in the live view, and the recognized main photographic subject is automatically set as a target of automatic tracking.

Figure 28:
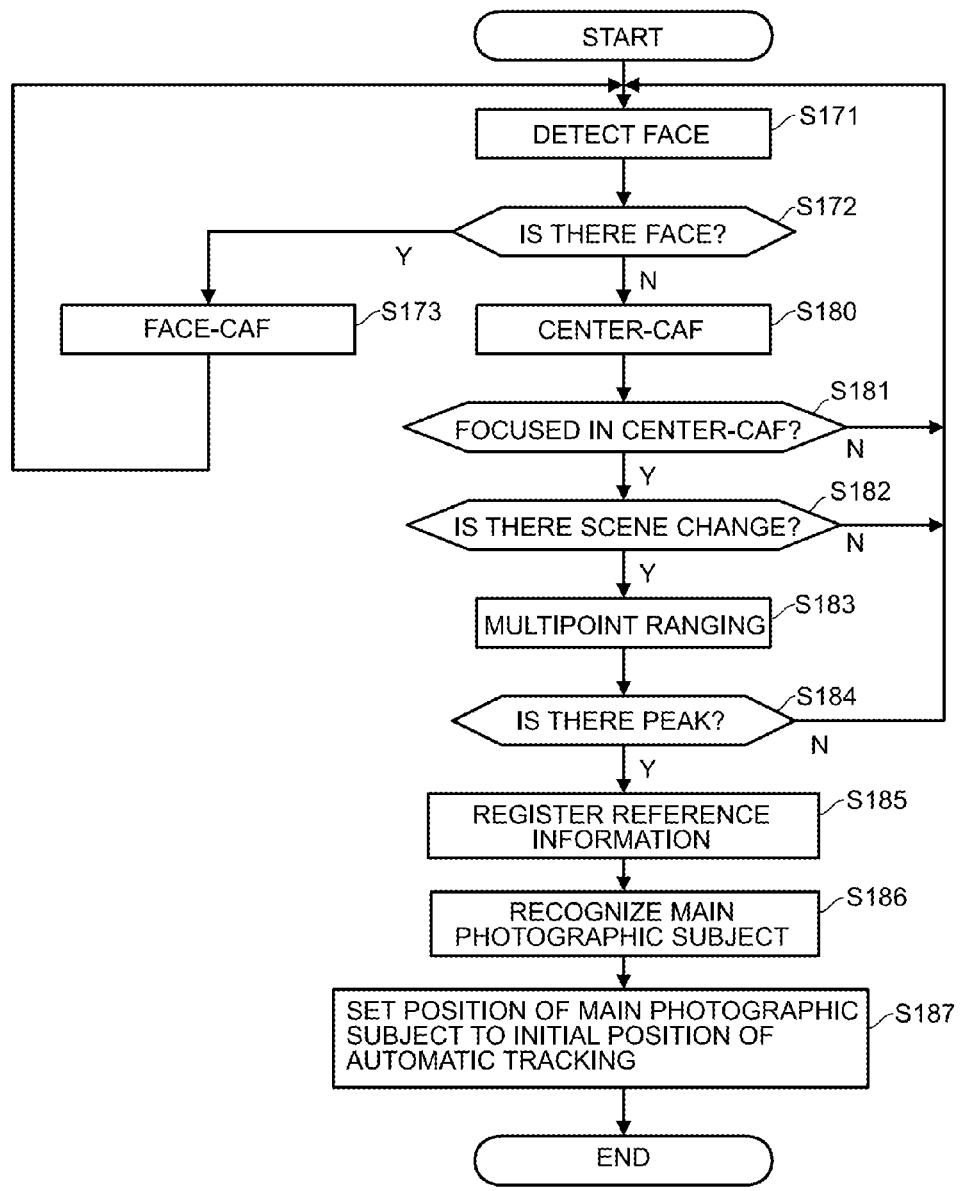
FIG. 28 is a flow chart showing a procedure of a process for setting a position of the main photographic subject recognized in the live view as a target of the automatic tracking.

FIG. 28 is a flow chart showing a procedure of the process for setting the position of the main photographic subject recognized in the live view as a target of automatic tracking.

The process of face detection is performed (step S171), and whether a face is detected is determined (step S172). If a face is detected, the focus area is set to the position of the detected face, and the face continuous AF is performed (step S173). The face continuous AF is performed until the face is not detected.

On the other hand, if a face is not detected, the focus area is set to the screen center, and the center continuous AF is performed (step S180). Whether focusing is attained in the continuous AF (or whether focusing is almost attained) is determined (step S181).

If focusing is not attained in the continuous AF, the process returns to step S171, and the face detection is performed again.

On the other hand, if focusing is attained in the continuous AF (or if focusing is almost attained), whether the photographing scene has changed is determined (step S182).

In the detection of the scene change here, the image registered in advance and the currently taken image are compared, and whether there is a change of the scene is determined. The image to be compared is an image when the main photographic subject is recognized. Therefore, the multipoint ranging is executed without determining the presence/absence of the scene change in the first time.

If there is no scene change, the process returns to step S171, and the face detection is performed again.

On the other hand, if the scene has changed, the center continuous AF is terminated, and the multipoint ranging is carried out (step S183).

The main photographic subject recognition unit 86 acquires the information of the focus evaluation value of each ranging area obtained by the multipoint ranging and detects the position where the focus evaluation value is the local maximum (peak) in each ranging area. Based on the detection result, whether there is a ranging area in which the peak is detected is determined (step S144). In this case, it is assumed that the peak is not detected when the peak is not (cannot be) detected as well as when the detected peak (local maximum value) is smaller than a preset threshold.

As a result of the determination, if it is determined that there is no ranging area in which the peak is detected, the process returns to step S171, and the face detection is performed again.

On the other hand, if it is determined that there is a ranging area in which the peak is detected, the image is imported and registered as a reference image for comparison (step S185). The process is executed by, for example, recording the reference image for comparison in the frame memory 74.

After the registration of the reference image for comparison, the recognition process of the main photographic subject is executed based on the result of the multipoint ranging (step S186). The position of the recognized main photographic subject is set as the initial position of the automatic tracking (step S187).

In this way, the recognition process of the main photographic subject is performed during the live view, and the position of the recognized main photographic subject is automatically set as the initial position of the automatic tracking in the present embodiment. As a result, the photographer does not have to perform a designation process of the initial position in the automatic tracking, and the usability of the digital camera can be improved.

<<Recognition Process of Main Photographic Subject>>

As described, in the recognition of the main photographic subject based on the multipoint ranging, the distance and the position in the screen are weighted and added (added with weighting) based on two hypotheses that "it is likely that a subject closer to the center of the screen is the main photographic subject" and that "it is likely that a subject at a closer range is the main photographic subject", and the main photographic subject likelihood is numerically expressed. An area in which the numeric value is the maximum is recognized as the position of the main photographic subject.

In this case, the detection accuracy of the main photographic subject remains at the sampling interval level of the ranging area. Since the ranging areas are set by dividing the screen 5×7 in the example described above, the photographic subject is detected in the range of the divided ranging areas.

Therefore, the main photographic subject is detected by the following methods to more accurately detect the main photographic subject.

<First Method>

As described, in the method of numerically expressing the main photographic subject likelihood of each ranging area based on the result of the multipoint ranging to detect the position of the main photographic subject, the detection accuracy remains at the sampling interval level of the ranging area.

Figure 29A:
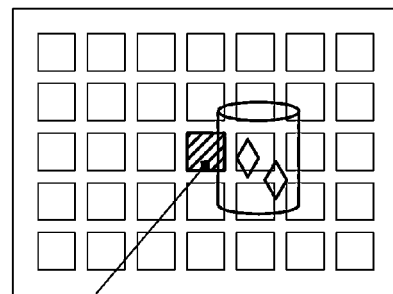
FIG. 29A is an explanatory diagram of a first method of the recognition process of the main photographic subject (part 1).
Figure 29B:
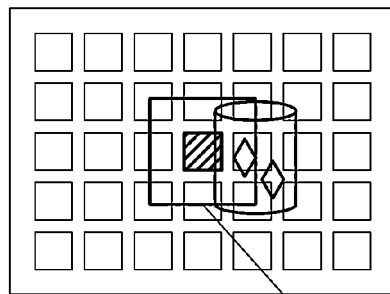
FIG. 29B is an explanatory diagram of the first method of the recognition process of the main photographic subject (part 2).
Figure 29C:
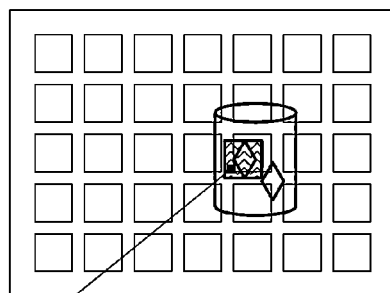
FIG. 29C is an explanatory diagram of the first method of the recognition process of the main photographic subject (part 3).

Therefore, after the detection of the position of the main photographic subject based on the method, a detailed search is executed based on the position. Specifically, as shown in FIGS. 29A to 29C, the main photographic subject likelihood of each ranging area is numerically expressed (numerically converted) based on the result of the multipoint ranging, and the ranging area including the main photographic subject is detected (FIG. 29A). The center of the detected ranging area is set as a base point and the range (detailed search range) to be searched in detail is set (FIG. 29B). A detailed position of the main photographic subject is found in the set main photographic subject detailed search range, and a final position of the main photographic subject is determined (FIG. 29C).

In finding the detailed position of the main photographic subject in the main photographic subject detailed search range, the amount of edge components, the size of the lump (agglomerate) of colors of the same type (similar colors), and the like serve as indicators in the evaluation of the main photographic subject likelihood. The methods for ultimately determining the position are roughly divided into the following two methods.

(i) Maximum value priority: method for setting a position with the greatest main photographic subject likelihood in the main photographic subject detailed search range as the position of the main photographic subject.

(ii) Center priority: method in which the main photographic subject detailed search range is searched from the center toward the outside and a position when the evaluation value of the main photographic subject likelihood exceeds a reference value (threshold) is set as the position of the main photographic subject.

It is preferable that the designer can select whether to use the maximum value priority or the center priority.

Figure 30:
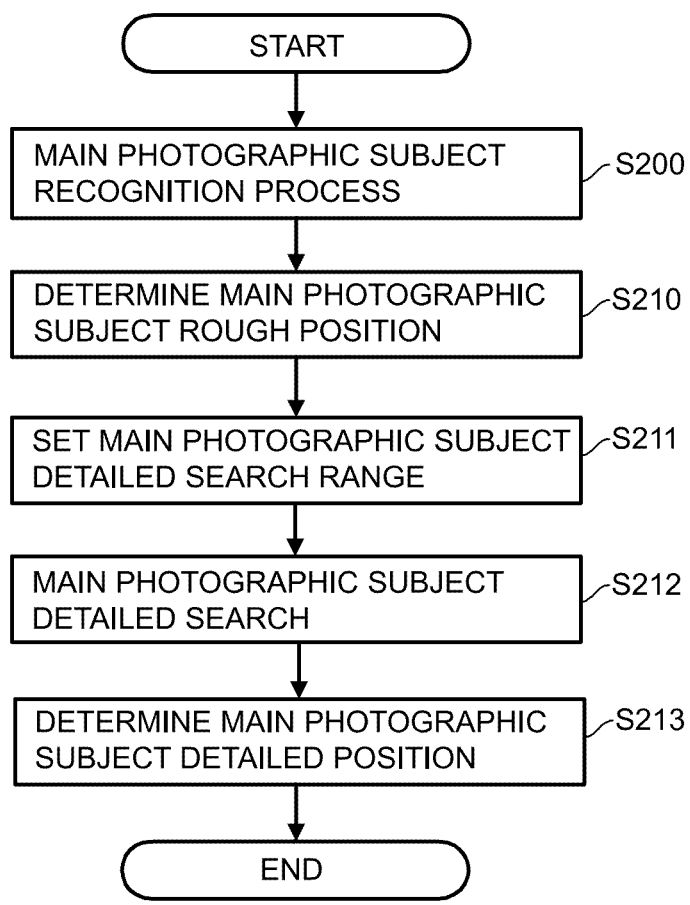
FIG. 30 is a flow chart showing a procedure of detecting the main photographic subject by the first method.

FIG. 30 is a flow chart showing a procedure of detecting the main photographic subject by the present method (first method).

The recognition process of the main photographic subject based on the multipoint ranging is performed (step S200). The process is performed by the method of one of the recognition processes of the main photographic subject according to the first to eleventh embodiments.

As shown in FIG. 29A, the center of the ranging area recognized as the main photographic subject is set as a main photographic subject candidate, and the position is set as a main photographic subject rough position (step S210).

As shown in FIG. 29B, a range for performing the detailed search (main photographic subject detailed search range) is set based on the set main photographic subject rough position (step S211). Then, the detailed search is performed in the set main photographic subject detailed search range (step S212).

As described, the amount of edge components, the size of the lump of colors of the same type (similar colors), and the like serve as the indicators of the evaluation of the main photographic subject likelihood, and the detailed search is performed by the method of one of the maximum value priority and the center priority.

As a result of the detailed search, the detected position of the main photographic subject is set as the main photographic subject detailed position as shown in FIG. 29C (step S213).

In this way, the rough position of the main photographic subject is first determined based on the result of the multipoint ranging, the main photographic subject detailed search range is determined based on the determined rough position, and then the detailed search is executed. In this way, the main photographic subject can be highly accurately detected. Since the main photographic subject detailed search range is limited, efficient search is possible.

<Second Method>

Figure 31A:
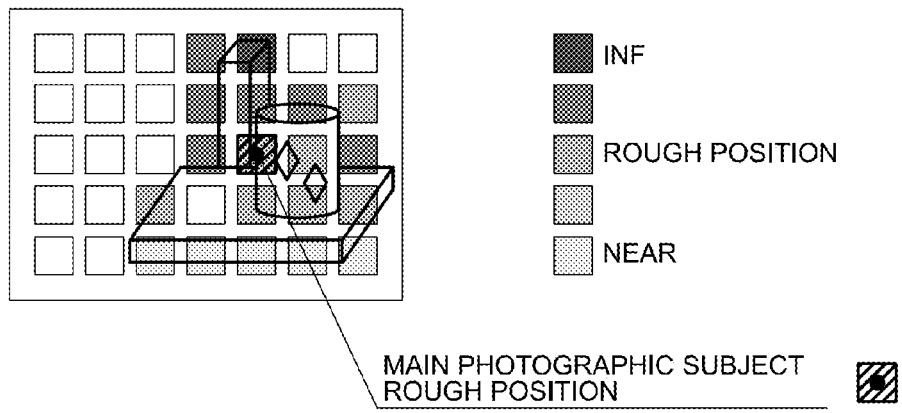
FIG. 31A is an explanatory diagram of a second method of the recognition process of the main photographic subject (part 1).
Figure 31B:
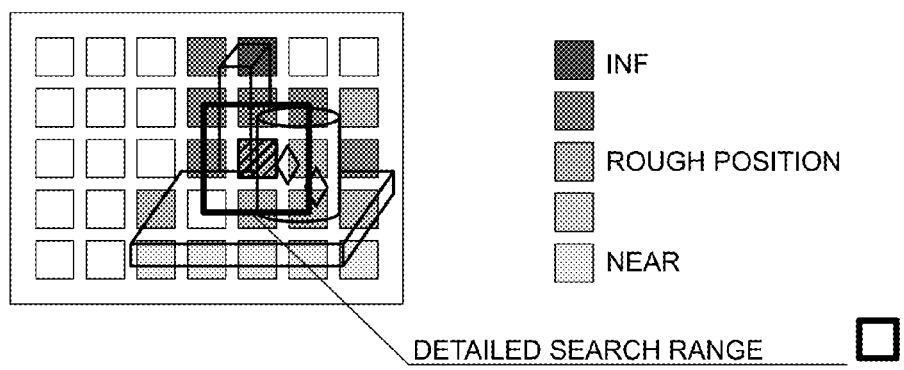
FIG. 31B is an explanatory diagram of the second method of the recognition process of the main photographic subject (part 2).
Figure 31C:
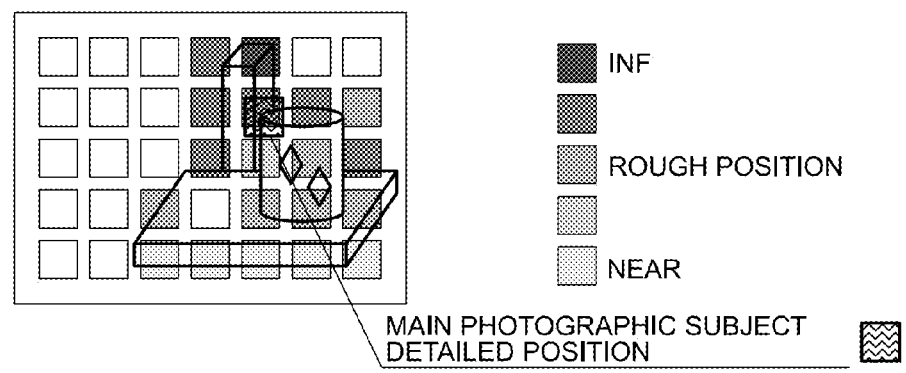
FIG. 31C is an explanatory diagram of the second method of the recognition process of the main photographic subject (part 3).

When the amount of edge components serves as an indicator in determining the detailed position in the detailed search, there is a case in which the position of an object in the background is recognized as the main photographic subject, affected by (following to) the edge components in the background (see FIGS. 31A to 31C).

Therefore, the result of the multipoint ranging is used to create a distance map based on a photographic subject distance of the rough position of the main photographic subject. In the main photographic subject detailed search range, a section (part) in which the photographic subject distance (distance to the photographic subject) is close to the rough position is set as a target section of main photographic subject detailed search, whereas a section (part) in which that distance is far is removed from the target. In this way, the main photographic subject detailed search range is corrected. The detailed search is executed for the corrected main photographic subject detailed search range. In this way, the detailed search can be executed only for a section in which the photographic subject distance is close, thereby accurately detecting the detailed position of the main photographic subject.

Figure 32:
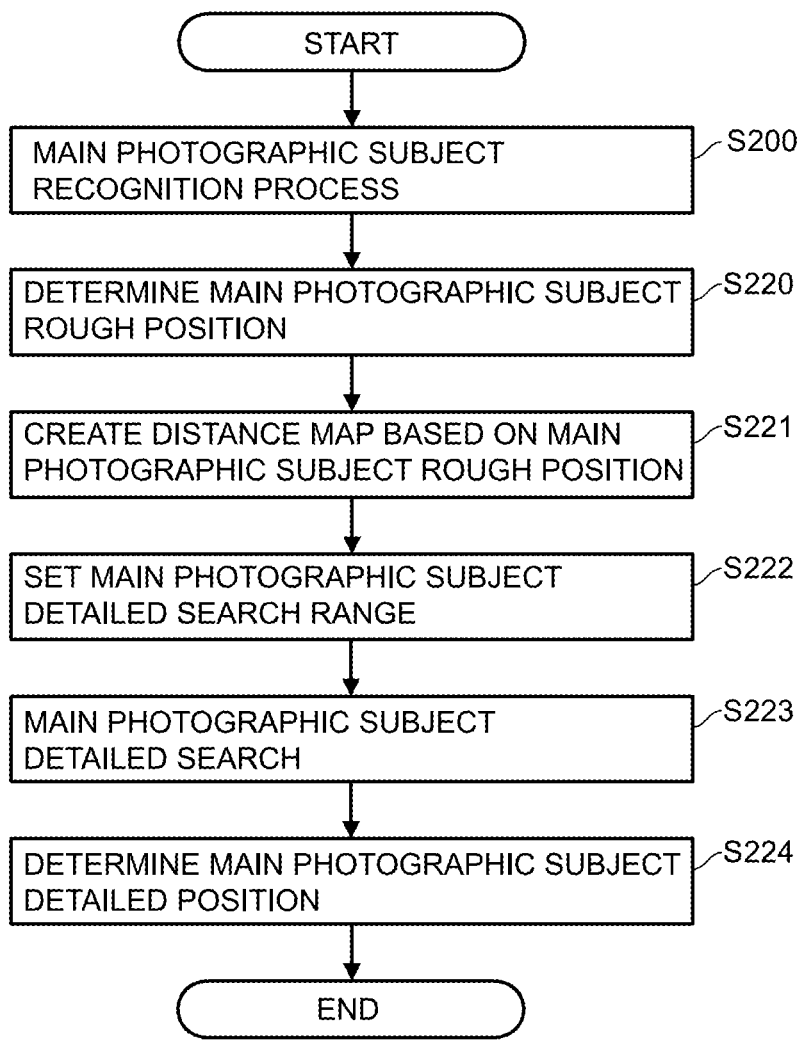
FIG. 32 is a flow chart showing a procedure of detecting the main photographic subject by the second method.

FIG. 32 is a flow chart showing a procedure of detecting the main photographic subject by the present method (second method).

The recognition process of the main photographic subject based on the multipoint ranging is performed (step S200). The process is performed by the method of one of the recognition processes of the main photographic subject of the first to eleventh embodiments.

Figure 33A:
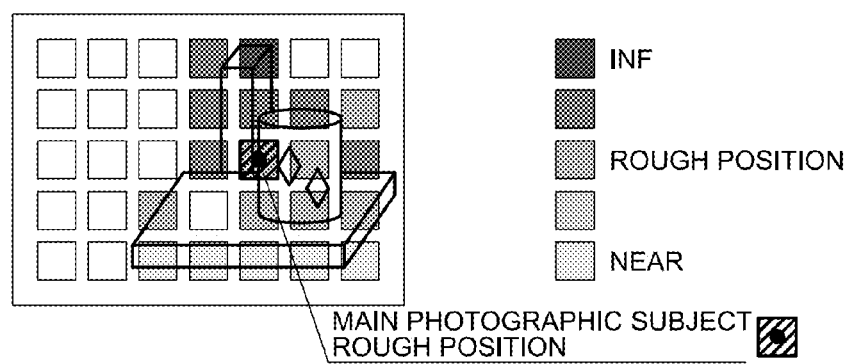
FIG. 33A is an explanatory diagram of the second method of the recognition process of the main photographic subject (part 1).
Figure 33B:
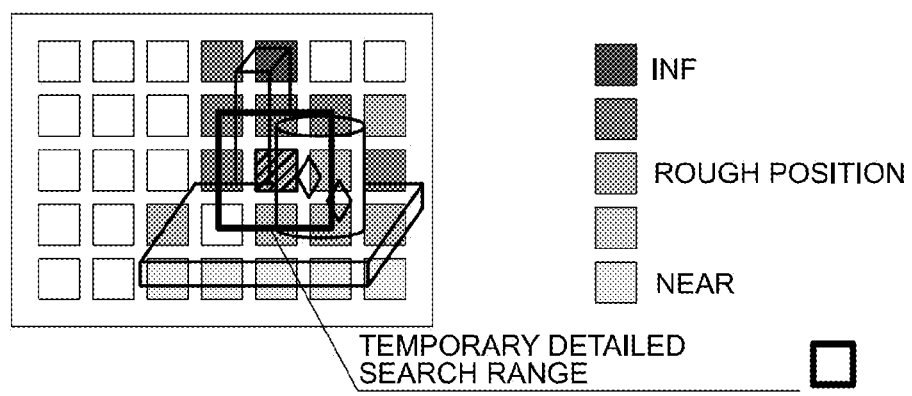
FIG. 33B is an explanatory diagram of the second method of the recognition process of the main photographic subject (part 2).
Figure 33C:
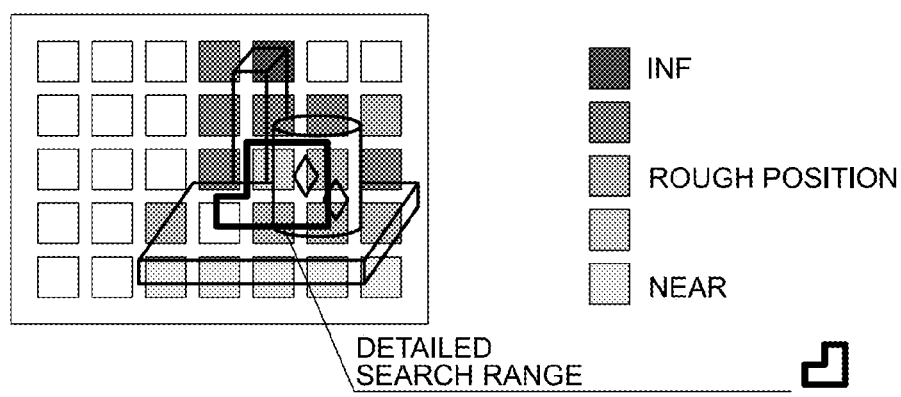
FIG. 33C is an explanatory diagram of the second method of the recognition process of the main photographic subject (part 3).

As shown in FIG. 33A, the center position of the ranging area recognized as the main photographic subject is set as the main photographic subject rough position (step S220).

The distance map is created based on the main photographic subject rough position (step S221). In FIGS. 33A to 33D, the distance from the main photographic subject rough position is expressed by the strength of shading color (the color is darker toward the infinity, and the color is lighter toward the nearest point).

The main photographic subject detailed search range is set with reference to the created distance map (step S222). In the process, the main photographic subject detailed search range is temporarily set based on the main photographic subject rough position (see FIG. 33B). The temporarily set main photographic subject detailed search range is corrected with reference to the distance map, and the final main photographic subject detailed search range is determined (see FIG. 33C). As described, the main photographic subject detailed search range is corrected by removing the section a section (part) in which the photographic subject distance is far from the rough position from the search target.

Figure 33D:
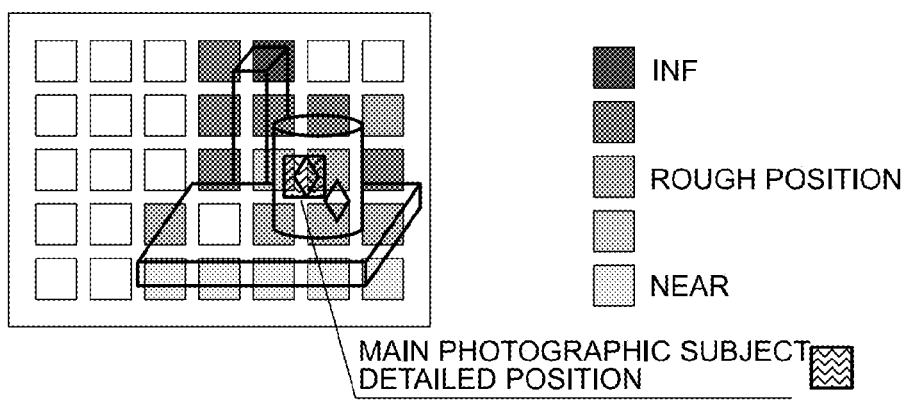
FIG. 33D is an explanatory diagram of the second method of the recognition process of the main photographic subject (part 4).

After the main photographic subject detailed search range is set, the detailed search is performed in the set main photographic subject detailed search range (step S223). As shown in FIG. 33D, the position of the main photographic subject detected as a result of the detailed search is determined as the main photographic subject detailed position (step S224).

In this way, the range of the detailed search can be limited based on the result of the multipoint ranging to more accurately detect the main photographic subject. The main photographic subject detailed search range can also be limited to reduce the search time.

<Third Method>

Figure 34:
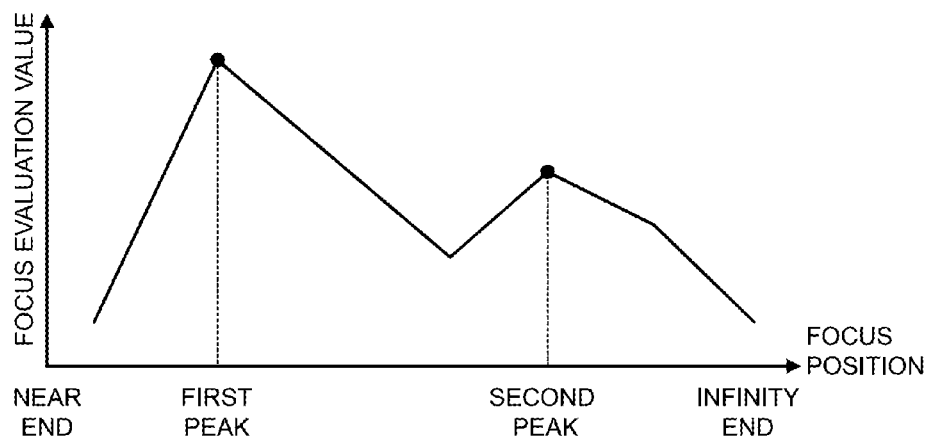
FIG. 34 is an explanatory diagram of a third method of the recognition process of the main photographic subject.

As described, the multipoint ranging can be performed to obtain the distance information of each ranging area. In this case, if the focus evaluation value has double peaks in the distance information (see FIG. 34), there is a possibility that the main photographic subject detection is affected (followed) by the background due to side effects of the detailed search.

Even if the double peaks are correctly handled to avoid influence of the background at the stage of the multipoint ranging (for example, limiting the focus evaluation value search range), the determination of the detailed position should be executed while preventing the influence of the edge information or the like of the background in the detailed search.

Therefore, the area with double peaks and the vicinity of the area are excluded from the search target in the detailed search to thereby reduce the side effects of the detailed search.

Figure 35:
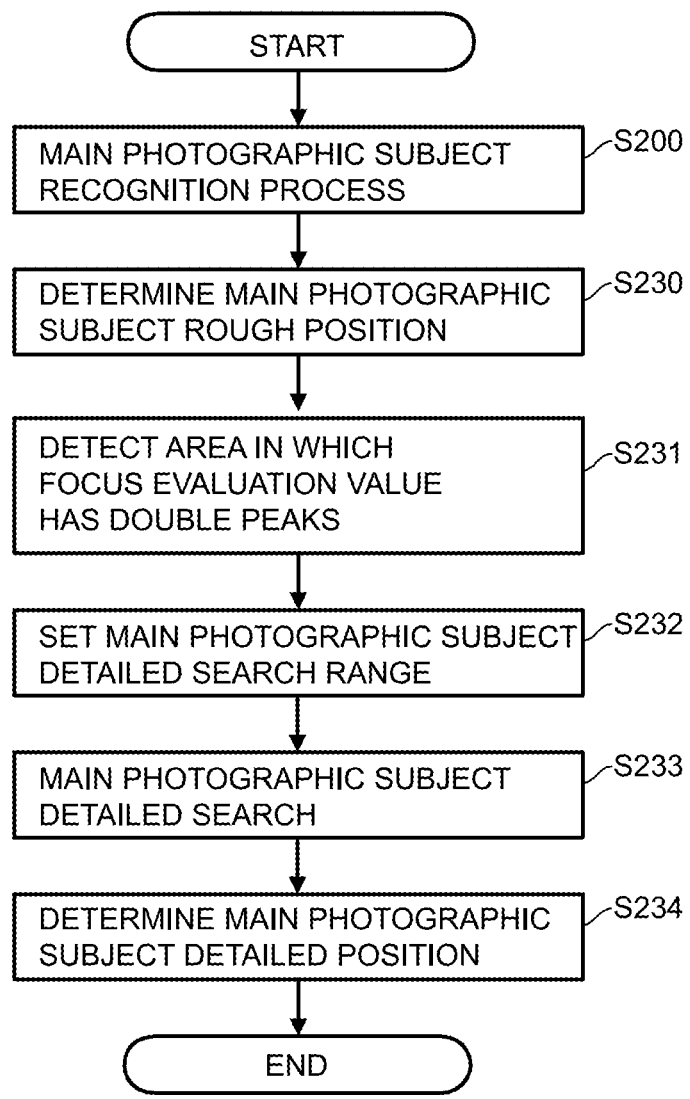
FIG. 35 is a flow chart showing a procedure of detecting the main photographic subject by the third method.

FIG. 35 is a flow chart showing a procedure of detecting the main photographic subject by the present method (third method).

The recognition process of the main photographic subject based on the multipoint ranging is performed (step S200). The process is performed by the method of one of the recognition processes of the main photographic subject of the first to eleventh embodiments.

Figure 36A:
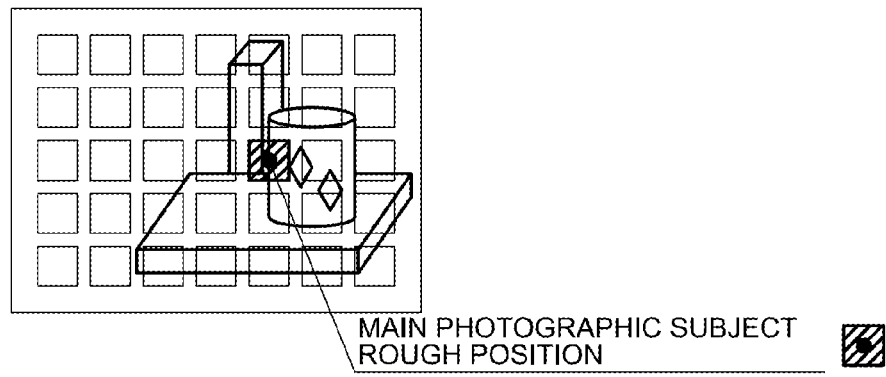
FIG. 36A is an explanatory diagram of the third method of the recognition process of the main photographic subject (part 1).

As shown in FIG. 36A, the center position of the ranging area recognized as the main photographic subject is set as the main photographic subject rough position (step S230).

The ranging area with double peaks is detected based on the result of the multipoint ranging (step S231).

Figure 36B:
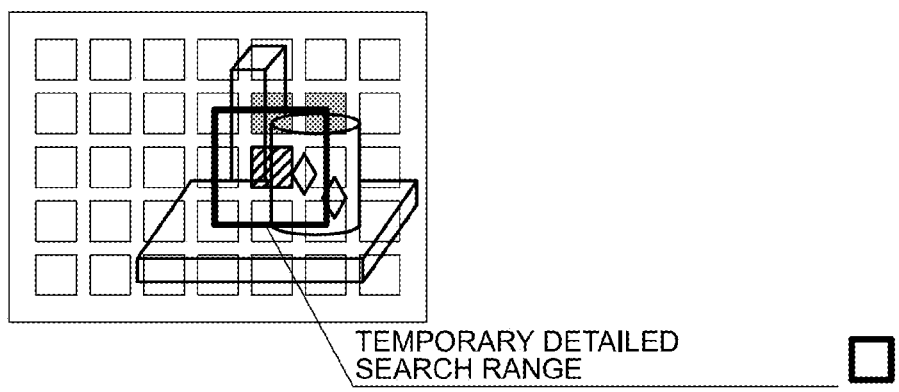
FIG. 36B is an explanatory diagram of the third method of the recognition process of the main photographic subject (part 2).
Figure 36C:
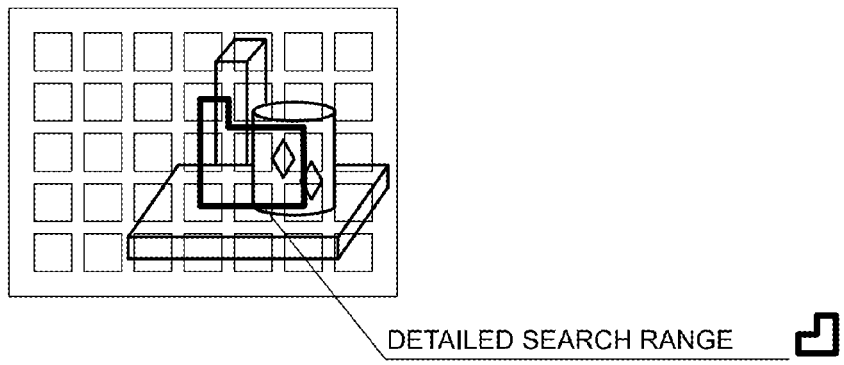
FIG. 36C is an explanatory diagram of the third method of the recognition process of the main photographic subject (part 3).

The main photographic subject detailed search range is set (step S232). In the process, the main photographic subject detailed search range is temporarily set based on the main photographic subject rough position as shown in FIG. 36B. As shown in FIG. 36C, the area with double peaks in the temporarily set main photographic subject detailed search range and the vicinity of the area are removed, and the final main photographic subject detailed search range is determined. In FIG. 36C, the ranging area with double peaks is illustrated in gray.

Figure 36D:
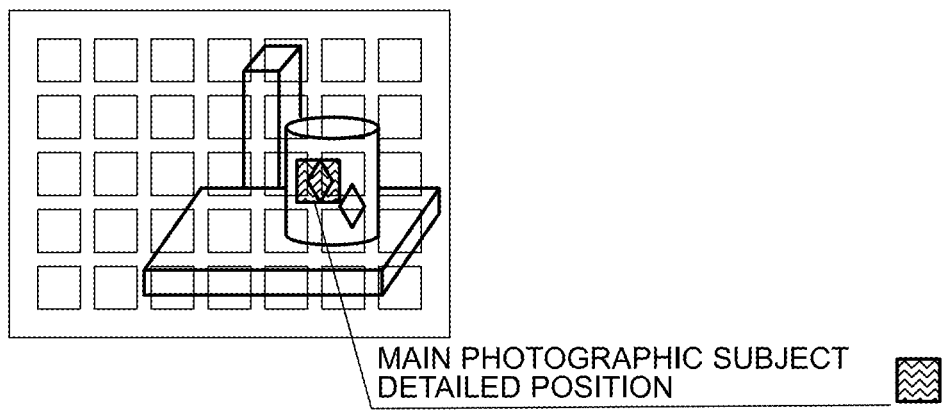
FIG. 36D is an explanatory diagram of the third method of the recognition process of the main photographic subject (part 4).

After the main photographic subject detailed search range is set, the detailed search is performed in the set main photographic subject detailed search range (step S233). As shown in FIG. 36D, the position of the main photographic subject detected as a result of the detailed search is determined as the main photographic subject detailed position (step S234).

In this way, the area with double peaks and the vicinity of the area are removed from the search target in the detailed search. As a result, the side effects of the detailed search can be inhibited; and the main photographic subject can be highly accurately detected.

<Fourth Method>

In the present method, the position with the photographic subject distance far from the main photographic subject rough position is removed from the target of the detailed search, and the area with double peaks and the vicinity of the area are removed from the target of the detailed search, and then the detailed search is executed.

Figure 37:
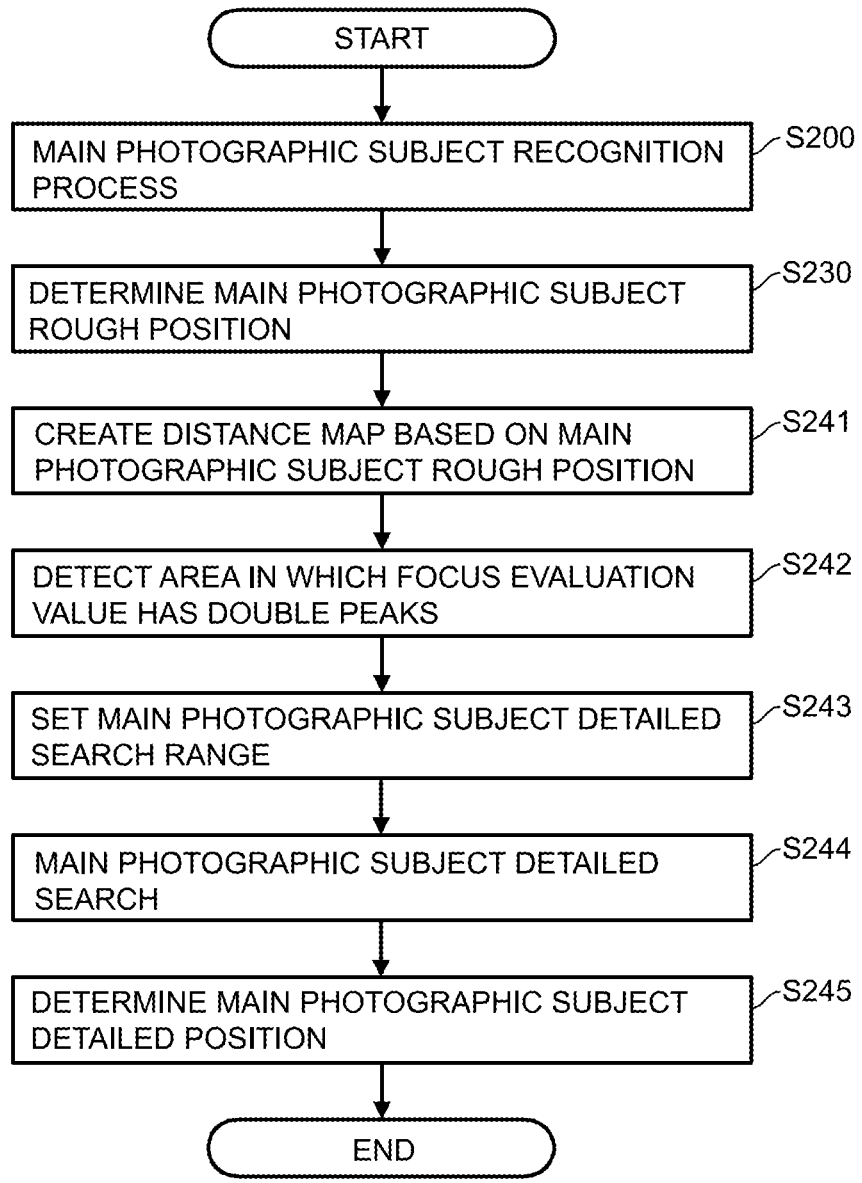
FIG. 37 is a flow chart showing a procedure of detecting the main photographic subject by a fourth method.

FIG. 37 is a flow chart showing a procedure of detecting the main photographic subject by the present method (fourth method).

The recognition process of the main photographic subject based on the multipoint ranging is performed (step S200). The process is performed by the method of one of the recognition processes of the main photographic subject of the first to eleventh embodiments.

Figure 38A:
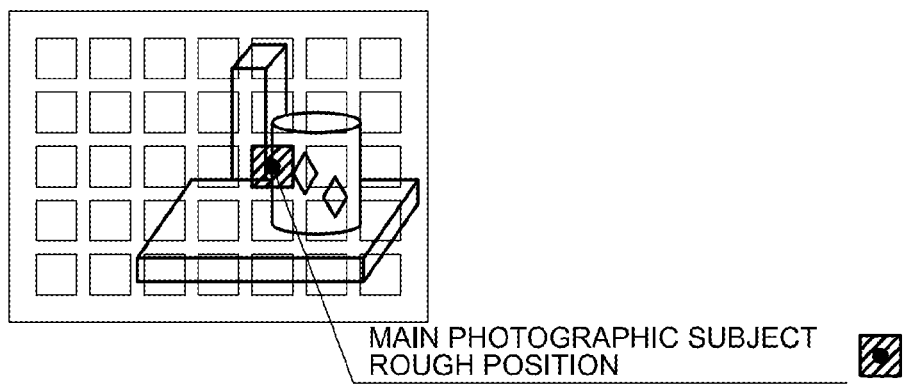
FIG. 38A is an explanatory diagram of the fourth method of the recognition process of the main photographic subject (part 1).

When the main photographic subject is recognized, the center position of the recognized ranging area is set as the main photographic subject rough position as shown in FIG. 38A (step S240).

The distance map is created based on the main photographic subject rough position (step S241).

Based on the result of the multipoint ranging, the ranging area with double peaks is detected (step S242).

Figure 38B:
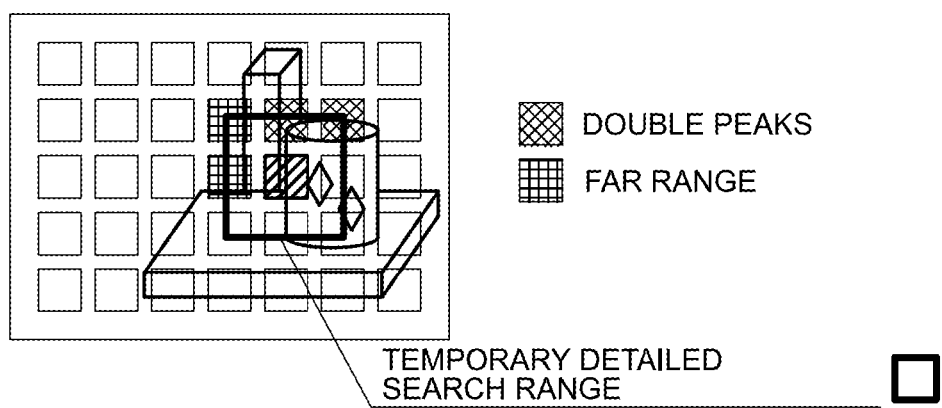
FIG. 38B is an explanatory diagram of the fourth method of the recognition process of the main photographic subject (part 2).
Figure 38C:
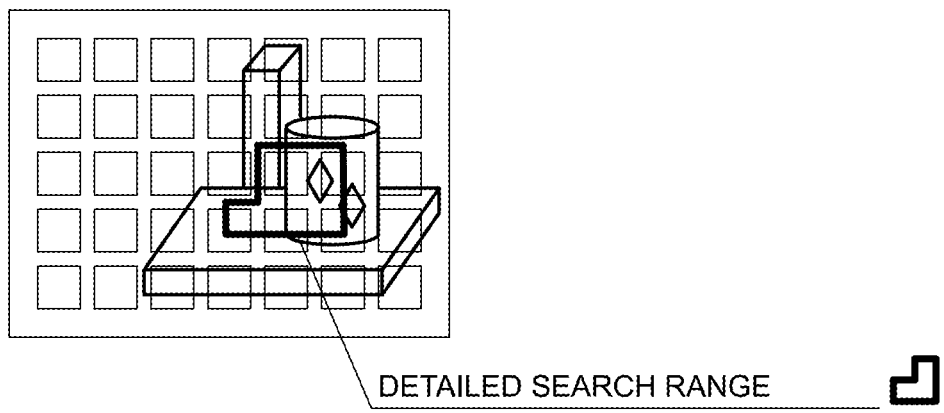
FIG. 38C is an explanatory diagram of the fourth method of the recognition process of the main photographic subject (part 3).

The main photographic subject detailed search range is set with reference to the distance map and the detection result of the ranging area with double peaks (step S242). In the process, the main photographic subject detailed search range is temporarily set based on the main photographic subject rough position as shown in FIG. 38B. As shown in FIG. 38C, the area with double peaks in the temporarily set main photographic subject detailed search range and the vicinity of the area are removed. The section where the photographic subject distance is far from the main photographic subject rough position is removed from the search target, and the final main photographic subject detailed search range is determined. In FIG. 38C, the area removed as being the area with double peaks is expressed by a diagonal lattice, and the removed area at a far distance from the main photographic subject rough position is expressed by a lattice.

Figure 38D:
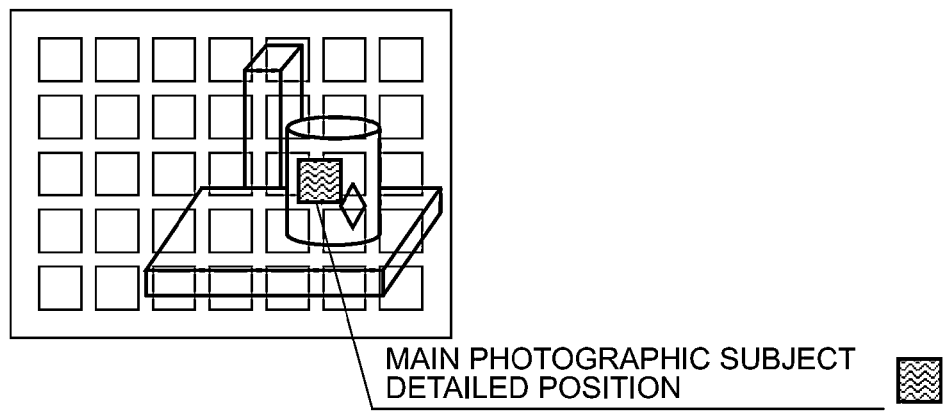
FIG. 38D is an explanatory diagram of the fourth method of the recognition process of the main photographic subject (part 4).

After the main photographic subject detailed search range is set, the detailed search is performed in the set main photographic subject detailed search range (step S244). As shown in FIG. 38D, the position of the main photographic subject detected as a result of the detailed search is determined as the main photographic subject detailed position (step S245).

In this way, the area with double peaks, the vicinity of the area and the section far from the main photographic subject rough position are excluded from the search target in the detailed search. As a result, the side effects of the detailed search can be reduced, and the main photographic subject can be highly accurately detected.

<Fifth Method>

In the detailed search, the main photographic subject detailed search range can be adjusted according to the size of the primary photographic object in the screen, thereby enabling to perform accurate and efficient search.

In general, it is contemplated that the main photographic subject is larger in the screen as the subject is at a closer range (nearest point side).

Figure 39A:
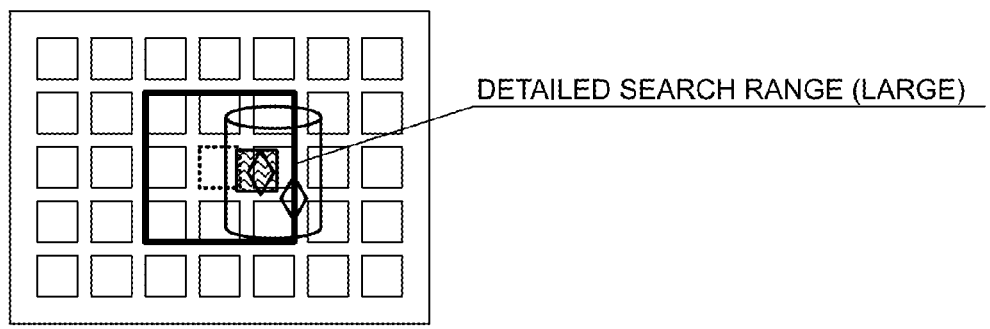
FIG. 39A is an explanatory diagram of a fifth method of the recognition process of the main photographic subject (part 1).
Figure 39B:
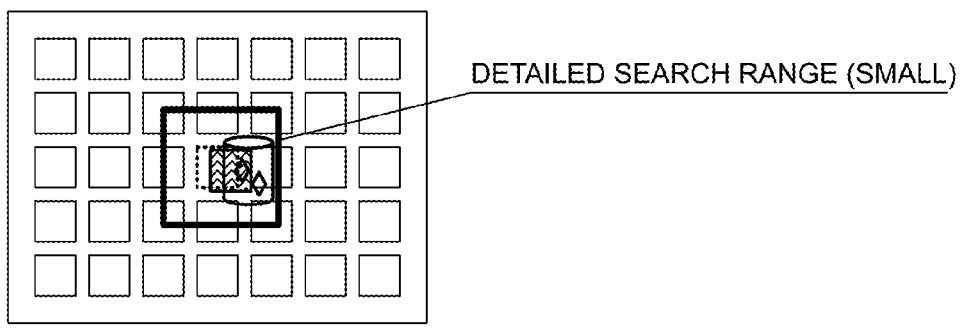
FIG. 39B is an explanatory diagram of the fifth method of the recognition process of the main photographic subject (part 2).

Therefore, as shown in FIGS. 39A and 39B, the main photographic subject detailed search range is adjusted according to the main photographic subject rough position. More specifically, the main photographic subject detailed search range is set such that the main photographic subject detailed search range becomes larger as the main photographic subject rough position is closer to the nearest point side (FIG. 39A) and that the main photographic subject detailed search range becomes smaller as the main photographic subject rough position is closer to the infinity side (FIG. 39B).

The methods of adjusting the main photographic subject detailed search range in the screen include the following two methods.

(i) Increase the size of the main photographic subject detailed search range without changing the size of the entire image.

(ii) Change the size of the entire screen and fix the main photographic subject detailed search range.

A similar advantage can be attained by adopting either one of the methods.

Figure 40:
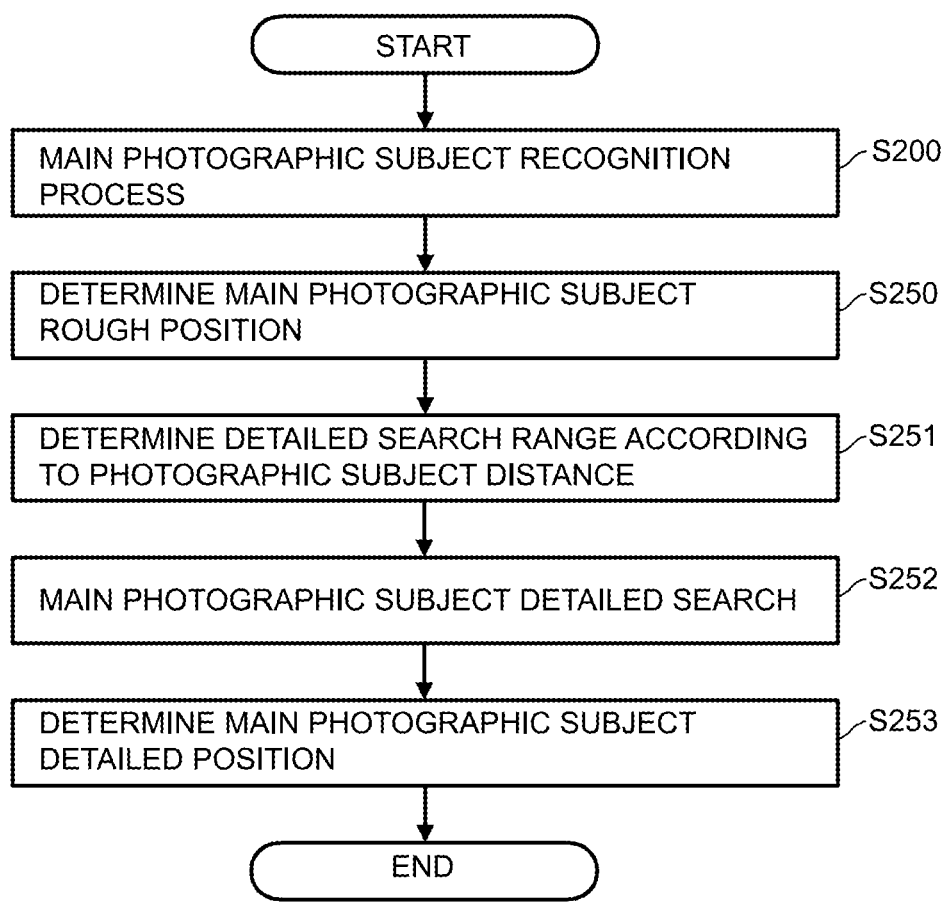
FIG. 40 is a flow chart showing a procedure of detecting the main photographic subject by the fifth method.

FIG. 40 is a flow chart showing a procedure of detecting the main photographic subject by the present method (fifth method).

The recognition process of the main photographic subject based on the multipoint ranging is performed (step S200). The process is performed by the method of one of the recognition processes of the main photographic subject of the first to eleventh embodiments.

The center position of the ranging area recognized as the main photographic subject is set as the main photographic subject rough position (step S250).

Based on the main photographic subject rough position and the photographic subject distance information (peak position (optical axis direction)), the search range (main photographic subject detailed search range) for performing the detailed search is determined (step S251). Specifically, while setting the main photographic subject rough position as a center, the main photographic subject detailed search range is set with its area expanded or reduced according to the photographic subject distance of the main photographic subject rough position. In this case, the main photographic subject detailed search range is set such that its size becomes larger as the main photographic subject rough position is closer to the nearest point, as described above.

After the main photographic subject detailed search range is set, the detailed search is performed in the set main photographic subject detailed search range (step S252). The position of the main photographic subject detected as a result of the detailed search is determined as the main photographic subject detailed position (step S253).

In this way, the main photographic subject detailed search range is adjusted according to the size of the main photographic subject in the screen, thereby enabling to perform accurate and efficient search in the detailed search.

<Sixth Method>

As described in the fifth method, the main photographic subject detailed search range is adjusted according to the size of the main photographic subject in the screen, thereby enabling to perform accurate and efficient search.

When an image is taken by zooming, it is generally contemplated that the main photographic subject is larger in size in the screen as the zoom is set closer to the telephoto side.

Figure 41A:
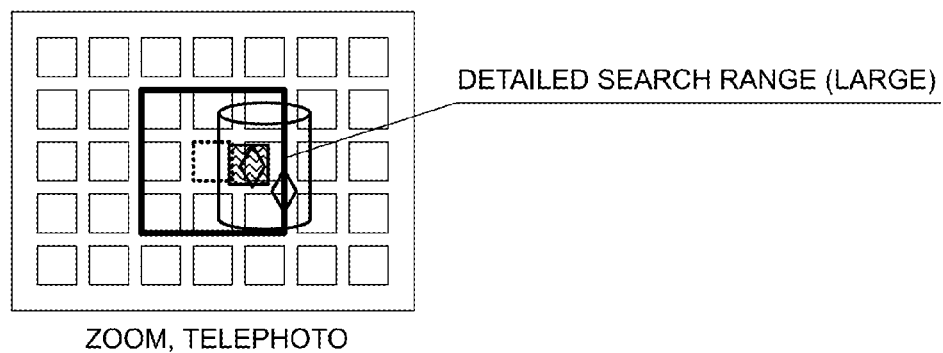
FIG. 41A is an explanatory diagram of a sixth method of the recognition process of the main photographic subject (part 1).
Figure 41B:
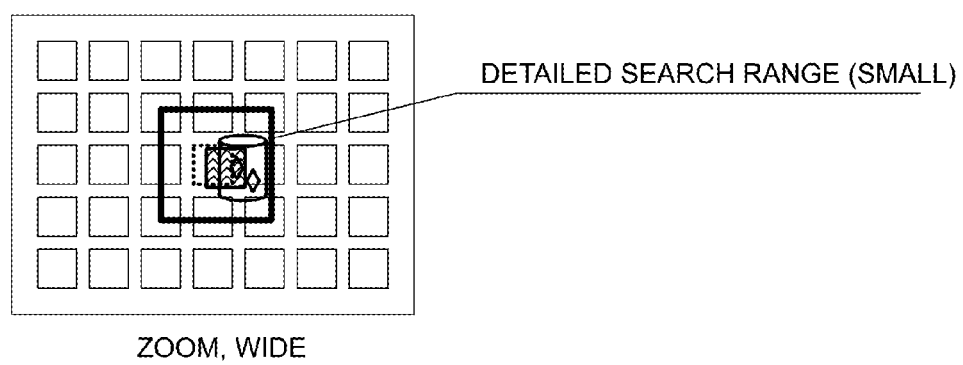
FIG. 41B is an explanatory diagram of the sixth method of the recognition process of the main photographic subject (part 2).

Therefore, the main photographic subject detailed search range is adjusted according to the zoom position as shown in FIGS. 41A and 41B. More specifically, the size of the main photographic subject detailed search range is set larger as the zoom position is closer to the telephoto side (FIG. 41A), whereas the size of the main photographic subject detailed search range is set smaller as the zoom position is closer to the wide-angle side (FIG. 41B).

The methods of adjusting the main photographic subject detailed search range in the screen include the following two methods.

(i) Increase the size of the main photographic subject detailed search range without changing the size of the entire image.

(ii) Change the size of the entire screen and fix the main photographic subject detailed search range.

A similar effect can be attained by adopting either one of the methods.

Figure 42:
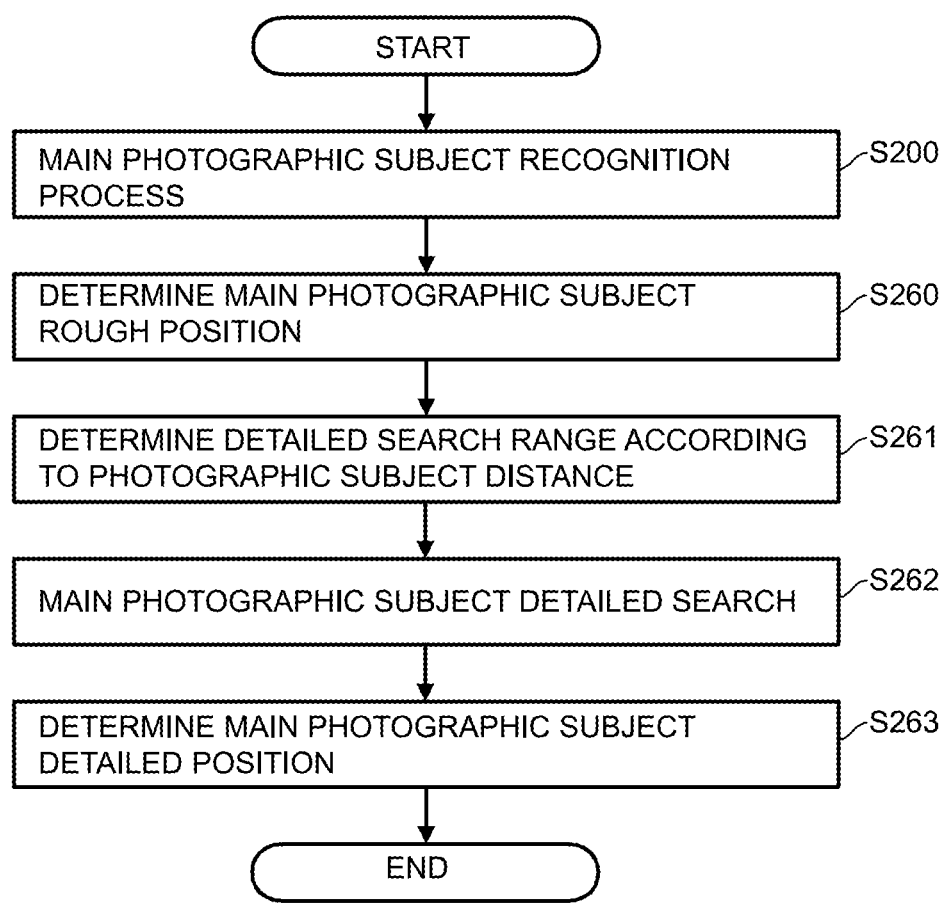
FIG. 42 is a flow chart showing a procedure of detecting the main photographic subject by the sixth method.

FIG. 42 is a flow chart showing a procedure of detecting the main photographic subject by the present method (sixth method).

The recognition process of the main photographic subject based on the multipoint ranging is performed (step S200). The process is performed by the method of one of the recognition processes of the main photographic subject of the first to eleventh embodiments.

The center position of the ranging area recognized as the main photographic subject is set as the main photographic subject rough position (step S260).

The position information of the zoom is acquired. Based on the acquired position information of the zoom and the position information of the main photographic subject rough position, the search range for the detailed search (main photographic subject detailed search range) is determined (step S261). Specifically, while setting the main photographic subject rough position as a center, the main photographic subject detailed search range is set with its area expanded or reduced according to the zoom position. In this case, the main photographic subject detailed search range (area) is set larger as the zoom is closer to the telephoto side as described above.

After the main photographic subject detailed search range is set, the detailed search is performed in the set main photographic subject detailed search range (step S262). As a result of the detailed search, the detected position of the main photographic subject is determined as the main photographic subject detailed position (step S263).

In this way, the main photographic subject detailed search range can be adjusted according to the size of the main photographic subject in the screen, thereby enabling to perform accurate and efficient search in the detailed search.

<Seventh Method>

In the present method, even if the position of the main photographic subject detected by the detailed search (main photographic subject temporary detailed position) is displaced (shifted) from the main photographic subject rough position, the size of the displacement between the positions is prevented from being larger than a certain level (prevented from being significantly displaced).

Figure 43:
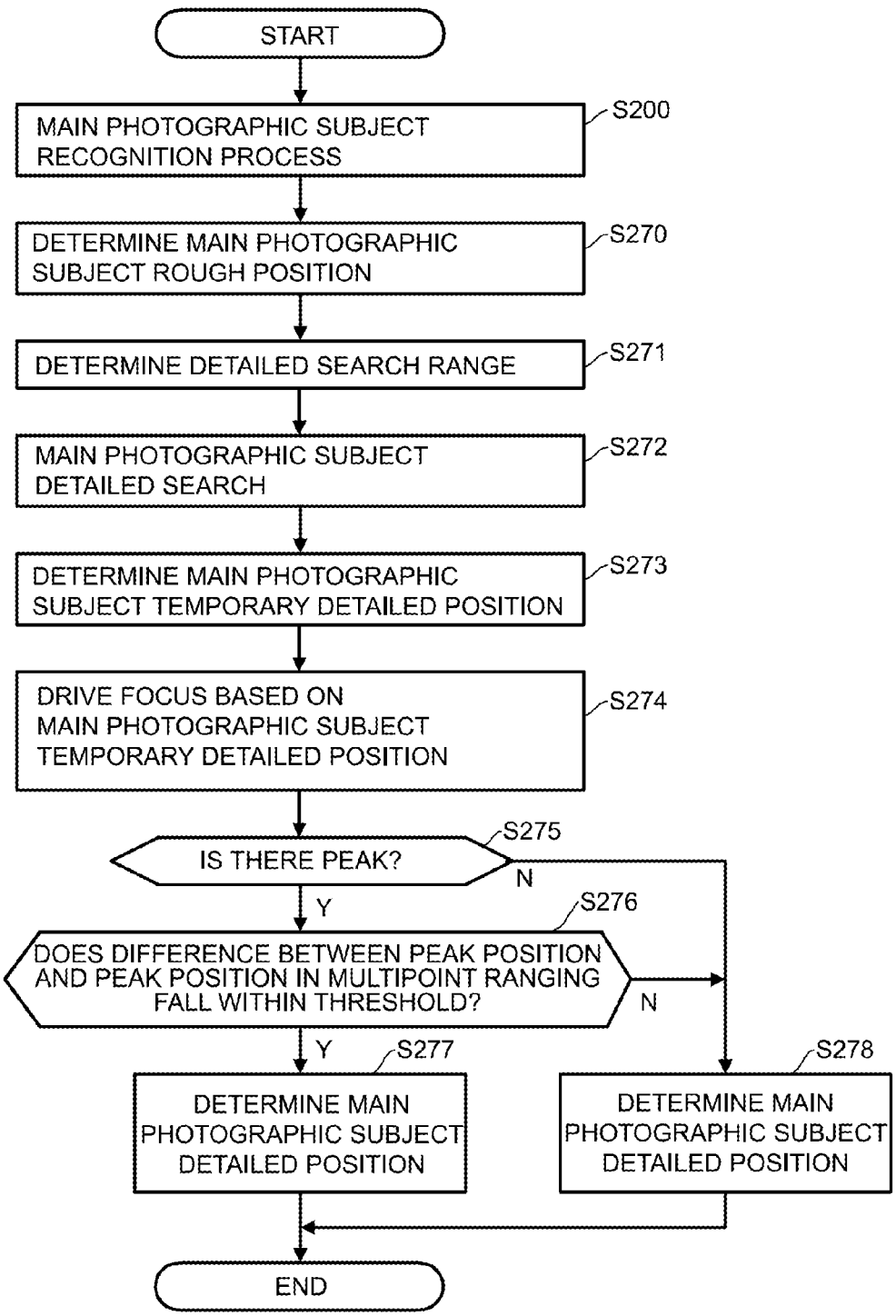
FIG. 43 is a flow chart showing a procedure of detecting the main photographic subject by a seventh method.

FIG. 43 is a flow chart showing a procedure of detecting the main photographic subject by the present method (seventh method).

The recognition process of the main photographic subject based on the multipoint ranging is performed (step S200). The process is performed by the method of one of the recognition processes of the main photographic subject of the first to eleventh embodiments.

The center position of the ranging area recognized as the position of the main photographic subject is set as the main photographic subject rough position (step S270).

Based on the position information of the main photographic subject rough position, the search range for performing the detailed search (main photographic subject detailed search range) is determined (step S271).

The detailed search is performed in the set main photographic subject detailed search range (step S272). The position of the main photographic subject detected as a result of the detailed search is set as the main photographic subject temporary detailed position (step S273).

The main photographic subject temporary detailed position is set as the focus area, and the focus lens 110 is moved in a predetermined range to acquire the focus evaluation value of the set focus area (step S274).

Figure 44A:
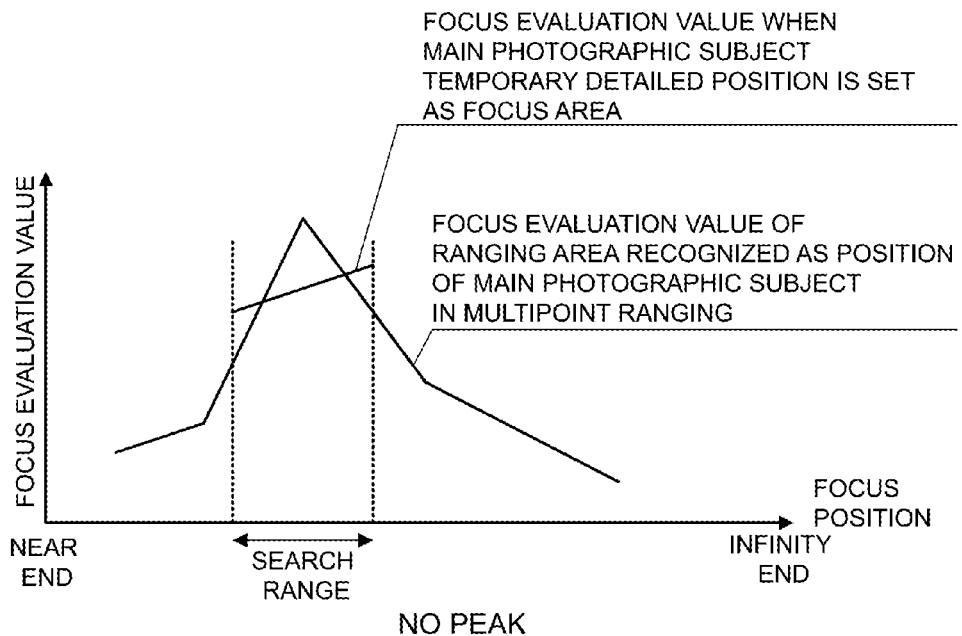
FIG. 44A is an explanatory diagram of the seventh method of the recognition process of the main photographic subject (part 1).
Figure 44B:
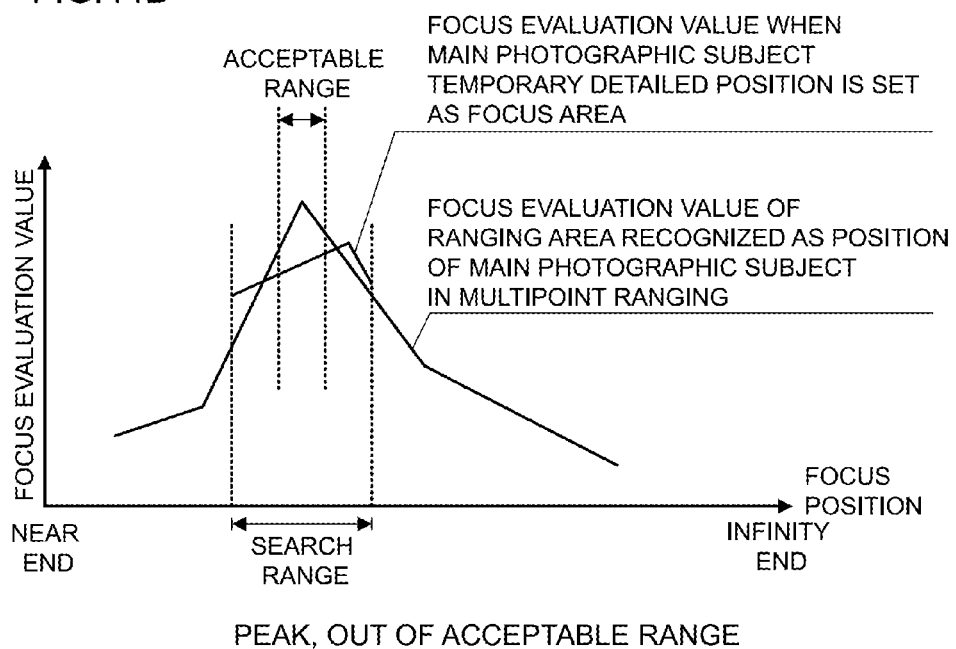
FIG. 44B is an explanatory diagram of the seventh method of the recognition process of the main photographic subject (part 2).

The range within which the focus lens 110 moves (focus evaluation value search range) is set to a predetermined range vicinity of (backward and forward from) the position where the focus evaluation value is the local maximum in a ranging area (ranging area including the main photographic subject rough position) which is recognized as the position of the main photographic subject, as a result of the multipoint ranging (see FIGS. 44A and 44B).

Whether there is a local maximum point (peak) in the acquired focus evaluation value is determined (step S275). As a result of the determination, if it is determined that there is no local maximum point (peak) as shown in FIG. 44A, the main photographic subject rough position is determined as the main photographic subject detailed position (step S278).

On the other hand, if there is a local maximum point, whether the position of the local maximum point is in an acceptable range is determined (step S276).

The acceptable range is set to a predetermined range around the position with the local maximum focus evaluation value of the ranging area (ranging area including the main photographic subject rough position) recognized as the position of the main photographic subject as a result of the multipoint ranging (see FIG. 44B).

Whether the position of the local maximum point is in the acceptable range is determined by obtaining a difference (absolute value) between the position in which the acquired focus evaluation value is the local maximum and the position with the local maximum focus evaluation value of the ranging area recognized as the position of the main photographic subject as a result of the multipoint ranging, and by determining whether the difference is within a preset threshold.

As a result of the determination, if it is determined that the difference exceeds the threshold as shown in FIG. 44B, the main photographic subject rough position is determined as the main photographic subject detailed position (step S278).

On the other hand, if it is determined that the difference is equal to or smaller than the threshold, the main photographic subject temporary detailed position is set as the main photographic subject detailed position (step S277).

In this way, the ranging is executed again with reference to the position (main photographic subject temporary detailed position) of the main photographic subject detected by the detailed search, and the displacement (in the optical axis direction) from the position (main photographic subject rough position) of the main photographic subject obtained by the multipoint ranging is compared. This can prevent the large displacement between the position of the main photographic subject detected by the detailed search and the position of the main photographic subject obtained by the multipoint ranging.

What is claimed is:

1. An imaging device comprising:
   an imaging optical system;
   an imaging unit for capturing an image through the imaging optical system;

a continuous AF unit for performing a continuous AF by repeating focus adjustment of the imaging optical system to focus on a photographic subject in a specific focus area set in an imaging area of the imaging unit;

a multipoint ranging unit for dividing the imaging area into a plurality of ranging areas, changing a focal position of the imaging optical system within a predetermined search range, detecting a position where contrast is a local maximum in each of the ranging areas, and performing ranging of a photographic subject in each of the ranging areas;

a main photographic subject recognition unit for recognizing a main photographic subject in the imaging area based on distance information of each of the ranging areas obtained by the multipoint ranging unit; and a control unit for controlling the continuous AF unit and the multipoint ranging unit to cause the continuous AF unit to terminate the continuous AF and to cause the multipoint ranging unit to execute ranging when focusing on the photographic subject is attained or almost attained in the specific focus area by the continuous AF unit.

2. The imaging device according to claim 1, wherein the multipoint ranging unit limits the search range to a predetermined range in a vicinity of a position focused or almost focused by the continuous AF unit, and executes the ranging.

3. The imaging device according to claim 2, wherein when all local maximum values of the contrast in the ranging areas obtained by the detection are smaller than a threshold or when the local maximum value cannot be detected, the multipoint ranging unit expands the search range and executes the ranging again.

4. The imaging device according to claim 1, wherein the continuous AF unit executes the focus adjustment with the focus area set at a center of the imaging area, and the multipoint ranging unit limits the search range to a nearest point side from the position focused or almost focused by the continuous AF unit and executes the ranging.

5. The imaging device according to claim 1, wherein the continuous AF unit executes the focus adjustment with the focus area at set the center of the imaging area, and the multipoint ranging unit performs searching from the position focused or almost focused by the continuous AF unit to a nearest point side.

6. The imaging device according to claim 1, wherein the control unit prevents the multipoint ranging unit from executing the ranging when the position focused or almost focused by the continuous AF unit closer to the nearest point side than a threshold.

7. The imaging device according to claim 1, further comprising
a second continuous AF unit for repeating focus adjustment of the imaging optical system to focus on the main photographic subject when the main photographic subject recognition unit recognizes the main photographic subject.

8. The imaging device according to claim 7, further comprising
a second scene change detection unit for detecting a change of the scene captured by the imaging unit after the focus adjustment by the second continuous AF unit starts, wherein
the control unit switches to the focus adjustment by the continuous AF unit when the second scene change detection unit detects the change of the scene.

9. The imaging device according to claim 1, further comprising:
an imaging preparation instruction unit for instructing imaging preparation;
an imaging preparation unit for performing focus adjustment to focus on the main photographic subject recognized by the main photographic subject recognition unit according to an instruction of the imaging preparation by the imaging preparation instruction unit and for calculating an exposure value for proper exposure of the main photographic subject recognized by the main photographic subject recognition unit;
an actual imaging instruction unit for instructing actual imaging;
an imaging control unit for controlling the imaging unit to capture an image with the exposure value calculated by the imaging preparation unit according to an instruction of the actual imaging by the actual imaging instruction unit; and
a recording control unit for recording the image captured by the imaging unit in a medium according to the instruction of the actual imaging by the actual imaging instruction unit.

10. The imaging device according to claim 1, further comprising
an automatic tracking unit for performing automatic tracking by setting the main photographic subject as a target of the automatic tracking when the main photographic subject recognition unit recognizes the main photographic subject.

11. An imaging device comprising:
an imaging optical system;
an imaging unit for capturing an image through the imaging optical system;
a continuous AF unit for performing a continuous AF by repeating focus adjustment of the imaging optical system to focus on a photographic subject in a specific focus area set in an imaging area of the imaging unit;
a scene change detection unit for detecting a change of a scene captured by the imaging unit while the continuous AF is performed by the continuous AF unit;
a multipoint ranging unit for dividing the imaging area into a plurality of ranging areas, changing a focal position of the imaging optical system within a predetermined search range, detecting a position where contrast is a local maximum in each of the ranging areas, and performing ranging of a photographic subject in each of the ranging areas;
a main photographic subject recognition unit for recognizing a main photographic subject in the imaging area based on distance information of each of the ranging areas obtained by the multipoint ranging unit; and
a control unit for controlling the continuous AF unit and the multipoint ranging unit to cause the continuous AF unit to terminate the continuous AF and to cause the multipoint ranging unit to execute the ranging when the scene change detection unit detects a scene change.

12. The imaging device according to claim 11, further comprising
a reference information registration unit for registering, as reference information, an image captured by the imaging unit or imaging information when the main photographic subject recognition unit recognizes the main photographic subject, wherein the scene change detection unit detects the change of the scene by comparing a current image captured by the imaging unit or current imaging information with the reference information.

13. The imaging device according to claim 11, further comprising
a reference information registration unit for registering, as reference information, an image or imaging information of a frame which is N frames before the current image captured by the imaging unit, wherein
the scene change detection unit detects the change of the scene by comparing the current image captured by the imaging unit or the current imaging information with the reference information.

14. The imaging device according to claim 11, wherein
the control unit controls the continuous AF unit and the multipoint ranging unit to cause the multipoint ranging unit to execute the ranging when the focusing on the photographic subject is attained or almost attained in the specific focus area by the continuous AF unit and when the scene change detection unit detects the scene change.

15. The imaging device according to claim 14, wherein
the multipoint ranging unit limits the search range to a predetermined range in a vicinity of a position focused or almost focused by the continuous AF unit, and executes the ranging.

16. The imaging device according to claim 15, wherein
when all local maximum values of the contrast in the ranging areas obtained by the detection are smaller than a threshold or when the local maximum value cannot be detected, the multipoint ranging unit expands the search range and executes the ranging again.

17. The imaging device according to claim 15, wherein
the control unit prevents the multipoint ranging unit from executing the ranging when the position focused or almost focused by the continuous AF unit closer to the nearest point side than a threshold.

18. The imaging device according to claim 14, wherein
the continuous AF unit executes the focus adjustment with the focus area set at a center of the imaging area, and
the multipoint ranging unit limits the search range to a nearest point side from the position focused or almost focused by the continuous AF unit and executes the ranging.

19. The imaging device according to claim 14, wherein
the continuous AF unit executes the focus adjustment with the focus area at set the center of the imaging area, and
the multipoint ranging unit performs searching from the position focused or almost focused by the continuous AF unit to a nearest point side.

20. An imaging device comprising:
an imaging optical system;
an imaging unit for capturing an image through the imaging optical system;
a continuous AF unit for performing a continuous AF by repeating focus adjustment of the imaging optical system to focus on a photographic subject in a specific focus area set in an imaging area of the imaging unit;
a multipoint ranging unit for dividing the imaging area into a plurality of ranging areas, changing a focal position of the imaging optical system in a predetermined search range, detecting a position where contrast is a local maximum in each of the ranging areas, and performing ranging of a photographic subject in each of the ranging areas;
a main photographic subject recognition unit for recognizing a main photographic subject in the imaging area based on distance information of each of the ranging areas obtained by the multipoint ranging unit;
a counting unit for starting counting before the continuous AF unit starts the continuous AF, and for resetting a count value and starting counting again when the multipoint ranging unit executes the ranging; and
a control unit for controlling the continuous AF unit and the multipoint ranging unit to cause the continuous AF unit to terminate the continuous AF and to cause the multipoint ranging unit to execute the ranging when the count value by the counting unit exceeds a threshold.

21. The imaging device according to claim 20, wherein
the control unit controls the continuous AF unit and the multipoint ranging unit to cause the multipoint ranging unit to execute the ranging when the focusing on the photographic subject is attained or almost attained in the specific focus area by the continuous AF unit and the count value by the counting unit exceeds the threshold.

22. The imaging device according to claim 20, further comprising
a scene change detection unit for detecting a change of a scene captured by the imaging unit while the continuous AF is performed by the continuous AF unit, wherein
the control unit controls the continuous AF unit and the multipoint ranging unit to cause the multipoint ranging unit to execute the ranging when the focusing on the photographic subject is attained or almost attained in the specific focus area by the continuous AF unit, the scene change detection unit detects the scene change and the count value by the counting unit exceeds the threshold.

23. The imaging device according to claim 22, further comprising
a reference information registration unit for registering, as reference information, an image captured by the imaging unit or imaging information when the main photographic subject recognition unit recognizes the main photographic subject, wherein
the scene change detection unit detects the change of the scene by comparing a current image captured by the imaging unit or current imaging information with the reference information.

24. The imaging device according to claim 22, further comprising
a reference information registration unit for registering, as reference information, an image or imaging information of a frame which is N frames before the current image captured by the imaging unit, wherein
the scene change detection unit detects the change of the scene by comparing the current image captured by the imaging unit or the current imaging information with the reference information.

25. The imaging device according to claim 22, wherein
the continuous AF unit executes the focus adjustment with the focus area set at a center of the imaging area, and
the multipoint ranging unit limits the search range to a nearest point side from the position focused or almost focused by the continuous AF unit and executes the ranging.

26. The imaging device according to claim 22, wherein
the continuous AF unit executes the focus adjustment with the focus area at set the center of the imaging area, and
the multipoint ranging unit performs searching from the position focused or almost focused by the continuous AF unit to a nearest point side.

27. The imaging device according to claim 22, wherein
the control unit prevents the multipoint ranging unit from executing the ranging when the position focused or almost focused by the continuous AF unit closer to the nearest point side than a threshold.

28. The imaging device according to claim 21, wherein the multipoint ranging unit limits the search range to a predetermined range in a vicinity of a position focused or almost focused by the continuous AF unit, and executes the ranging.

29. The imaging device according to claim 28, wherein when all local maximum values of the contrast in the ranging areas obtained by the detection are smaller than a threshold or when the local maximum value cannot be detected, the multipoint ranging unit expands the search range and executes the ranging again.

30. A main photographic subject recognition method comprising:
 a step of performing continuous AF to focus on a photographic subject in a specific focus area set in an imaging area of an imaging unit;
 a step of terminating the continuous AF and changing a focal position of an imaging optical system within a predetermined search range when focusing on the photographic subject is attained or almost attained in the specific focus area in the continuous AF and performing multipoint ranging; and
 a step of recognizing a main photographic subject in the imaging area based on distance information of each ranging area obtained by the multipoint ranging.

31. The main photographic subject recognition method according to claim 30, wherein
 in the step of performing the multipoint ranging, when focusing on the photographic subject is attained or almost attained in the specific focus area in the continuous AF and a change of a scene captured by the imaging unit is detected, the multipoint ranging is performed with the focal position of the imaging optical system changed within the predetermined search range.

32. The main photographic subject recognition method according to claim 30, further comprising:
 a step of starting counting before the continuous AF is performed, wherein
 in the step of performing the multipoint ranging, when focusing on the photographic subject is attained or almost attained in the specific focus area in the continuous AF and a change of a scene captured by the imaging unit is detected and a count value exceeds a threshold, the multipoint ranging is performed with the focal position of the imaging optical system changed within the predetermined search range.

33. A main photographic subject recognition method comprising:
 a step of performing continuous AF to focus on a photographic subject in a specific focus area set in an imaging area of an imaging unit;
 a step of terminating the continuous AF, changing a focal position of an imaging optical system within a predetermined search range and performing multipoint ranging when a change of a scene captured by the imaging unit is detected while the continuous AF is performed; and
 a step of recognizing a main photographic subject in the imaging area based on distance information of each ranging area obtained by the multipoint ranging.

34. A main photographic subject recognition method comprising:
 a step of starting counting;
 a step of performing continuous AF to focus on a photographic subject in a specific focus area set in an imaging area of an imaging unit;
 a step of terminating the continuous AF, changing a focal position of an imaging optical system in a predetermined search range and performing multipoint ranging when a count value exceeds a threshold; and
 a step of recognizing a main photographic subject in the imaging area based on distance information of each ranging area obtained by the multipoint ranging.

\* \* \* \* \*